US009632286B2

(12) United States Patent
Liu et al.

(10) Patent No.: US 9,632,286 B2
(45) Date of Patent: Apr. 25, 2017

(54) OPTICAL IMAGE CAPTURING SYSTEM

(71) Applicant: ABILITY OPTO-ELECTRONICS TECHNOLOGY CO. LTD., Taichung (TW)

(72) Inventors: Yao-Wei Liu, Taichung (TW); Yeong-Ming Chang, Taichung (TW)

(73) Assignee: ABILITY OPTO-ELECTRONICS TECHNOLOGY CO. LTD., Taichung (TW)

( * ) Notice: Subject to any disclaimer, the term of this patent is extended or adjusted under 35 U.S.C. 154(b) by 44 days.

(21) Appl. No.: 14/686,333

(22) Filed: Apr. 14, 2015

(65) Prior Publication Data

US 2016/0238818 A1 Aug. 18, 2016

(30) Foreign Application Priority Data

Feb. 16, 2015 (TW) .............................. 104105410 A

(51) Int. Cl.
*G02B 13/00* (2006.01)
*G02B 9/34* (2006.01)
(52) U.S. Cl.
CPC ............. *G02B 13/004* (2013.01); *G02B 9/34* (2013.01)

(58) Field of Classification Search
USPC ................ 359/713–715, 644, 650, 657–660, 359/686–688, 745–747, 771–775
See application file for complete search history.

(56) References Cited

U.S. PATENT DOCUMENTS

2013/0335588 A1* 12/2013 Matsusaka ............... G02B 3/00 348/220.1

FOREIGN PATENT DOCUMENTS

| TW | 104105405 | 2/2015 |
|---|---|---|
| TW | 201504674 A | 2/2015 |

* cited by examiner

*Primary Examiner* — Darryl J Collins
*Assistant Examiner* — Journey Sumlar
(74) *Attorney, Agent, or Firm* — Muncy, Geissler, Olds & Lowe, P.C.

(57) ABSTRACT

The present disclosure discloses an optical image capturing system, sequentially arranged from an object side to an image side, comprises a first lens with positive refractive power; a second lens with refractive power; a third lens with refractive power; and a fourth lens with refractive power; and an image-side surface and an object-side surface of the fourth lens element are aspheric. The optical image capturing system can increase aperture value and improve the imagining quality for applying to compact cameras.

24 Claims, 30 Drawing Sheets

OPTICAL IMAGE CAPTURING SYSTEM

CROSS-REFERENCE TO RELATED APPLICATION

This application claims the benefit of Taiwan Patent Application No. 104105410, filed on Feb. 16, 2015, in the Taiwan Intellectual Property Office, the disclosure of which is incorporated herein in its entirety by reference.

BACKGROUND OF THE INVENTION

1. Field of the Invention

The present disclosure relates to an optical image capturing system, and more particularly to a compact optical image capturing system which can be applied to electronic products.

2. Description of the Related Art

In recent years, with the rise of portable electronic devices having camera functionalities, the demand for an optical image capturing system is raised gradually. The image sensing device of ordinary photographing camera is commonly selected from charge coupled device (CCD) or complementary metal-oxide semiconductor sensor (CMOS Sensor). In addition, as advanced semiconductor manufacturing technology enables the minimization of pixel size of the image sensing device, the development of the optical image capturing system is directed towards the field of high pixels. Therefore, the requirement for high imaging quality is rapidly raised.

The traditional optical image capturing system of a portable electronic device comes with different designs, including a two-lens or a three-lens design. The manufacture has kept on enhancing the portable devices pixels quality, while the consumers demand on the thin portable device is increasing; such as the night vision and photography modes, or demand of a wide angle for the self-timer function. But design of large aperture stop system often encounters more difficult technical problems, for example, the degraded image quality and complicated manufacturing process. Moreover, the distortion may increase due to the optical system designed with the wide angle. So, the optical image capturing system in prior arts cannot meet the requirement of the higher order camera lens module.

Therefore, how to effectively increase the aperture value and the view angle of the optical image capturing system and further improve image quality for the image formation becomes a quite important issue.

SUMMARY OF THE INVENTION

The aspect of embodiment of the present disclosure directs to an optical image capturing system and an optical image capturing lens which use combination of refractive powers, convex and concave surfaces of four-piece optical lenses (the convex or concave surface in the disclosure denotes the geometrical shape of an image-side surface or an object-side surface of each lens on an optical axis) to further increase the aperture value and the view angle of the optical image capturing system effectively and to increase imaging quality and the number of pixels so as to be applied to compact electronic products.

The terms and its definitions to the lens element parameters in the present embodiment are shown as below for further reference.

The Lens Element Parameter Related to a Length or a Height in the Lens Element

A height for image formation of the optical image capturing system is denoted by HOI. A height of the optical image capturing system is denoted by HOS. A distance from the object-side surface of the first lens element to the image-side surface of the fourth lens element is denoted by InTL. A distance from the image-side surface of the fourth lens element to the image plane is denoted by InB, and InTL+InB=HOS. A distance from the aperture stop (aperture) to the image plane is denoted by InS. A distance from the first lens element to the second lens element is denoted by In12 (instance). A central thickness of the first lens element of the optical image capturing system on the optical axis is denoted by TP1 (instance).

The Lens Element Parameter Related to a Material in the Lens Element

An Abbe number of the first lens element in the optical image capturing system is denoted by NA1 (instance). A refractive index of the first lens element is denoted by Nd1 (instance).

The Lens Element Parameter Related to a View Angle in the Lens Element

A view angle is denoted by AF. Half of the view angle is denoted by HAF. A major light angle is denoted by MRA.

The Lens Element Parameter Related to Exit/Entrance Pupil in the Lens Element

An entrance pupil diameter of the optical image capturing system is denoted by HEP.

The Lens Element Parameter Related to a Depth of the Lens Element Shape

A distance in parallel with an optical axis from a maximum effective diameter position to an axial point on the object-side surface of the fourth lens element is denoted by InRS41 (instance). A distance in parallel with an optical axis from a maximum effective diameter position to an axial point on the image-side surface of the fourth lens element is denoted by InRS42 (instance).

The Lens Element Parameter Related to the Lens Element Shape

A critical point C is a tangent point on a surface of a specific lens element, and the tangent point is tangent to a plane perpendicular to the optical axis and the tangent point cannot be a crossover point on the optical axis. To follow the past, a distance perpendicular to the optical axis between a critical point C31 on the object-side surface of the third lens element and the optical axis is HVT31 (instance). A distance perpendicular to the optical axis between a critical point C32 on the image-side surface of the third lens element and the optical axis is HVT32 (instance). A distance perpendicular to the optical axis between a critical point C41 on the object-side surface of the fourth lens element and the optical axis is HVT41 (instance). A distance perpendicular to the optical axis between a critical point C42 on the image-side surface of the fourth lens element and the optical axis is HVT42 (instance). The object-side surface of the fourth lens element has one inflection point IF411 which is nearest to the optical axis, and the sinkage value of the inflection point IF411 is denoted by SGI411 (instance). A distance perpendicular to the optical axis between the inflection point IF411 and the optical axis is HIF411 (instance). The image-side surface of the fourth lens element has one inflection point IF421 which is nearest to the optical axis and the sinkage value of the inflection point IF421 is denoted by SGI421 (instance). A distance perpendicular to the optical axis between the inflection point IF421 and the optical axis is HIF421 (instance). The object-side surface of the fourth lens element has one inflection point IF412 which is second point nearest to the optical axis, and the sinkage value of the inflection point HIF412 is denoted by SGI412 (instance). A distance perpendicular to the optical axis between the inflection point IF412 and the optical axis is HIF412 (instance). The image-side surface of the fourth lens element has one inflection point IF422 which is second point nearest to the optical axis and the sinkage value of the inflection point IF422 is denoted by SGI422 (instance). A distance perpendicular to the optical axis between the inflection point IF422 and the optical axis is HIF422 (instance).

The Lens Element Parameter Related to an Aberration

Optical Distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The disclosure provides an optical image capturing system, an object-side surface or an image-side surface of the fourth lens element has inflection points, such that the angle of incidence from each view field to the fourth lens element can be adjusted effectively and the optical distortion and the TV distortion can be corrected as well. Besides, the surfaces of the fourth lens element may have a better optical path adjusting ability to acquire better imaging quality.

The disclosure provides an optical image capturing system, sequentially arranged from an object side to an image side, including a first, second, third, and fourth lens elements. The first lens element may have positive refractive power and the fourth lens element may have refractive power. An object-side surface and an image-side surface of the fourth lens element are aspheric. Focal lengths of the first through fourth lens elements are f1, f2, f3, and f4, respectively. A focal length of the optical image capturing system is f. An entrance pupil diameter of the optical image capturing system is HEP. Half of a maximal view angle of the optical image capturing system is HAF. A distance on the optical axis from the object-side surface of the first lens element to the image-side surface of the fourth lens element is InTL. A sum of an absolute value of each distance in parallel with the optical axis from a maximum effective diameter position on an object-side surface of each of the four lens elements to an axial point on the object-side surface of each of the four lens elements is InRSO. A sum of an absolute value of each distance in parallel with the optical axis from a maximum effective diameter position on an image-side surface of each of the four lens elements to an axial point on the image-side surface of each of the four lens elements is InRSI. A sum of InRSO and InRSI is $\Sigma|InRSI|$, and the following relation is satisfied: $1.2 \leq f/HEP \leq 6.0$, $0.5 \leq HOS/f \leq 3.0$, and $0 < \Sigma|InRSI|/InTL \leq 3$.

The disclosure provides another optical image capturing system, sequentially arranged from an object side to an image side, including a first, second, third, and fourth lens elements. The first lens element has positive refractive power, and an object-side surface and an image-side surface of the first lens element are aspheric. The second lens element has refractive power. The third lens element has refractive power. The fourth lens element has refractive power, and an object-side surface and an image-side surface of the fourth lens element are aspheric. Focal lengths of the first through fourth lens elements are f1, f2, f3 and f4 respectively. A focal length of the optical image capturing system is f. An entrance pupil diameter of the optical image capturing system is HEP. Half of a maximal view angle of the optical image capturing system is HAF. A distance from the object-side surface of the first lens element to the image plane is HOS. Optical distortion and TV distortion for image formation in the optical image capturing system are ODT and TDT respectively. A distance from the object-side surface of the first lens element to the image-side surface of the fourth lens element is InTL. A sum of an absolute value of each distance in parallel with the optical axis from a maximum effective diameter position on an object-side surface of each of the four lens elements to an axial point on the object-side surface of each of the four lens elements is InRSO. A sum of an absolute value of each distance in parallel with the optical axis from a maximum effective diameter position on an image-side surface of each of the four lens elements to an axial point on the image-side surface of each of the four lens elements is InRSI. A sum of InRSO and InRSI is $\Sigma|InRSI|$, and the following relation is satisfied: $1.2 \leq f/HEP \leq 6.0$, $0.5 \leq HOS/f \leq 3.0$, $0 < \Sigma|InRSI|/InTL \leq 3$, $|TDT| < 60\%$, and $|ODT| \leq 50\%$.

The disclosure provides another optical image capturing system, sequentially arranged from an object side to an image side, including a first, second, third, and fourth lens elements. The first lens element has positive refractive power, and an object-side and an image-side surfaces of the first lens element are aspheric. The second lens element has negative refractive power. The third lens element has refractive power. The fourth lens element has refractive power, an object-side surface and an image-side surface of the fourth lens element are aspheric, and at least one surface of the fourth lens element has one inflection point. Focal lengths of the first through fourth lens elements are f1, f2, f3 and f4 respectively. A focal length of the optical image capturing system is f. An entrance pupil diameter of the optical image capturing system is HEP. Half of a maximal view angle of the optical image capturing system is HAF. A distance from the object-side surface of the first lens element to the image plane is HOS. Optical distortion and TV distortion for image formation in the optical image capturing system are ODT and TDT, respectively. A distance from the object-side surface of the first lens element to the image-side surface of the fourth lens element is InTL. A sum of an absolute value of each distance in parallel with the optical axis from a maximum effective diameter position on an object-side surface of each of the four lens elements to an axial point on the object-side surface of each of the four lens elements is InRSO. A sum of an absolute value of each distance in parallel with the optical axis from a maximum effective diameter position on an image-side surface of each of the four lens elements to an axial point on an image-side surface of each of the four lens elements is InRSI. A sum of InRSO and InRSI is $\Sigma|InRSI|$, and the following relation is satisfied: $1.2 \leq f/HEP \leq 6.0$, $0.5 \leq HOS/f \leq 3.0$, $0 < \Sigma|InRSI|/InTL \leq 3$, $|TDT| < 60\%$, and $|ODT| \leq 50\%$.

An image sensing device whose length of diagonal is less than 1/1.2 inch may be applied to the aforementioned optical image capturing system. A better length of diagonal of the image sensing device is 1/2.3 inch. The pixel size of the image sensing device is less than 1.4 μm. A better pixel size of the image sensing device is less than 1.12 μm. A best pixel size of the image sensing device is less than 0.9 μm. Besides, the optical image capturing system can be applied to the image sensing device with an aspect ratio of 16:9.

The aforementioned optical image capturing system may be applied to the demands of photographing or recording having millions or ten millions pixels, such as 4K2K, or so-called UHD and QHD, and may have better imaging quality.

The height of optical system (HOS) may be reduced to achieve the minimization of the optical image capturing system when the absolute value of f1 is larger than f4 (i.e., |f1|>f4).

When |f2|+|f3|>|f1|+|f4| is satisfied, at least one of the second to the third lens elements may have weak positive refractive power or weak negative refractive power. The weak refractive power indicates that an absolute value of the focal length of a specific lens element is greater than 10. When at least one of the second to the third lens elements has the weak positive refractive power, the positive refractive power of the first lens element can be shared, such that the unnecessary aberration will not appear too early. On the contrary, when at least one of the second to the third lens elements has the weak negative refractive power, the aberration of the optical image capturing system can be corrected and fine tuned.

The fourth lens element may have negative refractive power and a concave image-side surface. Hereby, the back focal length is reduced for keeping the miniaturization, to miniaturize the lens element effectively. In addition, at least one of the object-side and the image-side surfaces of the fourth lens element may have at least one inflection point, such that the angle of incident with incoming light from an off-axis view field can be suppressed effectively and the aberration in the off-axis view field can be corrected further.

BRIEF DESCRIPTION OF THE DRAWINGS

The detailed structure, operating principle and effects of the present disclosure will now be described in more details hereinafter with reference to the accompanying drawings that show various embodiments of the present disclosure as follows.

DETAILED DESCRIPTION OF THE PREFERRED EMBODIMENTS

Figure 1A:
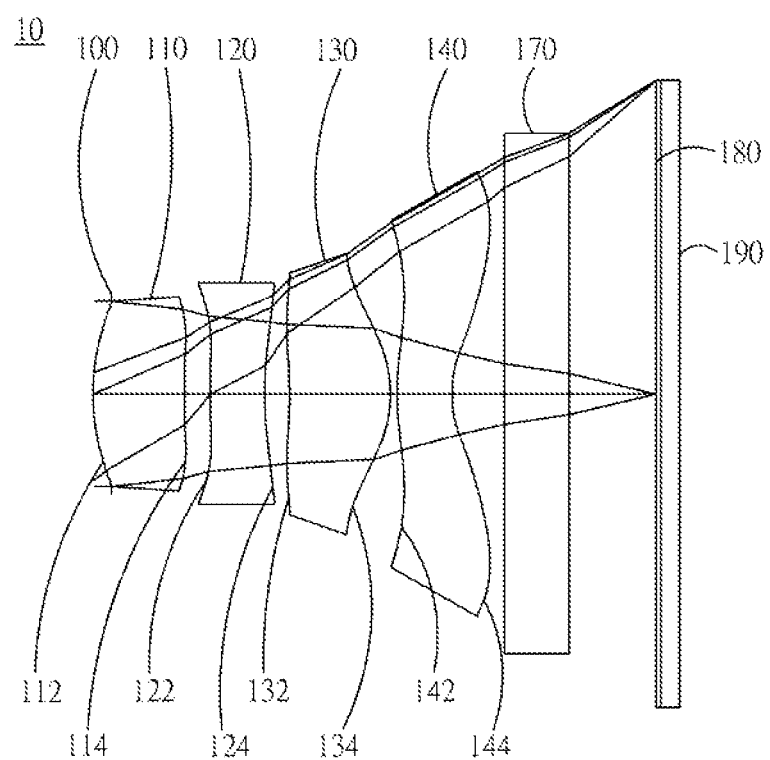
FIG. 1A is a schematic view of the optical image capturing system according to the first embodiment of the present application.

Reference will now be made in detail to the exemplary embodiments of the present disclosure, examples of which are illustrated in the accompanying drawings. Therefore, it is to be understood that the foregoing is illustrative of exemplary embodiments and is not to be construed as limited to the specific embodiments disclosed, and that modifications to the disclosed exemplary embodiments, as well as other exemplary embodiments, are intended to be included within the scope of the appended claims. These embodiments are provided so that this disclosure will be thorough and complete, and will fully convey the inventive concept to those skilled in the art. The relative proportions and ratios of elements in the drawings may be exaggerated or diminished in size for the sake of clarity and convenience in the drawings, and such arbitrary proportions are only illustrative and not limiting in any way. The same reference numbers are used in the drawings and the description to refer to the same or like parts.

It will be understood that, although the terms 'first', 'second', 'third', etc., may be used herein to describe various elements, these elements should not be limited by these terms. The terms are used only for the purpose of distinguishing one component from another component. Thus, a first element discussed below could be termed a second element without departing from the teachings of embodiments. As used herein, the term "or" includes any and all combinations of one or more of the associated listed items.

An optical image capturing system, sequentially arranged from an object side to an image side, includes a first, second, third, and fourth lens elements with refractive power. The optical image capturing system may further include an image sensing device which is disposed on an image plane.

The optical image capturing system is to use three sets of wavelengths which are 486.1 nm, 587.5 nm and 656.2 nm, respectively, wherein 587.5 nm is served as the primary reference wavelength and 555 nm is served as a reference wavelength for retrieving technical features.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR. A sum of the NPR of all lens elements with negative refractive powers is ΣNPR. It is beneficial to control the total refractive power and the total length of the optical image capturing system when following conditions are satisfied: $0.5 \leq \Sigma PPR/|\Sigma NPR| \leq 4.5$. Preferably, the following relation may be satisfied: $1 \leq \Sigma PPR/|\Sigma NPR| \leq 3.5$.

The height of optical system (HOS) may be reduced to achieve the minimization of the optical image capturing system and may perform the images of UltraPixel when the absolute value of HOS/f is close to 1.

A sum of a focal length fp of each lens element with positive refractive power is ΣPP. A sum of a focal length of each lens element with negative refractive power is ΣNP. In one embodiment of the optical image capturing system of the present disclosure, the following relation is satisfied: $0 < \Sigma PP \leq 200$ and $f1/\Sigma PP \leq 0.85$. Preferably, the following relation may be satisfied: $0 < \Sigma PP \leq 150$ and $0.01 \leq f1/\Sigma PP \leq 0.6$. Hereby, ifs beneficial to control the focus ability of the optical image capturing system and allocate the positive refractive power of the optical image capturing system appropriately, so as to suppress the significant aberration generating too early.

The first lens element may have positive refractive power and a convex object-side surface. Hereby, strength of the positive refractive power of the first lens element can be fined-tuned, so as to reduce the total length of the optical image capturing system.

The second lens element may have negative refractive power. Hereby, the aberration generated by the first lens element can be corrected.

The third lens element may have positive refractive power. Hereby, the positive refractive power of the first lens element can be shared.

The fourth lens element may have negative refractive power and a concave image-side surface. Hereby, the back focal length is reduced for keeping the miniaturization, to miniaturize the lens element effectively. In addition, at least one of the object-side surface and the image-side surface of the fourth lens element may have at least one inflection point, such that the angle of incident with incoming light from an off-axis view field can be suppressed effectively and the aberration in the off-axis view field can be corrected further. Preferably, each of the object-side surface and the image-side surface may have at least one inflection point.

The optical image capturing system may further include an image sensing device which is disposed on an image plane. Half of a diagonal of an effective detection field of the image sensing device (i.e., imaging height or the maximum image height of the optical image capturing system) is HOI. A distance on the optical axis from the object-side surface of the first lens element to the image plane is HOS. The following relation is satisfied: $HOS/HOI \leq 3$ and $0.5 \leq HOS/f \leq 3.0$. Preferably, the following relation may be satisfied: $1 \leq HOS/HOI \leq 2.5$ and $1 \leq HOS/f \leq 2$. Hereby, the miniaturization of the optical image capturing system can be maintained effectively, so as to be carried by lightweight portable electronic devices.

In addition, in the optical image capturing system of the disclosure, according to different requirements, at least one aperture stops may be arranged for reducing stray light and improving the image quality.

In the optical image capturing system of the disclosure, the aperture stop may be a front or middle aperture. The front aperture is the aperture stop between a photographed object and the first lens element. The middle aperture is the aperture stop between the first lens element and the image plane. If the aperture stop is the front aperture, a longer distance between the exit pupil and the image plane of the optical image capturing system can be formed, such that more optical elements can be disposed in the optical image capturing system and the effect of receiving images of the image sensing device can be raised. If the aperture stop is the middle aperture, the view angle of the optical image capturing system can be expended, such that the optical image capturing system has the same advantage that is owned by wide angle cameras. A distance from the aperture stop to the image plane is InS. The following relation is satisfied: $0.5 \leq InS/HOS \leq 1.1$. Preferably, the following relation may be satisfied: $0.8 \leq InS/HOS \leq 1$. Hereby, features of maintaining the minimization for the optical image capturing system and having wide-angle are available simultaneously.

In the optical image capturing system of the disclosure, a distance from the object-side surface of the first lens element to the image-side surface of the fourth lens element is InTL. A total central thickness of all lens elements with refractive power on the optical axis is $\Sigma TP$. The following relation is satisfied: $0.45 \leq \Sigma TP/InTL \leq 0.95$. Hereby, contrast ratio for the image formation in the optical image capturing system and defect-free rate for manufacturing the lens element can be given consideration simultaneously, and a proper back focal length is provided to dispose others optical components in the optical image capturing system.

A curvature radius of the object-side surface of the first lens element is R1. A curvature radius of the image-side surface of the first lens element is R2. The following relation is satisfied: $0.1 \leq |R1/R2| \leq 0.5$. Hereby, the first lens element may have proper strength of the positive refractive power, so as to avoid the longitudinal spherical aberration to increase too fast. Preferably, the following relation may be satisfied: $0.1 \leq |R1/R2| \leq 0.45$.

A curvature radius of the object-side surface of the fourth lens element is R9. A curvature radius of the image-side surface of the fourth lens element is R10. The following relation is satisfied: $-200<(R7-R8)/(R7+R8)<30$. Hereby, the astigmatic generated by the optical image capturing system can be corrected beneficially.

A distance between the first lens element and the second lens element on the optical axis is IN12. The following relation is satisfied: $0<IN12/f \leq 0.25$. Preferably, the following relation may be satisfied: $0.01 \leq IN12/f \leq 0.20$. Hereby, the chromatic aberration of the lens elements can be improved, such that the performance can be increased.

Central thicknesses of the first lens element and the second lens element on the optical axis are TP1 and TP2, respectively. The following relation is satisfied: $1 \leq (TP1+IN12)/TP2 \leq 10$. Hereby, the sensitivity produced by the optical image capturing system can be controlled, and the performance can be increased.

Central thicknesses of the third lens element and the fourth lens element on the optical axis are TP3 and TP4, respectively, and a distance between aforementioned two lens elements on the optical axis is IN34. The following relation is satisfied: $0.2 \leq (TP3+IN34)/TP4 \leq 3$. Hereby, the sensitivity produced by the optical image capturing system can be controlled and the total height of the optical image capturing system can be reduced.

A distance between the second lens element and the third lens element on the optical axis is IN23. A distance from the first lens element to the fourth lens element on the optical axis is InTL. The following relation is satisfied: $0.1 \leq (TP2+TP3)/\Sigma TP \leq 0.9$. Preferably, the following relation may be satisfied: $0.4 \leq (TP2+TP3)/\Sigma TP \leq 0.8$. Hereby, the aberration generated by the process of moving the incident light can be adjusted slightly layer upon layer, and the total height of the optical image capturing system can be reduced.

A distance in parallel with an optical axis from a maximum effective diameter position on the object-side surface of the first lens element to an axial point on the object-side surface of the first lens element is InRS11 (the InRS11 is positive if the horizontal displacement is toward the image-side surface; or the InRS11 is negative if the horizontal displacement is toward the object-side surface). A distance in parallel with an optical axis from a maximum effective diameter position on the image-side surface of the first lens element to an axial point on the image-side surface of the first lens element is InRS12. A central thickness of the first lens element on the optical axis is TP1. The following relation is satisfied: $0<|InRS11|+|InRS12| \leq 2$ mm and $1.0 \leq (|InRS11|+TP1+|InRS12|)/TP1 \leq 3$. Hereby, a ratio (thickness rate) of the central thickness to the effective diameter of the first lens element can be controlled, so as to further improve defect-free rate for manufacturing the lens element.

A distance in parallel with an optical axis from a maximum effective diameter position on the object-side surface of the second lens element to an axial point on the object-side surface of the second lens element is InRS21. A distance in parallel with an optical axis from a maximum effective diameter position on the image-side surface of the second lens element to an axial point on the image-side surface of the second lens element is InRS22. A central thickness of the second lens element on the optical axis is TP2. The following relation is satisfied: $0<|InRS21|+|InRS22| \leq 2$ mm and $1.0 \leq (|InRS21|+TP2+|InRS22|)/TP2 \leq 5$. Hereby, a ratio (thickness rate) of the central thickness to the effective diameter of the second lens element can be controlled, so as to further improve defect-free rate for manufacturing the lens element.

A distance in parallel with an optical axis from a maximum effective diameter position on the object-side surface of the third lens element to an axial point on the object-side surface of the third lens element is InRS31. A distance in parallel with an optical axis from a maximum effective diameter position on the image-side surface of the third lens element to an axial point on the image-side surface of the third lens element is InRS32. A central thickness of the third lens element on the optical axis is TP3. The following relation is satisfied: $0$ mm$<|InRS31|+|InRS32| \leq 2$ mm and $1.0 \leq (|InRS31|+TP3+|InRS32|)/TP3 \leq 10$. Hereby, a ratio (thickness rate) of the central thickness to the effective diameter of the third lens element can be controlled, so as to further improve defect-free rate for manufacturing the lens element.

A distance in parallel with an optical axis from a maximum effective diameter position on the object-side surface of the fourth lens element to an axial point on the object-side surface of the fourth lens element is InRS41. A distance in parallel with an optical axis from a maximum effective diameter position on the image-side surface of the fourth lens element to an axial point on the image-side surface of the fourth lens element is InRS42. A central thickness of the fourth lens element on the optical axis is TP4. The following relation is satisfied: $0$ mm$<|InRS41|+|InRS42| \leq 5$ mm and $1.0 \leq (|InRS41|+TP4+|InRS42|)/TP4 \leq 10$. Hereby, a ratio (thickness rate) of the central thickness to the effective diameter of the fourth lens element can be controlled, so as to further improve defect-free rate for manufacturing the lens element.

A sum of an absolute value of each distance in parallel with the optical axis from a maximum effective diameter position on an object-side surface of each of the four lens elements to an axial point on the object-side surface of each of the four lens elements with refractive power is InRSO. That is, InRSO=|InRS11|+|InRS21|+|InRS31|+|InRS41|. A sum of an absolute value of a distance in parallel with the optical axis from a maximum effective diameter position on an image-side surface of each of the four lens elements to an axial point on the image-side surface of each of the four lens elements with refractive power is InRSI. That is, InRSI=|InRS12|+|InRS22|+|InRS32|+|InRS42|. In the optical image capturing system of the disclosure, a sum of an absolute value of each distance in parallel with the optical axis from a maximum effective diameter position to an axial point on any surface of each of the four lens elements with refractive power is Σ|InRS|=InRSO+InRSI. The following relation is satisfied: 0 mm<Σ|InRS|≤15 mm. Hereby, the ability of correcting the aberration of the off-axis view field can be improved effectively.

The following relation is satisfied for the optical image capturing system of the disclosure: 0<Σ|InRS|/InTL≤3 and 0<Σ|InRS|/HOS≤2. Hereby, the total height of the system can be reduced and the ability of correcting the aberration of the off-axis view field can be improved effectively at the same time.

The following relation is satisfied for the optical image capturing system of the disclosure: 0<|InRS31|+|InRS32|+|InRS41|+|InRS42|≤8 mm and 0<(|InRS31|+|InRS32|+|InRS41|+|InRS42|)/InTL≤3, and 0<(|InRS31|+|InRS32|+|InRS41|+|InRS42|)/HOS≤2. Hereby, an improvement of the defect-free rate for manufacturing two lens elements which are nearest to the image plane and an improvement the ability of correcting the aberration of the off-axis view field can be given consideration simultaneously.

A distance perpendicular to the optical axis between a critical point on the object-side surface of the third lens element and the optical axis is HVT31. A distance perpendicular to the optical axis between a critical point on the image-side surface of the third lens element and the optical axis is HVT32. The following relation is satisfied for the optical image capturing system of the disclosure: HVT31≥0 mm and HVT32≥0 mm. Hereby, the ability of correcting the aberration of the off-axis view field for the optical image capturing system can be corrected beneficially.

A distance perpendicular to the optical axis between a critical point on the object-side surface of the fourth lens element and the optical axis is HVT41. A distance perpendicular to the optical axis between a critical point on the image-side surface of the fourth lens element and the optical axis is HVT42. The following relation is satisfied for the optical image capturing system of the disclosure: HVT41≥0 mm and HVT42≥0 mm. Hereby, the ability of correcting the aberration of the off-axis view field for the optical image capturing system can be corrected beneficially.

The following relation is satisfied: 0.2≤HVT42/HOI≤0.9, and preferably, the following relation is satisfied: 0.3≤HVT42/HOI≤0.8. Hereby, the ability of correcting the aberration of the off-axis view field.

The following relation is satisfied: 0≤HVT42/HOS≤0.5, and preferably, the following relation is satisfied: 0.2≤HVT42/HOS≤0.45. Hereby, the ability of correcting the aberration of the off-axis view field.

One embodiment of the optical image capturing system disclosed in the present invention is able to correct the aberration by crossing the lens elements having the high dispersion coefficient and the low dispersion coefficient The above Aspheric formula is: $z=ch^2/[1+[1-(k+1)c^2h^2]^{0.5}]+A4h^4+A6h^6+A8h^8+A10h^{10}+A12h^{12}+A14h^{14}+A16h^{16}+A18h^{18}+A20h^{20}+\ldots$, where z is a position value of the position along the optical axis and at the height h which reference to the surface apex; k is the conic coefficient, c is the reciprocal of curvature radius and A4, A6, A8, A10, A12, A14, A16, A18, and A20 are high order aspheric coefficients.

The optical image capturing system provided by the disclosure, the lens elements may be made of glass or plastic material. If plastic material is adopted to produce the lens elements, the cost of manufacturing and the weight will be lowered effectively. If lens elements are made of glass, the heat effect can be controlled and the designed space arranged for the refractive power of the optical image capturing system can be increased. Besides, the object-side surface and the image-side surface of the first through fourth lens elements may be aspheric, so as to obtain more control variables. Comparing with the usage of traditional lens element made by glass, the number of using lens elements can be reduced and the aberration can be eliminated. Therefore, the total height of the optical image capturing system can be reduced effectively.

In addition, in the optical image capturing system provided of the disclosure, the lens element has a convex surface if the surface of the lens element is convex in proximity to the optical axis. The lens element has a concave surface if the surface of the lens element is concave in proximity to the optical axis.

In addition, in the optical image capturing system provided of the disclosure, at least one light diaphragm is disposed to reduce the stray light, such that the image quality is promoted.

The optical image capturing system of the disclosure can be adapted to the optical image capturing system with automatic focus if required. With the features of a good aberration correction and a high quality of image formation, the optical image capturing system can be used in various application fields.

According to the above embodiments, the specific embodiments with figures are presented in detailed as below.

The First Embodiment (Embodiment 1)

Figure 1B:
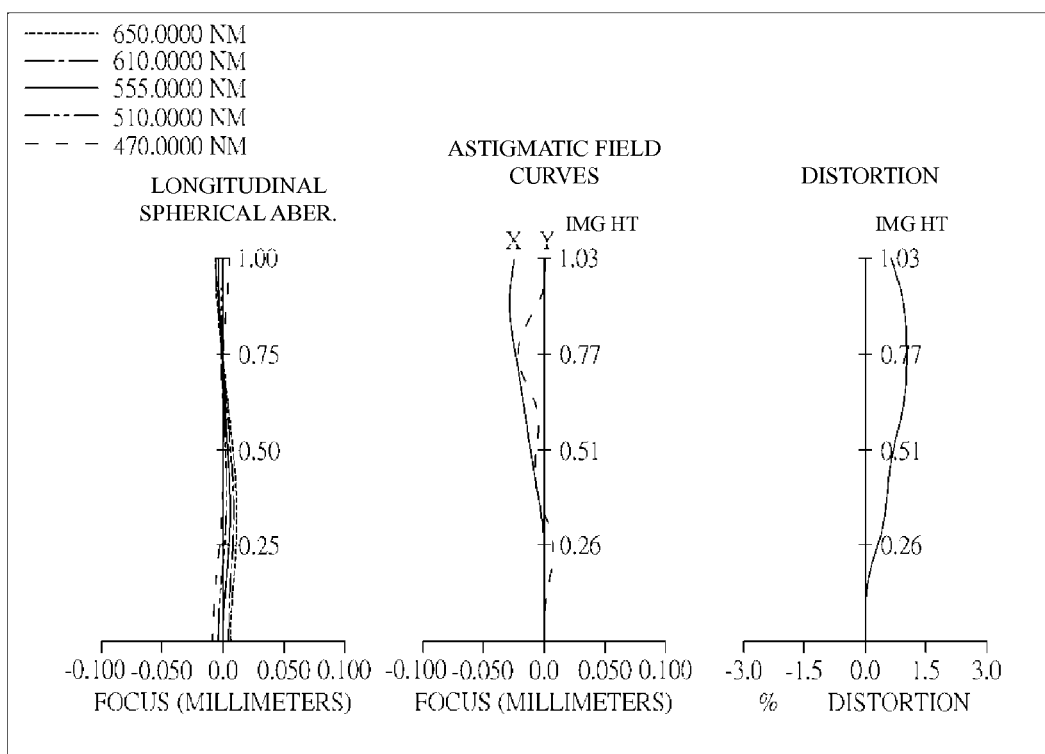
FIG. 1B is longitudinal spherical aberration curves, astigmatic field curves, and an optical distortion grid of the optical image capturing system in the order from left to right according to the first embodiment of the present application.
Figure 1C:
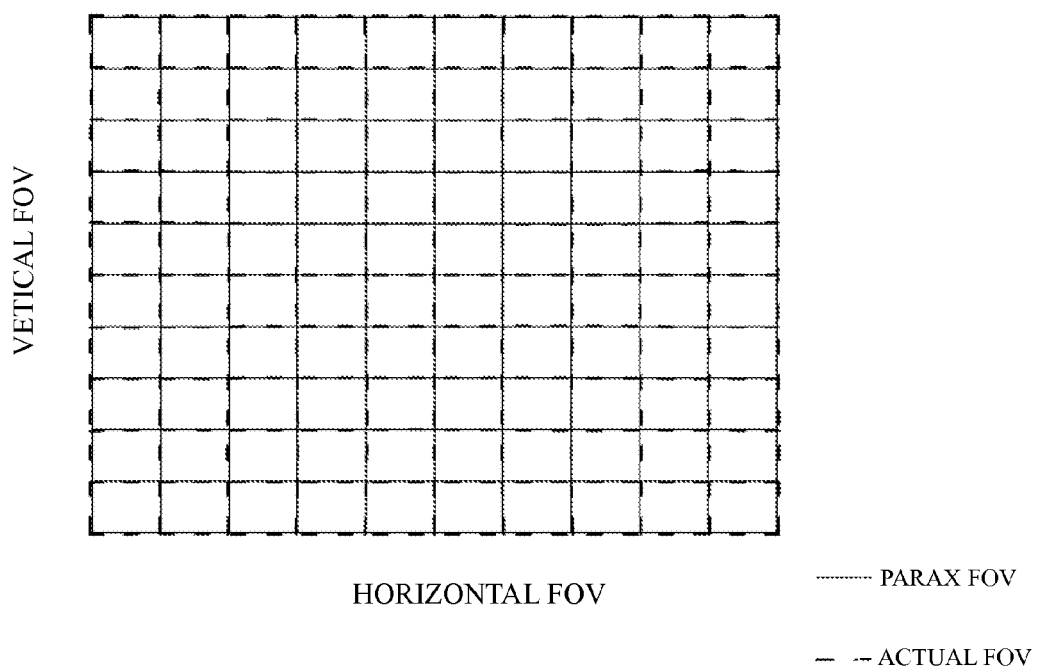
FIG. 1C is a TV distortion grid of the optical image capturing system according to the first embodiment of the present application.

Please refer to FIG. 1A, FIG. 1B and FIG. 1C, FIG. 1A is a schematic view of the optical image capturing system according to the first embodiment of the present application, FIG. 1B is longitudinal spherical aberration curves, astigmatic field curves, and an optical distortion curve of the optical image capturing system in the order from left to right according to the first embodiment of the present application, and FIG. 1C is a TV distortion grid of the optical image capturing system according to the first embodiment of the present application. As shown in FIG. 1A, sequentially arranged from an object side to an image side, the optical image capturing system includes an aperture stop 1, a first lens element 110, a second lens element 120, a third lens element 130, a fourth lens element 140, an IR filter 170, an image plane 180, and an image sensing device 190.

The first lens element 110 has positive refractive power and it is made of plastic material. The first lens element 110 has a convex object-side surface 112 and a concave image-side surface 114; both of the object-side surface 112 and the image-side surface 114 are aspheric and have an inflection point. A distance in parallel with an optical axis from an inflection point nearest to the optical axis on the object-side surface of the first lens element to an axial point on the object-side surface of the first lens element is denoted by SGI111. A distance in parallel with an optical axis from an inflection point nearest to the optical axis on the image-side surface of the first lens element to an axial point on the image-side surface of the first lens element is denoted by SGI121. The following relation is satisfied: SGI111=0.0603484 mm, SGI121=0.000391938 mm, |SGI111|/(|SGI111|+TP1)=0.16844, |SGI121|/(|SGI121|+TP1)=0.00131.

A distance perpendicular to the optical axis between the inflection point on the object-side surface of the first lens element which is nearest to the optical axis and the optical axis is denoted by HIF111. A distance perpendicular to the optical axis between the inflection point on the image-side surface of the first lens element which is nearest to the optical axis and the optical axis is denoted by HIF121. The following relation is satisfied: HIF111=0.313265 mm, HIF121=0.0765851 mm, HIF111/HOI=0.30473, and HIF121/HOI=0.07450.

The second lens element 120 has negative refractive power and it is made of plastic material. The second lens element 120 has a convex object-side surface 122 and a concave image-side surface 124 and both of the object-side surface 122 and the image-side surface 124 are aspheric and have one inflection point. A distance in parallel with an optical axis from an inflection point on the object-side surface of the second lens element which is nearest to the optical axis to an axial point on the object-side surface of the second lens element is denoted by SGI211. A distance in parallel with an optical axis from an inflection point on the image-side surface of the second lens element which is nearest to the optical axis to an axial point on the image-side surface of the second lens element is denoted by SGI221. The following relation is satisfied: SGI211=0.000529396 mm, SGI221=0.0153878 mm, |SGI211|/(|SGI211|+TP2)=0.00293, and |SGI221|/(|SGI221|+TP2)=0.07876.

A distance perpendicular to the optical axis between the inflection point on the object-side surface of the second lens element which is nearest to the optical axis and the optical axis is denoted by HIF211. A distance perpendicular to the optical axis between an axial point on the image-side surface of the second lens element and an inflection point on the image-side surface of the second lens element which is nearest to the optical axis is denoted by HIF221. The following relation is satisfied: HIF211=0.0724815 mm, HIF221=0.218624 mm, HIF211/HOI=0.07051, and HIF221/HOI=0.21267.

The third lens element 130 has positive refractive power and it is made of plastic material. The third lens element 130 has a concave object-side surface 132 and a convex image-side surface 134 and both of the object-side surface 132 and the image-side surface 134 are aspheric. The object-side surface 132 has two inflection points and the image-side surface 134 has one inflection point. A distance in parallel with an optical axis from an inflection point on the object-side surface of the third lens element which is nearest to the optical axis to an axial point on the object-side surface of the third lens element is denoted by SGI311. A distance in parallel with an optical axis from an inflection point on the image-side surface of the third lens element which is nearest to the optical axis to an axial point on the image-side surface of the third lens element is denoted by SGI321. The following relation is satisfied: SGI311=−0.00361837 mm, SGI321=−0.0872851 mm, |SGI311|/(|SGI311|+TP3)=0.01971, and |SGI321|/(|SGI321|+TP3)=0.32656.

A distance in parallel with an optical axis from an inflection point on the object-side surface of the third lens element which is a second point nearest to the optical axis to an axial point on the object-side surface of the third lens element is denoted by SGI312. The following relation is satisfied: SGI312=0.00031109 mm, and |SGI312|/(|SGI312|+TP3)=0.00173.

A distance perpendicular to the optical axis between the inflection point on the object-side surface of the third lens element which is nearest to the optical axis and the optical axis is denoted by HIF311. A distance perpendicular to the optical axis between the inflection point on the image-side surface of the third lens element which is nearest to the optical axis and the optical axis is denoted by HIF321. The following relation is satisfied: HIF311=0.128258 mm, HIF321=0.287637 mm, HIF311/HOI=0.12476, and HIF321/HOI=0.27980.

A distance perpendicular to the optical axis from an inflection point on the object-side surface of the third lens element which is a second point nearest to the optical axis to the optical axis is denoted by HII312. The following relation is satisfied: HIF312=0.374412 mm, and HIF312/HOI=0.36421.

The fourth lens element 140 has negative refractive power and it is made of plastic material. The fourth lens element 140 has a convex object-side surface 142 and a concave image-side surface 144; both of the object-side surface 142 and the image-side surface 144 are aspheric. The object-side surface 142 has two inflection points and the image-side surface 144 has one inflection point. A distance in parallel with an optical axis from an inflection point on the object-side surface of the fourth lens element which is nearest to the optical axis to an axial point on the object-side surface of the fourth lens element is denoted by SGI411. A distance in parallel with an optical axis from an inflection point on the image-side surface of the fourth lens element which is nearest to the optical axis to an axial point on the image-side surface of the fourth lens element is denoted by SGI421. The following relation is satisfied: SGI411=0.00982462 mm, SGI421=0.0484498 mm, |SGI411|/(|SGI411|+TP4)=0.02884, and |SGI421|/(|SGI421|+TP4)=0.21208.

A distance in parallel with an optical axis from an inflection point on the object-side surface of the fourth lens element which is nearest to the optical axis to an axial point on the object-side surface of the fourth lens element is denoted by SGI412. The following relation is satisfied: SGI412=−0.0344954 mm and |SGI412|/(|SGI412|+TP4)=0.09443.

A distance perpendicular to the optical axis between the inflection point on the object-side surface of the fourth lens element which is nearest to the optical axis and the optical axis is denoted by HIF411. A distance perpendicular to the optical axis between an axial point on the image-side surface of the fourth lens element and an inflection point on the image-side surface of the fourth lens element which is nearest to the optical axis is denoted by HIF421. The following relation is satisfied: HIF411=0.15261 mm, HIF421=0.209604 mm, HIF411/HOI=0.14845, and HIF421/HOI=0.20389.

A distance perpendicular to the optical axis between an inflection point on the object-side surface of the fourth lens element which is a second point nearest to the optical axis and the optical axis is denoted by HIF412. The following relation is satisfied: HIF412=0.602497 mm, and HIF412/HOI=0.58609.

The IR filter 170 is made of glass material without affecting the focal length of the optical image capturing system and it is disposed between the fourth lens element 140 and the image plane 180.

In the first embodiment of the optical image capturing system, a focal length of the optical image capturing system is f, an entrance pupil diameter of the optical image capturing system is HEP. Half of a maximal view angle of the optical image capturing system is HAF. The detailed parameters are shown as below: f=1.3295 mm, f/HEP=1.83, HAF=37.5 degree and tan(HAF)=0.7673.

In the first embodiment of the optical image capturing system, a focal length of the first lens element 110 is f1 and a focal length of the fourth lens element 140 is f4. The following relation is satisfied: f1=1.6074, |f/f1|=0.8271, f4=−1.0098, |f1|>f4, and |f1/f4|=1.5918.

In the first embodiment of the optical image capturing system, focal lengths of the second lens element 120 and the third lens element 130 are f2 and f3, respectively. The following relation is satisfied: |f2|+|f3|=4.0717 mm, |f1|+|f4|=2.6172 mm, and |f2|+|f3|>|f1|+|f4|.

A ratio of the focal length f of the optical image capturing system to a focal length fp of each of lens elements with positive refractive power is PPR. A ratio of the focal length f of the optical image capturing system to a focal length fn of each of lens elements with negative refractive power is NPR. A sum of the PPR of all lens elements with positive refractive power is ΣPPR=f/f1+f/f3=2.4734. A sum of the NPR of all lens elements with negative refractive powers is ΣNPR=f/f2+f/f4=−1.7239. ΣPPR/|ΣNPR|=1.4348. The following relation is satisfied: |f/f2|=0.4073; |f/f3|=1.6463, and |f/f4|=1.3166.

In the first embodiment of the optical image capturing system, a distance from the object-side surface 112 of the first lens element to the image-side surface 144 of the fourth lens element is InTL. A distance from the object-side surface 112 of the first lens element to the image plane 180 is HOS. A distance from an aperture stop 100 (aperture) to an image plane 180 of the optical image capturing system is denoted by InS. Half of a diagonal of an effective detection field of the image sensing device is HOI. A distance between the image-side surface 144 of the fourth lens element and the image plane 180 is InB. The following relation is satisfied: InTL+InB=HOS, HOS=1.8503 mm, HOI=1.0280 mm, HOS/HOI=1.7999, HOS/f=1.3917, InTL/HOS=0.6368, InS=1.7733 mm, and InS/HOS=0.9584.

In the first embodiment of the optical image capturing system, a total central thickness of all lens elements with refractive power on the optical axis is ΣTP. The following relation is satisfied: ΣTP=0.9887 mm and ΣTP/InTL=0.8392. Hereby, the contrast ratio of the optical image capturing system and the yield ration of manufacturing the lens elements are able to be concerned, and an adequate rear focal length is provided to accommodate the other elements.

In the first embodiment of the optical image capturing system, a curvature radius of the object-side surface 112 of the first lens element is R1. A curvature radius of the image-side surface 114 of the first lens element is R2. The following relation is satisfied: |R1/R2|=0.1252. Hereby, the first lens element has adequate strength of positive refractive power to avoid the spherical aberration increasing too fast.

In the first embodiment of the optical image capturing system, a curvature radius of the object-side surface 142 of the fourth lens element is R7. A curvature radius of the image-side surface 144 of the fourth lens element is R8. The following relation is satisfied: (R7−R8)/(R7+R8)=0.4810. Hereby, the distortion caused in the optical image capturing system can be corrected.

In the first embodiment of the optical image capturing system, focal length of the first lens element 110 and the third lens element 130 on the optical axis are f1 and f3, respectively. A sum of the focal length of all the lens elements having positive refractive power is ΣPP. The following relation is satisfied: ΣPP=f1+f3=2.4150 mm, and f1/(f1+f3)=0.6656. Hereby, it's favorable for allocating the positive refractive power of the first lens element 110 to others positive lens elements and the significant aberrations generated in the process of moving the incident light can be suppressed.

In the first embodiment of the optical image capturing system, focal length of the second lens element 120 and the fourth lens element 140 on the optical axis are f2 and f4, respectively. A sum of the focal length of all the lens elements having negative refractive power is ΣNP. The following relation is satisfied: ΣNP=f2+f4=−4.2739 mm and f4/(f2+f4)=0.7637. Hereby, it's favorable for allocating the negative refractive power of the fourth lens element 140 to others negative lens elements and the significant aberrations generated in the process of moving the incident light can be suppressed In the first embodiment of the optical image capturing system, a distance between the first lens element 110 and the second lens element 120 on the optical axis is IN12. The following relation is satisfied: IN12=0.0846 mm, and IN12/f=0.0636. Hereby, the chromatic aberration of the lens elements can be improved, such that the performance can be increased.

In the first embodiment of the optical image capturing system, central thicknesses of the first lens element 110 and the second lens element 120 on the optical axis are TP1 and TP2, respectively. The following relation is satisfied: TP1=0.2979 mm; TP2=0.1800 mm, (TP1+IN12)/TP2=2.1251. Hereby, the sensitivity produced by the optical image capturing system can be controlled, and the performance can be increased.

In the first embodiment of the optical image capturing system, central thicknesses of the third lens element 130 and the fourth lens element 140 on the optical axis are TP3 and TP4, respectively, and a distance between aforementioned two lens elements on the optical axis is IN34. The following relation is satisfied: TP3=0.3308 mm, TP4=0.1800 mm, and (TP4+IN34)/TP3=0.6197. Hereby, the sensitivity produced by the optical image capturing system can be controlled and the total height of the optical image capturing system can be reduced.

In the first embodiment of the optical image capturing system, a total central thickness of the first lens element 110 through the fourth lens element 140 on an optical axis is ΣTP, and the following relation is satisfied: (TP2+TP3)/ΣTP=0.5166. Hereby, the aberration generated by the process of moving the incident light can be adjusted slightly layer upon layer, and the total height of the optical image capturing system can be reduced.

In the first embodiment of the optical image capturing system, a distance in parallel with an optical axis from a maximum effective diameter position on the object-side surface 112 of the first lens element to an axial point on the object-side surface 112 of the first lens element is InRS11. A distance in parallel with an optical axis from a maximum effective diameter position on the image-side surface 114 of the first lens element to an axial point on the image-side surface 114 of the first lens element is InRS12. A central thickness of the first lens element 110 on the optical axis is TP1. The following relation is satisfied: |InRS11|=0.07696 mm, |InRS12|=0.03415 mm, TP1=0.29793 mm, and (|InRS11|+TP1+|InRS12|)/TP1=1.3730. Hereby, a ratio (thickness rate) of the central thickness to the effective diameter of the first lens element 110 can be controlled, so as to further improve defect-free rate for manufacturing the lens element.

A distance in parallel with an optical axis from a maximum effective diameter position on the object-side surface 122 of the second lens element to an axial point on the object-side surface 122 of the second lens element is InRS21. A distance in parallel with an optical axis from a maximum effective diameter position on the image-side surface 124 of the second lens element to an axial point on the image-side surface 124 of the second lens element is InRS22. A central thickness of the second lens element 120 on the optical axis is TP2. The following relation is satisfied: |InRS21|=0.04442 mm, |InRS22|=0.02844 mm, TP2=0.1800 mm, and (|InRS21|+TP2+|InRS22|)/TP2=1.4048. Hereby a ratio (thickness rate) of the central thickness to the effective diameter of the second lens element 120 can be controlled, so as to further improve defect-free rate for manufacturing the lens element.

A distance in parallel with an optical axis from a maximum effective diameter position on the object-side surface 132 of the third lens element to an axial point on the object-side surface 132 of the third lens element is InRS31. A distance in parallel with an optical axis from a maximum effective diameter position on the image-side surface 134 of the third lens element to an axial point on the image-side surface 134 of the third lens element is InRS32. A central thickness of the third lens element 130 on the optical axis is TP3. The following relation is satisfied: |InRS31|=0.00187 mm, |InRS32|=0.14522 mm, TP3=0.33081 mm, and (|InRS31|+TP3+|InRS32|)/TP3=1.4446. Hereby, a ratio (thickness rate) of the central thickness to the effective diameter of the third lens element 130 can be controlled, so as to further improve defect-free rate for manufacturing the lens element.

A distance in parallel with an optical axis from a maximum effective diameter position on the object-side surface 142 of the fourth lens element to an axial point on the object-side surface 142 of the fourth lens element is InRS41. A distance in parallel with an optical axis from a maximum effective diameter position on the image-side surface 144 of the fourth lens element to an axial point on the image-side surface 144 of the fourth lens element is InRS42. A central thickness of the fourth lens element 140 on the optical axis is TP4. The following relation is satisfied: |InRS41|=0.03563 mm, |InRS42|=0.06429 mm, TP4=0.1800 mm, and (|InRS41|+TP4+|InRS42|)/TP4=1.5551. Hereby, a ratio (thickness rate) of the central thickness to the effective diameter of the fourth lens element 140 can be controlled, so as to further improve defect-free rate for manufacturing the lens element.

In the first embodiment of the optical image capturing system, a sum of an absolute value of each distance in parallel with the optical axis from a maximum effective diameter position on an object-side surface of each of the four lens elements to an axial point on the object-side surface of each of the four lens elements with refractive power is InRSO. That is, InRSO=|InRS11|+|InRS21|+|InRS31|+|InRS41|. A sum of an absolute value of a distance in parallel with the optical axis from a maximum effective diameter position on an image-side surface of each of the four lens elements to an axial point on the image-side surface of each of the four lens elements with refractive power is InRSI. That is, InRSI=|InRS12|+|InRS22|+|InRS32|+|InRS42|. In the optical image capturing system of the disclosure, a sum of an absolute value of each distance in parallel with the optical axis from a maximum effective diameter position to an axial point on any surface of each of the four lens elements with negative refractive power is Σ|InRS|=InRSO+InRSI. The following relation is satisfied: InRSO=0.15888 mm, InRSI=0.27211 mm and Σ|InRS|=0.43099 mm. Hereby, the ability of correcting the aberration of the off-axis view field can be improved effectively.

In the first embodiment of the optical image capturing system, the following relation is satisfied: Σ|InRS|/InTL=0.36580 and Σ|InRS|/HOS=0.23293. Hereby, the total height of the system can be reduced and the ability of correcting the aberration of the off-axis view field can be improved effectively at the same time.

In the first embodiment of the optical image capturing system, the following relation is satisfied: |InRS31|+|InRS32|+|InRS41|+|InRS42|=0.43099 mm, (|InRS31|+|InRS32|+|InRS41|+|InRS42|)/InTL=0.20965, and (|InRS31|+|InRS32|+|InRS41|+|InRS42|)/HOS=0.13350. Hereby, an improvement of the defect-free rate for manufacturing two lens elements which are nearest to the image plane and an improvement of the ability of correcting the aberration of the off-axis view field can be given consideration simultaneously.

In the first embodiment of the optical image capturing system, a distance perpendicular to the optical axis between a critical point C31 on the object-side surface 132 of the third lens element and the optical axis is HVT31. A distance perpendicular to the optical axis between a critical point C32 on the image-side surface 134 of the third lens element and the optical axis is HVT32. The following relation is satisfied: HVT31=0.2386 mm and HVT32=0.4759 mm. Hereby, the ability of correcting the aberration of the off-axis view field can be given consideration.

In the first embodiment of the optical image capturing system, a distance perpendicular to the optical axis between a critical point C41 on the object-side surface 142 of the fourth lens element and the optical axis is HVT41. A distance perpendicular to the optical axis between a critical point C42 on the image-side surface 134 of the fourth lens element and the optical axis is HVT42. The following relation is satisfied: HVT41=0.3200 mm, HVT42=0.5522 mm and HVT41/HVT42=0.5795. Hereby, the ability of correcting the aberration of the off-axis view field can be given consideration.

In the first embodiment of the optical image capturing system, the following relation is satisfied: HVT42/HOI=0.5372. Hereby, the aberration of surrounding view field for the optical image capturing system can be corrected beneficially.

In the first embodiment of the optical image capturing system, the following relation is satisfied: HVT42/HOS=0.2985. Hereby, the aberration of surrounding view field for the optical image capturing system can be corrected beneficially.

In the first embodiment of the optical image capturing system, a distance between the second lens element 120 and the third lens element 130 on the optical axis is IN23 and a distance between the third lens element 130 and the fourth lens element 140 on the optical axis is IN34. The following relation is satisfied: 0<(|InRS22|+|InRS31|)/IN23=0.37938 and 0<(|InRS32|+|InRS41|)/IN34=7.23406. Hereby, it's favorable for manufacturing and forming the lens element and for maintaining the minimization for the optical image capturing system.

In the first embodiment of the optical image capturing system, the second lens element 120 and the fourth lens element 140 have negative refractive power. An Abbe number of the first lens element is NA1, an Abbe number of the second lens element is NA2, and an Abbe number of the fourth lens element is NA4. The following relation is satisfied: |NA1−NA2|=33.6083, and NA4/NA2=2.496668953. Hereby, the aberration of the optical image capturing system can be corrected beneficially.

In the first embodiment of the optical image capturing system, TV distortion and optical distortion for image formation in the optical image capturing system are TDT and ODT, respectively. The following relation is satisfied: |TDT|=0.4356% and |ODT|=1.0353%.

Please refer to the following Table 1 and Table 2.

The detailed data of the optical image capturing system of the first embodiment is as shown in Table 1.

side to the image plane in the optical image capturing system. Table 2 is the aspheric coefficients of the first embodiment, k is the conic coefficient in the aspheric surface formula, and A1-A20 is the first through twentieth order aspheric surface coefficients, respectively. Besides, the tables in following embodiments are referenced to the schematic view and the aberration graphs, respectively, and definitions of parameters in the tables are equal to those in the Table 1 and the Table 2, so the repetitious details need not be given here.

TABLE 1

Data of the optical image capturing system
f = 1.3295 mm, f/HEP = 1.83, HAF = 37.5 deg, tan(HAF) = 0.7673

| Surface # | | Curvature Radius | Thickness | Material | Index | Abbe # | Focal length |
|---|---|---|---|---|---|---|---|
| 0 | Object | Plano | 600 | | | | |
| 1 | Lens 1/Ape. stop | 0.78234 | 0.29793 | Plastic | 1.544 | 56.06 | 1.607 |
| 2 | | 6.24733 | 0.08459 | | | | |
| 3 | Lens 2 | 4.14538 | 0.18000 | Plastic | 1.642 | 22.46 | −3.264 |
| 4 | | 1.37611 | 0.07989 | | | | |
| 5 | Lens 3 | −1.86793 | 0.33081 | Plastic | 1.544 | 56.06 | 0.808 |
| 6 | | −0.37896 | 0.02500 | | | | |
| 7 | Lens 4 | 0.91216 | 0.18000 | Plastic | 1.544 | 56.06 | −1.010 |
| 8 | | 0.31965 | 0.17206 | | | | |
| 9 | IR filter | Plano | 0.21 | BK7_SCHOTT | | | |
| 10 | | Plano | 0.29 | | | | |
| 11 | Image plane | Plano | | | | | |
| 12 | | | | | | | |

Reference wavelength (d-line) = 555 nm, shield position: clear aperture (CA) of the third plano = 0.36 mm As for the parameters of the aspheric surfaces of the first embodiment, reference is made to Table 2.

TABLE 2

Aspheric Coefficients

| | Surface # | | | |
|---|---|---|---|---|
| | 1 | 2 | 3 | 4 |
| k = | 5.76611E−01 | 0.00000E+00 | 1.97452E+01 | 7.33565E+00 |
| A4 = | −5.51709E−01 | −2.23956E+00 | −3.78546E+00 | −8.00950E−01 |
| A6 = | 1.84419E+00 | −2.09186E+00 | −4.83803E+00 | −1.41685E+01 |
| A8 = | −5.57618E+01 | −3.33312E+01 | −1.43809E+02 | 8.62437E+01 |
| A10 = | 3.45594E+02 | 3.76727E+02 | 3.15322E+03 | −3.68614E+02 |
| A12 = | −1.49452E+03 | −1.16899E+03 | −1.72284E+04 | 1.49654E+03 |
| A14 = | | | 3.30750E+04 | −4.00967E+03 |
| A16 = | | | | |
| A18 = | | | | |
| A20 = | | | | |

| | Surface # | | | |
|---|---|---|---|---|
| | 5 | 6 | 7 | 8 |
| k = | 0.00000E+00 | −2.09962E+00 | −2.65841E+01 | −5.02153E+00 |
| A4 = | 3.04031E+00 | 1.53566E+00 | −2.73583E+00 | −2.12382E+00 |
| A6 = | −7.06804E+00 | −5.62446E+00 | 2.46306E+01 | 1.01033E+01 |
| A8 = | −1.72158E+01 | 1.96904E+01 | −2.14097E+02 | −4.02636E+01 |
| A10 = | 8.52740E+01 | 1.00740E+02 | 1.17330E+03 | 1.06276E+02 |
| A12 = | 4.79654E+02 | −2.01751E+02 | −3.91183E+03 | −1.77404E+02 |
| A14 = | −5.54044E+03 | −9.63345E+02 | 7.77524E+03 | 1.78658E+02 |
| A16 = | 1.16419E+04 | −5.33613E+00 | −8.46792E+03 | −1.05883E+02 |
| A18 = | 6.99649E+04 | 6.97327E+03 | 3.92598E+03 | 3.92300E+01 |
| A20 = | −3.30580E+05 | −4.71386E+03 | −6.97617E+01 | −1.03791E+01 |

Table 1 is the detailed structure data to the first embodiment in FIG. 1A, the unit of the curvature radius, the thickness, the distance, and the focal length is millimeters (mm). Surfaces 0-14 illustrate the surfaces from the object The Second Embodiment (Embodiment 2)

Figure 2A:
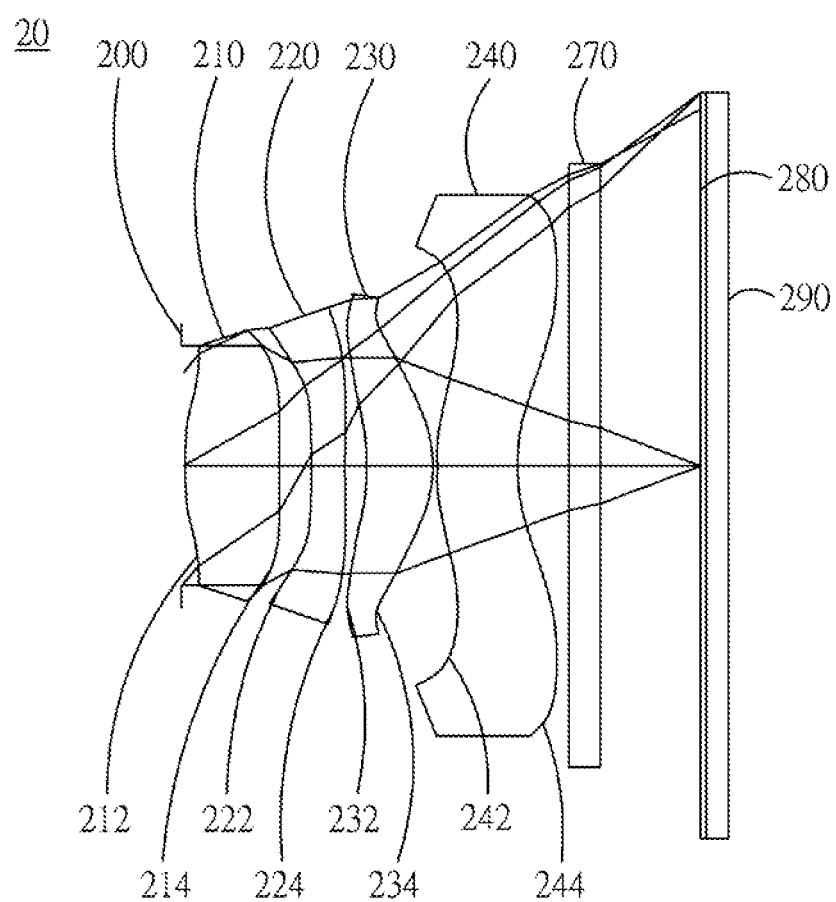
FIG. 2A is a schematic view of the optical image capturing system according to the second embodiment of the present application.
Figure 2B:
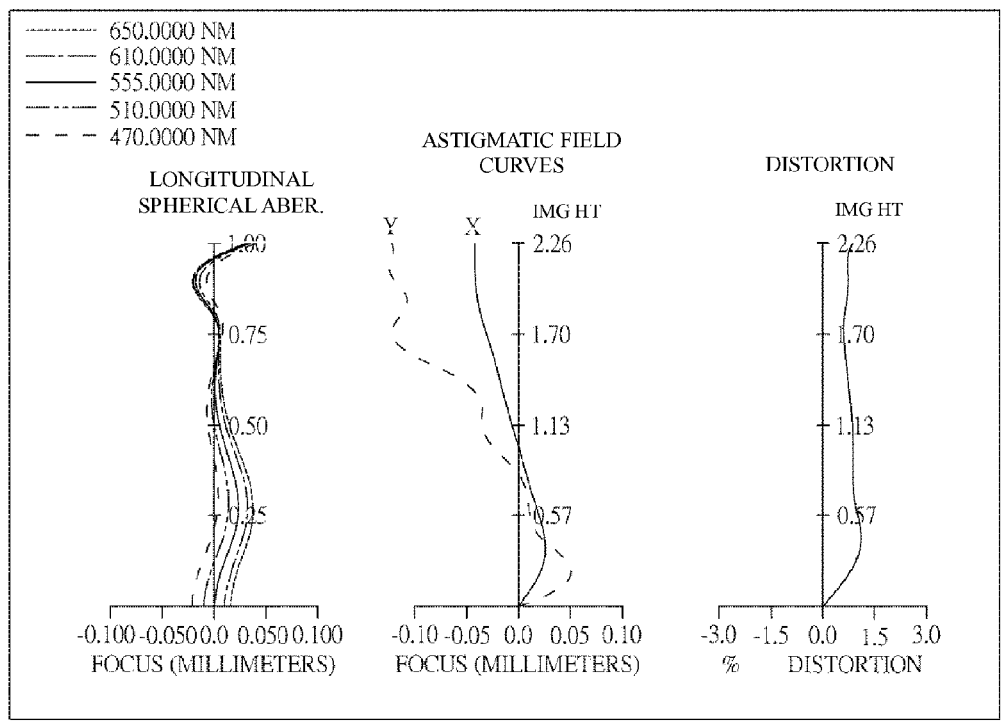
FIG. 2B is longitudinal spherical aberration curves, astigmatic field curves, and an optical distortion grid of the optical image capturing system in the order from left to right according to the second embodiment of the present application.
Figure 2C:
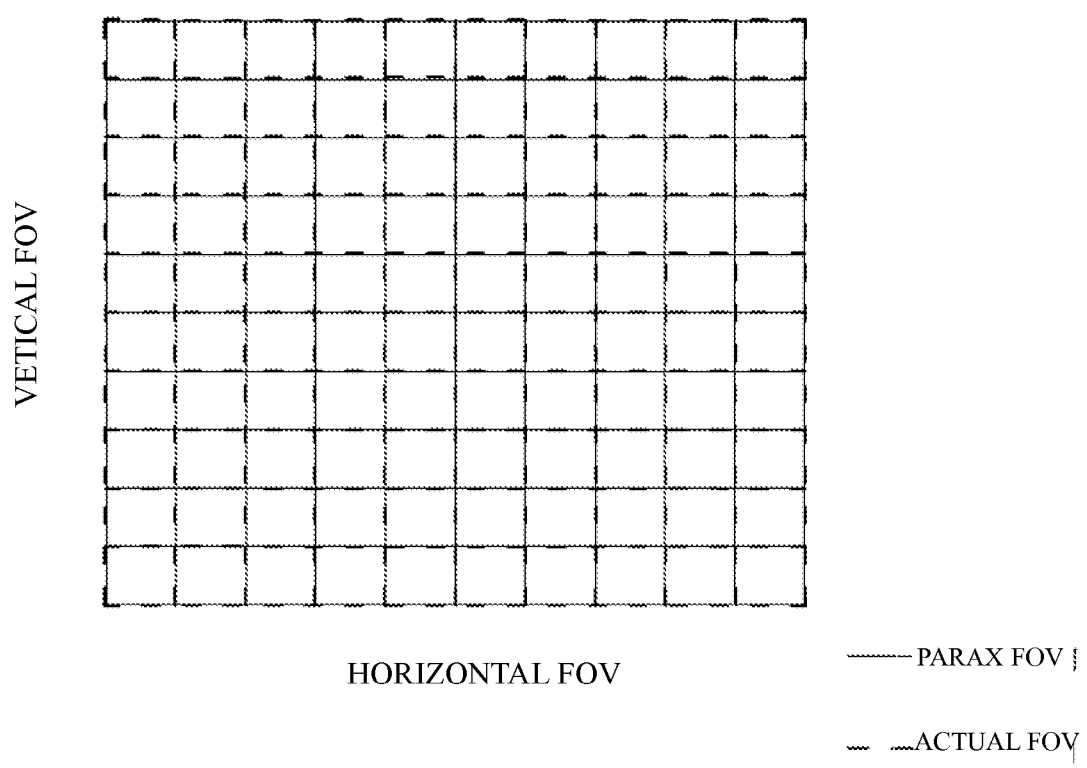
FIG. 2C is a TV distortion grid of the optical image capturing system according to the second embodiment of the present application.

Please refer to FIG. 2A, FIG. 2B, and FIG. 2C, FIG. 2A is a schematic view of the optical image capturing system according to the second embodiment of the present application, FIG. 2B is longitudinal spherical aberration curves, astigmatic field curves, and an optical distortion curve of the optical image capturing system in the order from left to right according to the second embodiment of the present application, and FIG. 2C is a TV distortion grid of the optical image capturing system according to the second embodiment of the present application. As shown in FIG. 2A, sequentially arranged from an object side to an image side, the optical image capturing system includes a first lens element 210, an aperture stop 200, a second lens element 220, a third lens element 230, a fourth lens element 240, an IR filter 270, an image plane 280, and an image sensing device 290.

The first lens element 210 has positive refractive power and it is made of plastic material. The first lens element 210 has a convex object-side surface 212 and a convex image-side surface 214, both of the object-side surface 212 and the image-side surface 214 are aspheric, and the object-side surface 212 has one inflection point.

The second lens element 220 has negative refractive power and it is made of plastic material. The second lens element 220 has a convex object-side surface 222 and a concave image-side surface 224; both of the object-side surface 222 and the image-side surface 224 are aspheric and have two inflection points.

The third lens element 230 has positive refractive power and it is made of plastic material. The third lens element 230 has a concave object-side surface 232 and a convex image-side surface 234 and both of the object-side surface 232 and the image-side surface 234 are aspheric. The object-side surface 232 has four inflection points and the image-side surface 234 has one inflection point.

The fourth lens element 240 has negative refractive power and it is made of plastic material. The fourth lens element 240 has a convex object-side surface 242 and a concave image-side surface 244; both of the object-side surface 242 and the image-side surface 244 are aspheric and have an inflection point.

The IR filter 270 is made of glass material without affecting the focal length of the optical image capturing system and it is disposed between the fourth lens element 240 and the image plane 280.

In the second embodiment of the optical image capturing system, focal lengths of the second lens element 220, the third lens element 230, and the fourth lens element 240 are f2, f3, and f4, respectively. The following relation is satisfied: $|f2|+|f3|=16.0957$ mm, $|f1|+|f4|=9.0045$ mm, and $|f2|+|f3|>|f1|+|f4|$.

In the second embodiment of the optical image capturing system, a central thickness of the third lens element 230 on the optical axis is TP3. A central thickness of the fourth lens element 240 is TP4. The following relation is satisfied: $TP3=0.445178$ mm and $TP4=0.554588$ mm.

In the second embodiment of the optical image capturing system, the first lens element 210 and the third lens element 230 are positive lens elements, and focal lengths of the first lens element 210 and the third lens element 230 are f1 and f3, respectively. A sum of focal lengths of all lens elements with positive refractive power is $\Sigma PP$. The following relation is satisfied: $\Sigma PP=f1+f3$. Hereby, it's favorable for allocating the positive refractive power of the first lens element 210 to others positive lens elements and the significant aberrations generated in the process of moving the incident light can be suppressed.

In the second embodiment of the optical image capturing system, focal lengths of the second lens element 220 and the fourth lens element 240 are f2 and f4, respectively. A sum of focal lengths of all lens elements with negative refractive power is $\Sigma NP$. The following relation is satisfied: $\Sigma NP=f2+f4$. Hereby, it's favorable for allocating the negative refractive power of the fourth lens element 240 to others negative lens elements.

Please refer to the following Table 3 and Table 4.

The detailed data of the optical image capturing system of the second embodiment is as shown in Table 3.

TABLE 3

Data of the optical image capturing system
f = 2.325 mm, f/HEP = 1.6, HAF = 44.0357 deg, tan(HAF) = 0.0.9669

| Surface # | Curvature Radius | Thickness | Material | Index | Abbe # | Focal length |
|---|---|---|---|---|---|---|
| 0 | Object | Plano | 6000 | | | |
| 1 | Ape. stop | Plano | 0.01789 | | | |
| 2 | Lens 1/ | 1.89006 | 0.65111 | Plastic | 1.544 | 56.09 | 3.318 |
| 3 | | −38.00000 | 0.20621 | | | | |
| 4 | Lens 2 | 8.07372 | 0.22445 | Plastic | 1.642 | 22.46 | −13.432 |
| 5 | | 4.14161 | 0.15971 | | | | |
| 6 | Lens 3 | −0.90322 | 0.44518 | Plastic | 1.544 | 56.09 | 2.664 |
| 7 | | −0.65409 | 0.02500 | | | | |
| 8 | Lens 4 | 1.45734 | 0.55459 | Plastic | 1.544 | 56.09 | −5.687 |
| 9 | | 0.85849 | 0.34266 | | | | |
| 10 | IR filter | 1E+18 | 0.220 | BK7_SCHOTT | 1.517 | 64.13 | |
| 11 | | Plano | 0.680 | | | | |
| 12 | Image plane | Plano | | | | | |

Reference wavelength (d-line) = 555 nm, shield position: clear aperture (CA) of the third plano = 0.83 mm, clear aperture (CA) of the sixth plano = 1.05 mm As for the parameters of the aspheric surfaces of the second embodiment, reference is made to Table 4.

TABLE 4

Aspheric Coefficients

| | Surface # | | | |
|---|---|---|---|---|
| | 2 | 3 | 4 | 5 |
| k = | −3.417304E+01 | −5.223000E−11 | 0.000000E+00 | −1.912480E−01 |
| A4 = | 5.375104E−01 | −4.790955E−01 | −1.142745E+00 | −7.065696E−01 |
| A6 = | −2.213051E+00 | 4.220172E−01 | 2.807088E+01 | 3.913050E+00 |
| A8 = | 7.330342E+00 | −1.748764E+00 | −2.448038E+01 | −1.650334E+01 |
| A10 = | −1.822241E+01 | 3.454599E+00 | 9.068157E+01 | 3.368990E+01 |
| A12 = | 2.573815E+01 | −2.210432E+00 | −1.535541E+02 | −3.492242E+01 |
| A14 = | −1.605684E+01 | −1.285217E+00 | 1.236237E+02 | 1.779851E+01 |
| A16 = | 0.000000E+00 | 1.313507E+00 | −3.831969E+01 | −3.511375E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| | Surface # | | | |
|---|---|---|---|---|
| | 6 | 7 | 8 | 9 |
| k = | −3.023323E−01 | −5.443870E+00 | 0.000000E+00 | −5.312119E+00 |
| A4 = | −6.384577E−01 | 1.061410E+01 | 9.111946E−02 | −3.418533E−02 |
| A6 = | 4.292632E+00 | 4.535416E+00 | −1.685274E+00 | −1.262599E−01 |
| A8 = | −1.776124E+01 | −1.330419E+01 | 3.917336E+00 | 1.995589E−01 |
| A10 = | 2.839290E+01 | 2.345173E+01 | −5.327680E+00 | −1.769685E−01 |
| A12 = | −2.120002E+01 | −1.634752E+01 | 4.242562E+00 | 9.068956E−02 |
| A14 = | 6.826051E+00 | −1.543734E+01 | −1.751764E+00 | −2.372973E−02 |
| A16 = | −4.985787E−01 | 3.886608E+01 | 1.526218E−01 | 1.384645E−03 |
| A18 = | 0.000000E+00 | −2.748496E+00 | 1.381885E−01 | 6.474321E−04 |
| A20 = | 0.000000E+00 | 6.756244E+00 | −3.706702E−02 | −1.040397E−04 |

In the second embodiment, the presentation of the aspheric surface formula is similar to that in the first embodiment. Besides, the definitions of parameters in following tables are equal to those in the first embodiment, so the repetitious details need not be given here.

The following content may be deduced from Table 3 and Table 4.

Related inflection point values of second embodiment
(Primary reference wavelength: 555 nm)

| InRS11 | InRS12 | InRS21 | InRS22 | InRS31 | InRS32 |
|---|---|---|---|---|---|
| 0.10069 | −0.22060 | −0.29036 | −0.11099 | −0.10271 | −0.36022 |

| InRS41 | InRS42 | InRSO | InRSI | Σ|InRSI| |
|---|---|---|---|---|
| 0.02729 | 0.10007 | 0.52105 | 0.79187 | 1.31292 |

| Σ|InRSI|/InTL | Σ|InRSI|/HOS | (|InRS22| + |InRS31|)/IN23 | (|InRS32| + |InRS41|)/IN34 |
|---|---|---|---|
| 0.57934 | 0.37417 | 1.3381 | 15.5002 |

| (|InRS31| + |InRS32| + |InRS41| + |InRS42|)/InTL | (|InRS31| + |InRS32| + |InRS41| + |InRS42|)/HOS |
|---|---|
| 0.26047 | 0.16823 |

Related inflection point values of second embodiment
(Primary reference wavelength: 555 nm)

| |f/f1| | |f/f2| | |f/f3| | |f/f4| | |f1/f2| | |f2/f3| |
|---|---|---|---|---|---|
| 0.70081 | 0.17309 | 0.87288 | 0.40882 | 0.24699 | 5.04291 |

| ΣPPR | ΣNPR | ΣPPR/ΣNPR| | ΣPP | ΣNP | f1/ΣPP |
|---|---|---|---|---|---|
| 1.57369 | 0.58191 | 2.70435 | 5.98109 | −19.11909 | 0.55467 |

| f4/ΣNP | IN12/f | |InRS41|/TP4 | |InRS42|/TP4 | |ODT|% | |TDT|% |
|---|---|---|---|---|---|
| 0.29745 | 0.08870 | 0.04921 | 0.18044 | 1.14482 | 0.27439 |

| InTL | HOS | HOS/HOI | InS/HOS | InTL/HOS | ΣTP/InTL |
|---|---|---|---|---|---|
| 2.26624 | 3.50890 | 1.54713 | 1.00510 | 0.64585 | 0.82750 |

| HVT31 | HVT32 | HVT41 | HVT42 | HVT42/HOI | HVT42/HOS |
|---|---|---|---|---|---|
| 0.86012 | 0.932346 | 0.89325 | 1.18833 | 0.52396 | 0.33866 |

The following content may be deduced from Table 3 and Table 4.

Related inflection point values of second embodiment (Primary reference wavelength: 555 nm)

| HIF111 | 0.53932 | HIF111/HOI | 0.23779 | SGI111 | 0.07094 | |SGI111|/(|SGI111| + TP1) | 0.09825 |
|---|---|---|---|---|---|---|---|
| HIF211 | 0.09751 | HIF211/HOI | 0.04299 | SGI211 | 0.00049 | |SGI211|/(|SGI211| + TP2) | 0.00217 |
| HIF212 | 0.77568 | HIF212/HOI | 0.34201 | SGI212 | −0.23711 | |SGI212|/(|SGI212| + TP2) | 0.51372 |
| HIF221 | 0.23749 | HIF221/HOI | 0.10471 | SGI221 | 0.00512 | |SGI221|/(|SGI221| + TP2) | 0.02230 |
| HIF222 | 0.95500 | HIF222/HOI | 0.42107 | SGI222 | −0.10428 | |SGI222|/(|SGI222| + TP2) | 0.31722 |
| HIF311 | 0.31301 | HIF311/HOI | 0.13801 | SGI311 | −0.04666 | |SGI311|/(|SGI311| + TP3) | 0.09486 |

-continued

| Related inflection point values of second embodiment (Primary reference wavelength: 555 nm) | | | | | | |
|---|---|---|---|---|---|---|
| HIF312 | 0.55951 | HIF312/HOI | 0.24670 | SGI312 | −0.09571 | \|SGI312\|/(\|SGI312\| + TP3) 0.17695 |
| HIF313 | 0.71732 | HIF313/HOI | 0.31628 | SGI313 | −0.12366 | \|SGI313\|/(\|SGI313\| + TP3) 0.21739 |
| HIF314 | 1.00992 | HIF314/HOI | 0.44529 | SGI314 | −0.10749 | \|SGI314\|/(\|SGI314\| + TP3) 0.19449 |
| HIF321 | 0.70007 | HIF321/HOI | 0.30867 | SGI321 | −0.28301 | \|SGI321\|/(\|SGI321\| + TP3) 0.38865 |
| HIF411 | 0.49013 | HIF411/HOI | 0.21610 | SGI411 | 0.07631 | \|SGI411\|/(\|SGI411\| + TP4) 0.12095 |
| HIF421 | 0.54232 | HIF421/HOI | 0.23912 | SGI421 | 0.12430 | \|SGI421\|/(\|SGI421\| + TP4) 0.18309 |

The Third Embodiment (Embodiment 3)

Figure 3A:
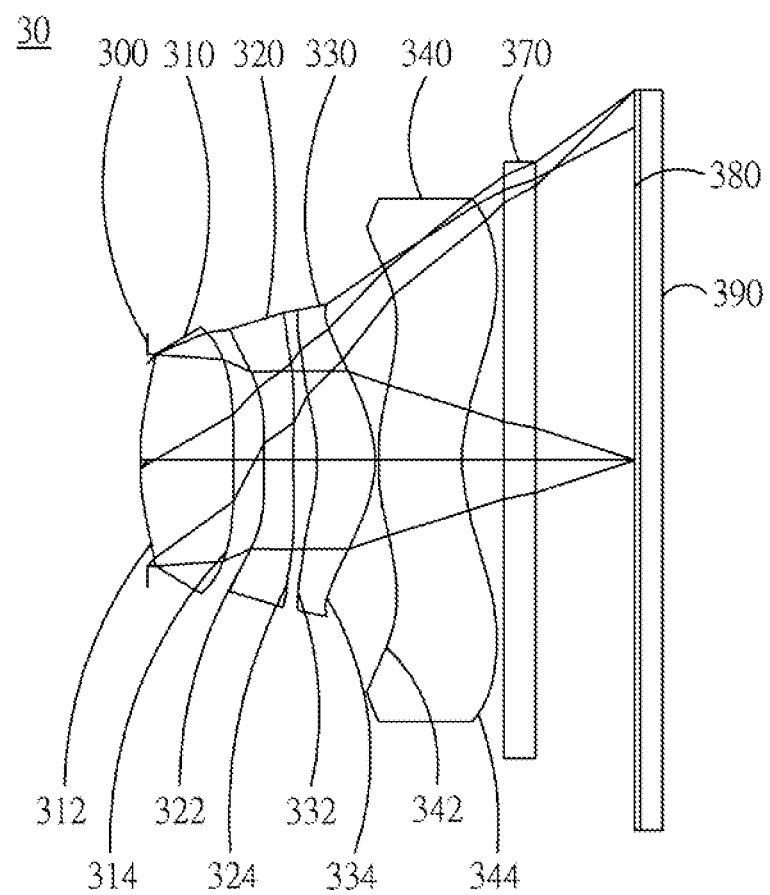
FIG. 3A is a schematic view of the optical image capturing system according to the third embodiment of the present application.
Figure 3B:
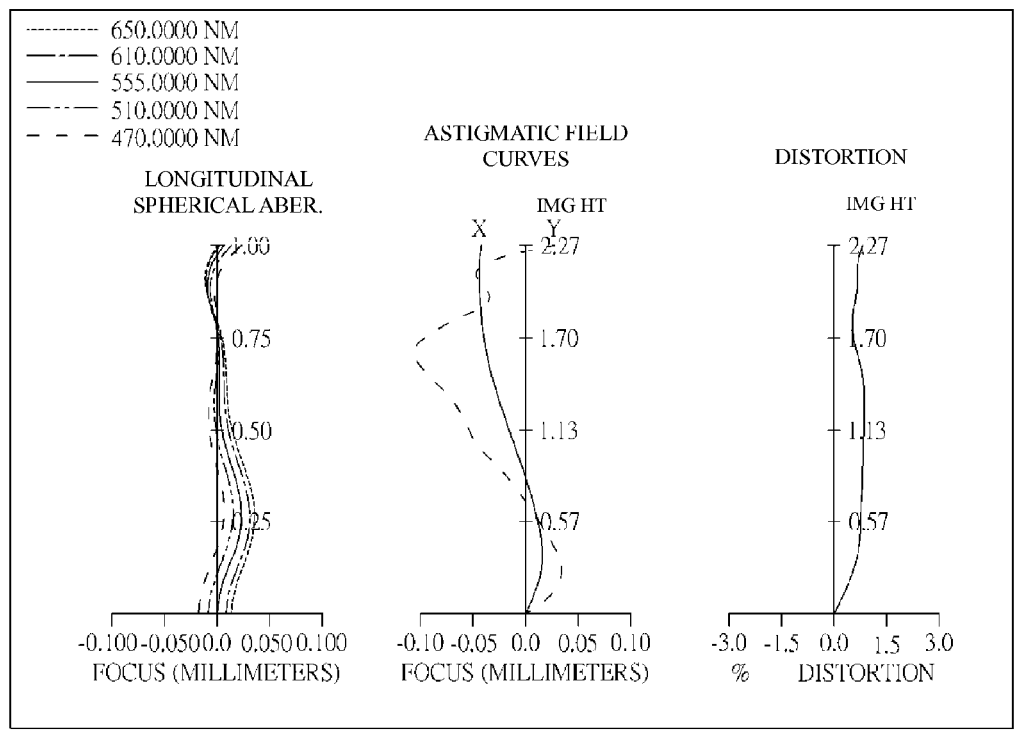
FIG. 3B is longitudinal spherical aberration curves, astigmatic field curves, and an optical distortion grid of the optical image capturing system in the order from left to right according to the third embodiment of the present application.
Figure 3C:
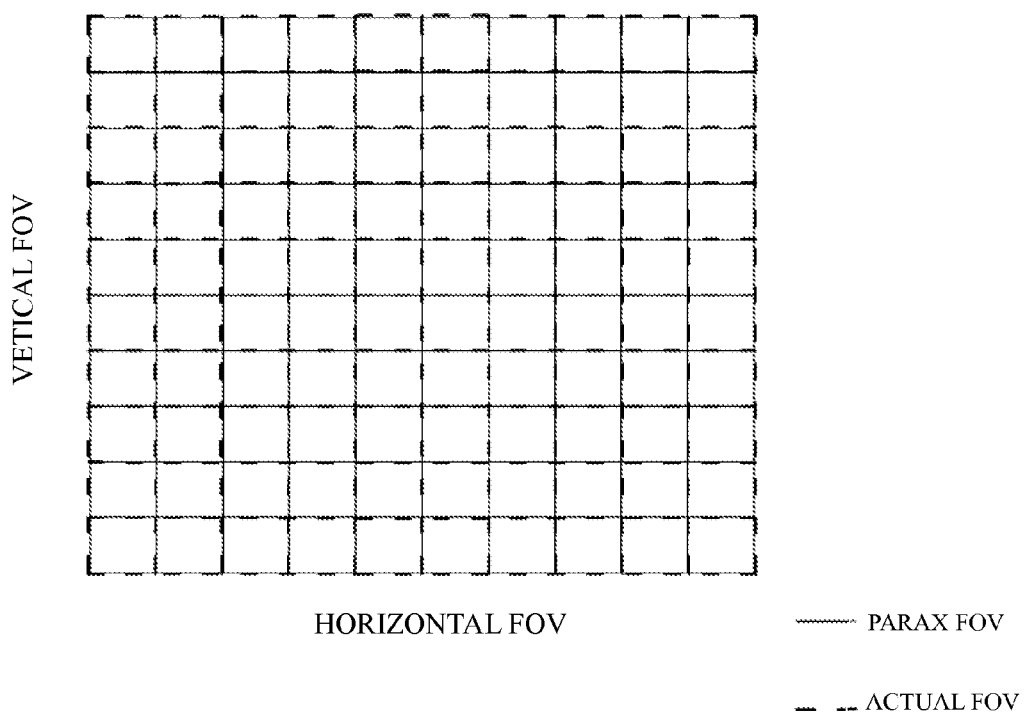
FIG. 3C is a TV distortion grid of the optical image capturing system according to the third embodiment of the present application.

Please refer to FIG. 3A, FIG. 3B and FIG. 3C, FIG. 3A is a schematic view of the optical image capturing system according to the third embodiment of the present application, FIG. 3B is longitudinal spherical aberration curves, astigmatic field curves, and an optical distortion curve of the optical image capturing system in the order from left to right according to the third embodiment of the present application, and FIG. 3C is a TV distortion grid of the optical image capturing system according to the third embodiment of the present application. As shown in FIG. 3A, sequentially arranged from an object side to an image side, the optical image capturing system includes first lens element 310, an aperture stop 300, a second lens element 320, a third lens element 330, a fourth lens element 340, an IR filter 370, an image plane 380, and an image sensing device 390.

The first lens element 310 has positive refractive power and it is made of plastic material. The first lens element 310 has a convex object-side surface 312 and a convex image-side surface 314, both of the object-side surface 312 and the image-side surface 314 are aspheric, and the object-side surface 312 has one inflection point.

The second lens element 320 has negative refractive power and it is made of plastic material. The second lens element 320 has a convex object-side surface 322 and a concave image-side surface 324, and both of the object-side surface 322 and the image-side surface 324 are aspheric. The object-side surface 322 has four inflection points and the image-side surface 324 has three inflection points.

The third lens element 330 has positive refractive power and it is made of plastic material. The third lens element 330 has a concave object-side surface 332 and a convex image-side surface 334 and both of the object-side surface 332 and the image-side surface 334 are aspheric. The object-side surface 332 has four inflection points and image-side surface 334 has one inflection point.

The fourth lens element 340 has negative refractive power and it is made of plastic material. The fourth lens element 340 has a convex object-side surface 342 and a concave image-side surface 344; both of the object-side surface 342 and the image-side surface 344 are aspheric and have one inflection point.

The IR filter 370 is made of glass material without affecting the focal length of the optical image capturing system and it is disposed between the fourth lens element 340 and the image plane 380.

In the third embodiment of the optical image capturing system, focal lengths of the second lens element 320, the third lens element 330, and the fourth lens element 340 are f2, f3, and f4, respectively. The following relation is satisfied: |f2|+|f3|=11.3581 mm, |f1|+|f4|=9.7876 mm, and |f2|+|f3|>|f1|+|f4|.

In the third embodiment of the optical image capturing system, a central thickness of the third lens element 330 on the optical axis is TP3. A central thickness of the fourth lens element 340 on the optical axis is TP4. The following relation is satisfied: TP3=0.395 mm and TP4=0.573 mm.

In the third embodiment of the optical image capturing system, a sum of all the lens elements having positive refractive power is ΣPP, and following relation is satisfied: ΣPP=f1+f3. Hereby, it's favorable for allocating the positive refractive power of the first lens element 310 to others positive lens elements and the significant aberrations generated in the process of moving the incident light can be suppressed.

In the third embodiment of the optical image capturing system, a sum of all the lens elements having negative refractive power is ΣNP, and following relation is satisfied: ΣNP=f2+f4. Hereby, it's favorable for allocating the negative refractive power of the fourth lens element 340 to others negative lens elements and the significant aberrations generated in the process of moving the incident light can be suppressed.

Please refer to the following Table 5 and Table 6.

The detailed data of the optical image capturing system of the third embodiment is as shown in Table 5.

TABLE 5

Third Embodiment
f = 2.325 mm, f/HEP = 1.8, HAF = 44.040 deg, tan(HAF) = 0.9670

| Surface# | | Curvature Radius | Thickness | Material | Index | Abbe # | Focal length |
|---|---|---|---|---|---|---|---|
| 0 | Object | Plano | 6000 | | | | |
| 1 | Ape. stop | Plano | −0.04799 | | | | |
| 2 | Lens 1 | 1.68806 | 0.63764 | Plastic | 1.544 | 56.09 | 2.978 |
| 3 | | −37.93145 | 0.20745 | | | | |
| 4 | Lens 2 | 37.98010 | 0.20339 | Plastic | 1.642 | 22.46 | −8.437 |
| 5 | | 4.76699 | 0.16198 | | | | |
| 6 | Lens 3 | −0.94948 | 0.39462 | Plastic | 1.544 | 56.09 | 2.921 |
| 7 | | −0.68242 | 0.02500 | | | | |
| 8 | Lens 4 | 1.46476 | 0.57257 | Plastic | 1.544 | 56.09 | −6.810 |
| 9 | | 0.90570 | 0.28828 | | | | |
| 10 | IR filter | Plano | 0.22000 | BK7_SCHOTT | 1.517 | 64.13 | |

TABLE 5-continued

Third Embodiment
f = 2.325 mm, f/HEP = 1.8, HAF = 44.040 deg, tan(HAF) = 0.9670

| Surface# | Curvature Radius | Thickness | Material | Index | Abbe # | Focal length |
|---|---|---|---|---|---|---|
| 11 | | Plano | 0.67999 | | | |
| 12 | Image plane | Plano | | | | |

Reference wavelength (d-line) = 555 nm; shield position: clear aperture (CA) of the third plano = 0.82 mm, clear aperture (CA) of the sixth plano = 0.92

As for the parameters of the aspheric surfaces of the third embodiment, reference is made to Table 6.

TABLE 6

Aspheric Coefficients

| | Surface # | | | |
|---|---|---|---|---|
| | 2 | 3 | 4 | 5 |
| k = | −3.425515E+01 | −5.223000E−11 | 0.000000E+00 | −1.912480E−01 |
| A4 = | 7.257719E−01 | −6.178485E−01 | −1.614845E+00 | −1.271938E+00 |
| A6 = | −2.910023E+00 | 1.974362E+00 | 7.960499E+00 | 8.648249E+00 |
| A8 = | 7.983636E+00 | −1.184693E+01 | −6.078987E+01 | −3.887624E+01 |
| A10 = | −1.520310E+01 | 3.474212E+01 | 2.337090E+02 | 9.228729E+01 |
| A12 = | 1.678319E+01 | −4.821522E+01 | −4.392183E+02 | −1.161396E+02 |
| A14 = | −9.669524E+00 | 2.702001E+01 | 4.015331E+02 | 7.457293E+01 |
| A16 = | 0.000000E+00 | −2.646460E+01 | −1.436587E+02 | −1.953453E+01 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| | Surface # | | | |
|---|---|---|---|---|
| | 6 | 7 | 8 | 9 |
| k = | −9.247001E−02 | −5.289811E+00 | 0.000000E+00 | −3.909467E+00 |
| A4 = | 1.561938E−01 | −1.169554E+00 | −1.097009E−01 | −2.851778E−01 |
| A6 = | 8.279597E+00 | 5.036631E+00 | −1.137933E+00 | 4.816995E−01 |
| A8 = | −3.279096E+01 | −1.205612E+01 | 3.525612E+00 | −7.313012E−01 |
| A10 = | 6.006395E+01 | 1.525972E+01 | −6.538483E+00 | 7.594586E−01 |
| A12 = | −6.016423E+01 | 5.602726E+00 | 7.658330E+00 | −5.319986E−01 |
| A14 = | 3.381283E+01 | −5.549215E+01 | −5.707272E+00 | 2.453402E−01 |
| A16 = | −8.683174E+00 | 8.417923E+01 | 2.616814E+00 | −7.095585E−02 |
| A18 = | 0.000000E+00 | −5.397398E+01 | −6.692867E−01 | 1.160519E−02 |
| A20 = | 0.000000E+00 | 1.264502E+01 | 7.262810E−02 | −8.164472E−04 |

In the third embodiment, the presentation of the aspheric surface formula is similar to that in the first embodiment. Besides, the definitions of parameters in following tables are equal to those in the first embodiment, so the repetitious details need not be given here.

The following content may be deduced from Table 5 and Table 6.

Third embodiment (Primary reference wavelength: 555 nm)

| InRS11 | InRS12 | InRS21 | InRS22 | InRS31 | InRS32 |
|---|---|---|---|---|---|
| 0.10461 | −0.18465 | −0.23956 | −0.07223 | −0.13453 | −0.32745 |

| InRS41 | InRS42 | InRSO | InRSI | Σ|InRS| | |
|---|---|---|---|---|---|
| 0.02958 | 0.06807 | 0.50827 | 0.65240 | 1.16067 | |

| Σ|InRS|/InTL | Σ|InRS|/HOS | (|InRS22| + |InRS31|)/IN23 | (|InRS32| + |InRS41|)/IN34 |
|---|---|---|---|
| 0.52694 | 0.34229 | 1.2764 | 14.2811 |

Third embodiment (Primary reference wavelength: 555 nm)

| (|InRS31| + |InRS32| + |InRS41| + |InRS42|)/InTL | (|InRS31| + |InRS32| + |InRS41| + |InRS42|)/HOS |
|---|---|
| 0.25407 | 0.16504 |

| |f/f1| | |f/f2| | |f/f3| | |f/f4| | |f1/f2| | |f2/f3| |
|---|---|---|---|---|---|
| 0.78086 | 0.27557 | 0.79607 | 0.34142 | 0.35290 | 2.88884 |

| ΣPPR | ΣNPR | ΣPPR/|ΣNPR| | ΣPP | ΣNP | f1/ΣPP |
|---|---|---|---|---|---|
| 1.57693 | 0.61699 | 2.55586 | 5.89826 | −15.24740 | 0.50482 |

| f4/ΣNP | IN12/f | |InRS41|/TP4 | |InRS42|/TP4 | |ODT|% | |TDT|% |
|---|---|---|---|---|---|
| 0.44663 | 0.08922 | 0.05166 | 0.11889 | 0.86895 | 0.34813 |

| InTL | HOS | HOS/HOI | InS/HOS | InTL/HOS | ΣTP/InTL |
|---|---|---|---|---|---|

-continued

Third embodiment (Primary reference wavelength: 555 nm)

| 2.20265 | 3.39092 | 1.49511 | 0.98585 | 0.64957 | 0.82093 |
|---------|---------|---------|---------|---------|---------|
| HVT31 | HVT32 | HVT41 | HVT42 | HVT42/HOI | HVT42/HOS |
| 0 | 0.895136 | 0.84448 | 1.12732 | 0.49705 | 0.33245 |

The following content may be deduced from Table 5 and Table 6.

| Related inflection point values of third embodiment (Primary reference wavelength: 555 nm) | | | | | |
|---|---|---|---|---|---|
| HIF111 | 0.53416 | HIF111/HOI | 0.23552 | SGI111 | 0.07808 | \|SGI111\|/(\|SGI111\| + TP1) | 0.10910 |
| HIF211 | 0.03719 | HIF211/HOI | 0.01640 | SGI211 | 0.00002 | \|SGI211\|/(\|SGI211\| + TP2) | 0.00007 |
| HIF212 | 0.60337 | HIF212/HOI | 0.26604 | SGI212 | −0.12496 | \|SGI212\|/(\|SGI212\| + TP2) | 0.38056 |
| HIF213 | 0.68664 | HIF213/HOI | 0.30275 | SGI213 | −0.17326 | \|SGI213\|/(\|SGI213\| + TP2) | 0.45999 |
| HIF214 | 0.73931 | HIF214/HOI | 0.32597 | SGI214 | −0.20360 | \|SGI214\|/(\|SGI214\| + TP2) | 0.50025 |
| HIF221 | 0.13771 | HIF221/HOI | 0.06072 | SGI221 | 0.00159 | \|SGI221\|/(\|SGI221\| + TP2) | 0.00774 |
| HIF222 | 0.64356 | HIF222/HOI | 0.28376 | SGI222 | −0.02662 | \|SGI222\|/(\|SGI222\| + TP2) | 0.11575 |
| HIF223 | 0.79680 | HIF223/HOI | 0.35132 | SGI223 | −0.05027 | \|SGI223\|/(\|SGI223\| + TP2) | 0.19818 |
| HIF311 | 0.30773 | HIF311/HOI | 0.13568 | SGI311 | −0.04491 | \|SGI311\|/(\|SGI311\| + TP3) | 0.10217 |
| HIF312 | 0.55378 | HIF312/HOI | 0.24417 | SGI312 | −0.09208 | \|SGI312\|/(\|SGI312\| + TP3) | 0.18920 |
| HIF313 | 0.70413 | HIF313/HOI | 0.31046 | SGI313 | −0.11661 | \|SGI313\|/(\|SGI313\| + TP3) | 0.22809 |
| HIF314 | 0.87229 | HIF314/HOI | 0.38461 | SGI314 | −0.13291 | \|SGI314\|/(\|SGI314\| + TP3) | 0.25195 |
| HIF321 | 0.56416 | HIF321/HOI | 0.24875 | SGI321 | −0.19166 | \|SGI321\|/(\|SGI321\| + TP3) | 0.32691 |
| HIF411 | 0.46996 | HIF411/HOI | 0.20721 | SGI411 | 0.06554 | \|SGI411\|/(\|SGI411\| + TP4) | 0.10271 |
| HIF421 | 0.52205 | HIF421/HOI | 0.23018 | SGI421 | 0.11074 | \|SGI421\|/(\|SGI421\| + TP4) | 0.16207 |

The Fourth Embodiment (Embodiment 4)

Figure 4A:
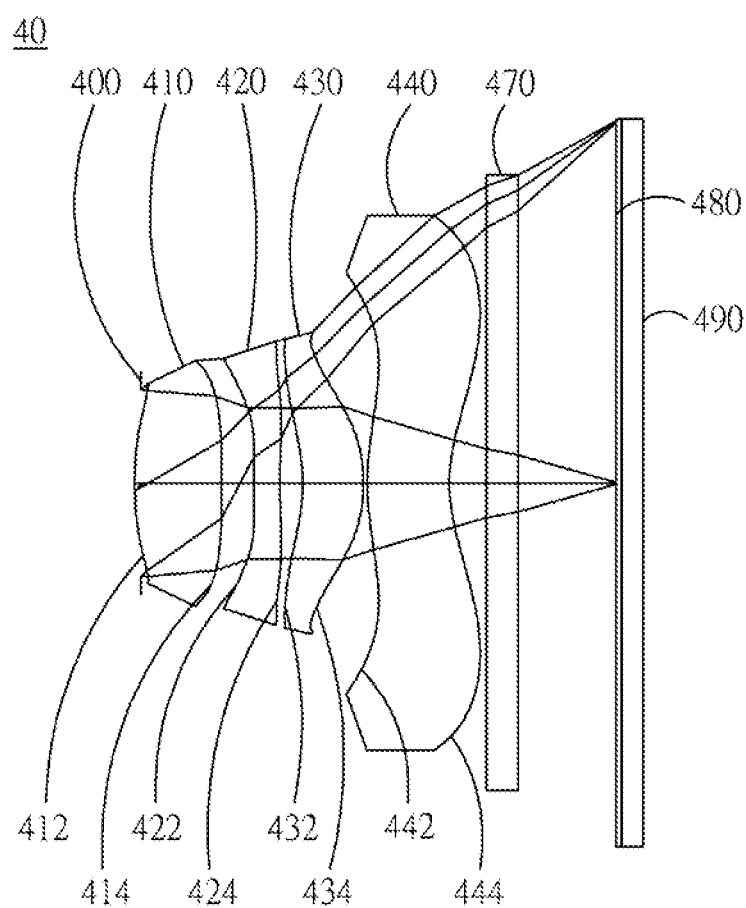
FIG. 4A is a schematic view of the optical image capturing system according to the fourth embodiment of the present application.
Figure 4B:
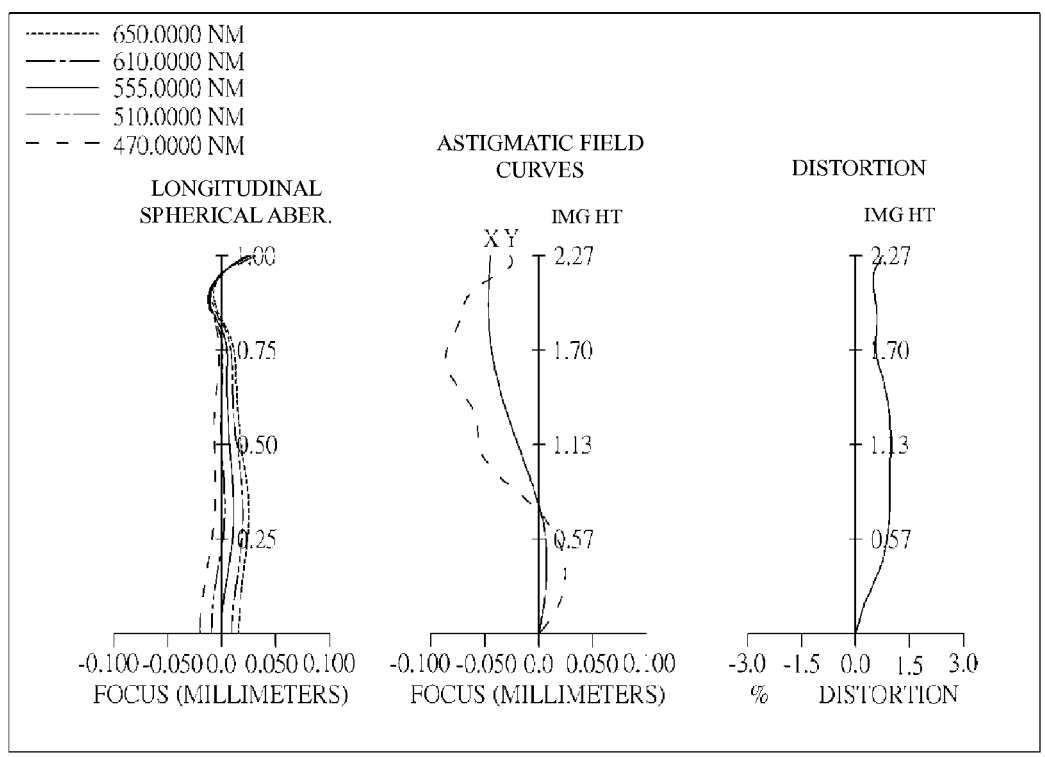
FIG. 4B is longitudinal spherical aberration curves, astigmatic field curves, and an optical distortion grid of the optical image capturing system in the order from left to right according to the fourth embodiment of the present application.
Figure 4C:
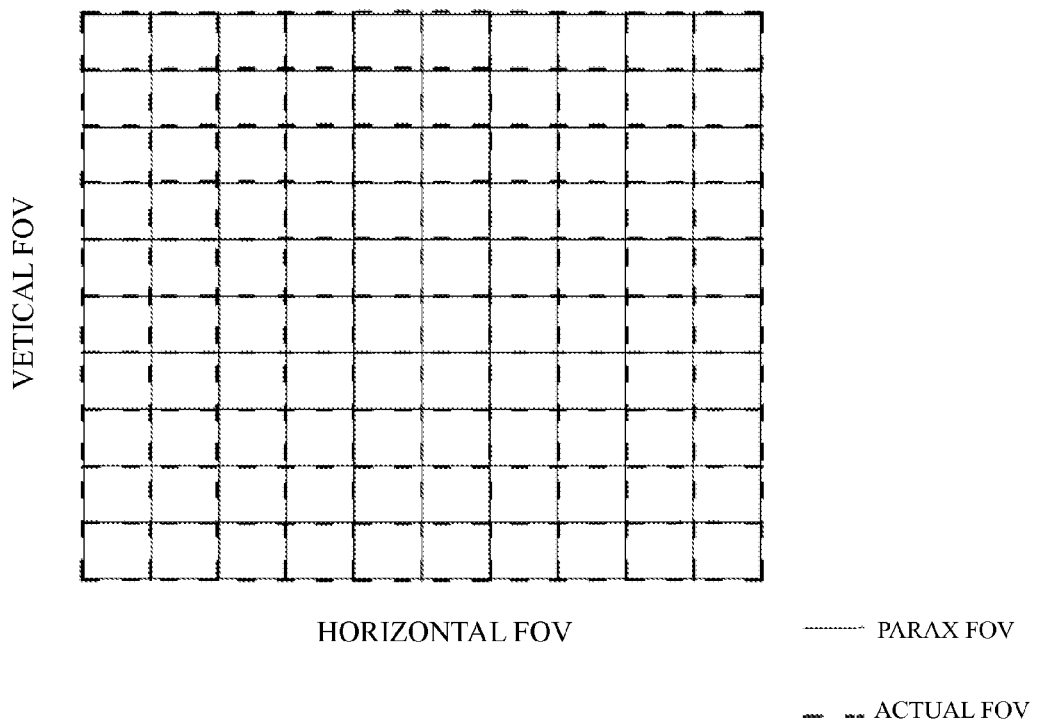
FIG. 4C is a TV distortion grid of the optical image capturing system according to the fourth embodiment of the present application.

Please refer to FIG. 4A, FIG. 4B and FIG. 4C, FIG. 4A is a schematic view of the optical image capturing system according to the fourth embodiment of the present application, FIG. 4B is longitudinal spherical aberration curves, astigmatic field curves, and an optical distortion curve of the optical image capturing system in the order from left to right according to the fourth embodiment of the present application, and FIG. 4C is a TV distortion grid of the optical image capturing system according to the fourth embodiment of the present application. As shown in FIG. 4A, sequentially arranged from an object side to an image side, the optical image capturing system includes a first lens element 410, an aperture stop 400, a second lens element 420, a third lens element 430, a fourth lens element 440, an IR filter 470, an image plane 480, and an image sensing device 490.

The first lens element 410 has positive refractive power and it is made of plastic material. The first lens element 410 has a convex object-side surface 412 and a convex image-side surface 414, and both of the object-side surface 412 and the image-side surface 414 are aspheric. The object-side surface 412 has one inflection point.

The second lens element 420 has negative refractive power and it is made of plastic material. The second lens element 420 has a convex object-side surface 422 and a concave image-side surface 424, and both of the object-side surface 422 and the image-side surface 424 are aspheric. The object-side surface 422 has four inflection points and the image-side surface 424 has three inflection points.

The third lens element 430 has positive refractive power and it is made of plastic material. The third lens element 430 has a concave object-side surface 432 and a convex image-side surface 434 and both of the object-side surface 432 and the image-side surface 434 are aspheric. The object-side surface 432 has two inflection points and the image-side surface 434 has one inflection point.

The fourth lens element 440 has negative refractive power and it is made of plastic material. The fourth lens element 440 has a convex object-side surface 442 and a concave image-side surface 444 and both of the object-side surface 442 and the image-side surface 444 are aspheric. The object-side surface 442 has two inflection points and the image-side surface 444 has one inflection point.

The IR filter 470 is made of glass material without affecting the focal length of the optical image capturing system and it is disposed between the fourth lens element 440 and the image plane 480.

In the fourth embodiment of the optical image capturing system, focal lengths of the second lens element 420, the third lens element 430, and the fourth lens element 440 are f2, f3, and f4, respectively. The following relation is satisfied: |f2|+|f3|=15.8145 mm, |f1|+|f4|=8.9899 mm and |f2|+|f3|>|f1|+|f4|.

In the fourth embodiment of the optical image capturing system, a central thickness of the third lens element 430 on the optical axis is TP3. A central thickness of the fourth lens element 440 on the optical axis is TP4. The following relation is satisfied: TP3=0.423 mm and TP4=0.571 mm.

In the fourth embodiment of the optical image capturing system, a sum of focal lengths of all lens elements with positive refractive power is ΣPP. The following relation is satisfied: ΣPP=f1+f3. Hereby it's favorable for allocating the positive refractive power of the first lens element 410 to others positive lens elements and the significant aberrations generated in the process of moving the incident light can be suppressed.

In the fourth embodiment of the optical image capturing system, a sum of focal lengths of all lens elements with negative refractive power is ΣNP. The following relation is satisfied: ΣNP=f2+f4. Hereby, it's favorable for allocating the negative refractive power of the fourth lens element 440 to others negative lens elements.

Please refer to the following Table 7 and Table 8.

The detailed data of the optical image capturing system of the fourth embodiment is as shown in Table 7.

In the fourth embodiment, the presentation of the aspheric surface formula is similar to that in the first embodiment. Besides, the definitions of parameters in following tables are equal to those in the first embodiment, so the repetitious details need not be given here.

The following content may be deduced from Table 7 and Table 8.

| Fourth embodiment (Primary reference wavelength: 555 nm) | | | | | |
|---|---|---|---|---|---|
| InRS11 | InRS12 | InRS21 | InRS22 | InRS31 | InRS32 |

TABLE 7

Data of the optical image capturing system
f = 2.325 mm, f/HEP = 2.0, HAF = 44.068 deg, tan(HAF) = 0.9680

| Surface # | | Curvature Radius | Thickness | Material | Index | Abbe # | Focal length |
|---|---|---|---|---|---|---|---|
| 0 | Object | Plano | 6000 | | | | |
| 1 | Ape. stop | Plano | −0.04798 | | | | |
| 2 | Lens 1 | 1.65762 | 0.60657 | Plastic | 1.544 | 56.09 | 2.926 |
| 3 | | −37.99993 | 0.22443 | | | | |
| 4 | Lens 2 | 11.47068 | 0.18046 | Plastic | 1.642 | 22.46 | −12.679 |
| 5 | | 4.75599 | 0.15882 | | | | |
| 6 | Lens 3 | −0.94962 | 0.42324 | Plastic | 1.544 | 56.09 | 3.135 |
| 7 | | −0.70687 | 0.02500 | | | | |
| 8 | Lens 4 | 1.51309 | 0.57126 | Plastic | 1.544 | 56.09 | −6.064 |
| 9 | | 0.90000 | 0.25806 | | | | |
| 10 | IR filter | Plano | 0.22000 | BK7_SCHOTT | 1.517 | 64.13 | |
| 11 | | Plano | 0.67999 | | | | |
| 12 | Image Plane | Plano | | | | | |

Reference wavelength (d-line) = 555 nm

As for the parameters of the aspheric surfaces of the fourth embodiment, reference is made to Table 8.

TABLE 8

Aspheric Coefficients

| | Surface # | | | |
|---|---|---|---|---|
| | 2 | 3 | 4 | 5 |
| k = | 8.302854E−01 | 4.881834E+01 | 0.000000E+00 | −1.912480E−01 |
| A4 = | −1.765227E−01 | −5.806911E−01 | −1.071184E+00 | −3.020078E−01 |
| A6 = | 9.834476E−01 | 2.011327E+00 | 1.832236E+00 | 9.194236E−02 |
| A8 = | −6.643524E+00 | −1.272646E+01 | −2.322934E+01 | −3.651488E+00 |
| A10 = | 1.799700E+01 | 3.873696E+01 | 9.778167E+01 | 1.355828E+01 |
| A12 = | −1.945207E+01 | −5.406364E+01 | −1.531875E+02 | −1.595777E+01 |
| A14 = | 0.000000E+00 | 2.684134E+01 | 8.257803E+01 | 6.015506E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| | Surface # | | | |
|---|---|---|---|---|
| | 6 | 7 | 8 | 9 |
| k = | 0.000000E+00 | −3.823090E+00 | 0.000000E+00 | −3.580216E+00 |
| A4 = | 1.096976E+00 | −4.996979E−01 | −2.299544E−01 | −3.274147E−01 |
| A6 = | −3.435160E−01 | 3.961761E−01 | −1.682606E+00 | 2.892954E−01 |
| A8 = | −1.571292E+00 | −7.786261E−02 | 6.232887E+00 | −1.179757E−01 |
| A10 = | 2.444153E+00 | 6.491055E+00 | −1.184832E+01 | −6.171716E−02 |
| A12 = | −6.334892E−01 | −2.860788E+01 | 1.360466E+01 | 9.763648E−02 |
| A14 = | −4.743407E−02 | 6.485186E+01 | −9.704043E+00 | −4.829427E−02 |
| A16 = | 0.000000E+00 | −8.789851E+01 | 4.168711E+00 | 1.112743E−02 |
| A18 = | 0.000000E+00 | 6.570013E+01 | −9.773318E−01 | −1.011352E−03 |
| A20 = | 0.000000E+00 | −2.031346E+01 | 9.490940E−02 | 0.000000E+00 |

-continued

| Fourth embodiment (Primary reference wavelength: 555 nm) | | | | | |
|---|---|---|---|---|---|
| 0.09903 | −0.18432 | −0.21034 | −0.03318 | −0.12394 | −0.35467 |
| InRS41 | | InRS42 | InRSO | InRSI | Σ\|InRS\| |
| −0.08447 | | −0.11004 | 0.51777 | 0.68220 | 1.19997 |
| Σ\|InRS\|/InTL | | Σ\|InRS\|/HOS | (\|InRS22\| + \|InRS31\|)/IN23 | (\|InRS32\| + \|InRS41\|)/IN34 | |
| 0.54799 | | 0.35843 | 0.9893 | 17.5653 | |
| (\|InRS31\| + \|InRS32\| + \|InRS41\| + \|InRS42\|)/InTL | | | (\|InRS31\| + \|InRS32\| + \|InRS41\| + \|InRS42\|)/HOS | | |
| 0.30738 | | | 0.20106 | | |
| \|f/f1\| | \|f/f2\| | \|f/f3\| | \|f/f4\| | \|f1/f2\| | \|f2/f3\| |
| 0.79468 | 0.18336 | 0.74149 | 0.38337 | 0.23074 | 4.04389 |
| ΣPPR | ΣNPR | ΣPPR/\|ΣNPR\| | ΣPP | ΣNP | f1/ΣPP |
| 1.53618 | 0.56673 | 2.71061 | 6.06089 | −18.74344 | 0.48269 |
| f4/ΣNP | IN12/f | \|InRS41\|/TP4 | \|InRS42\|/TP4 | \|ODT\|% | \|TDT\|% |
| 0.32354 | 0.09654 | 0.14786 | 0.19262 | 1.00315 | 0.40168 |
| InTL | HOS | HOS/HOI | InS/HOS | InTL/HOS | ΣTP/InTL |
| 2.18978 | 3.34783 | 1.47612 | 0.98567 | 0.65409 | 0.81357 |
| HVT31 | HVT32 | HVT41 | HVT42 | HVT42/HOI | HVT42/HOS |
| 0.820411 | 0.88994 | 0.72924 | 1.07209 | 0.47270 | 0.32023 |

The following content may be deduced from Table 7 and Table 8.

| Related inflection point values of fourth embodiment (Primary reference wavelength: 555 nm) | | | | | | | |
|---|---|---|---|---|---|---|---|
| HIF111 | 0.51852 | HIF111/HOI | 0.22862 | SGI111 | 0.07467 | \|SGI111\|/(\|SGI111\| + TP1) | 0.10961 |
| HIF211 | 0.08339 | HIF211/HOI | 0.03677 | SGI211 | 0.00025 | \|SGI211\|/(\|SGI211\| + TP2) | 0.00139 |
| HIF212 | 0.58955 | HIF212/HOI | 0.25994 | SGI212 | −0.09980 | \|SGI212\|/(\|SGI212\| + TP2) | 0.35610 |
| HIF213 | 0.65180 | HIF213/HOI | 0.28739 | SGI213 | −0.13219 | \|SGI213\|/(\|SGI213\| + TP2) | 0.42280 |
| HIF214 | 0.77230 | HIF214/HOI | 0.34052 | SGI214 | −0.20448 | \|SGI214\|/(\|SGI214\| + TP2) | 0.53120 |
| HIF221 | 0.23258 | HIF221/HOI | 0.10255 | SGI221 | 0.00480 | \|SGI221\|/(\|SGI221\| + TP2) | 0.02588 |
| HIF222 | 0.61119 | HIF222/HOI | 0.26948 | SGI222 | −0.00768 | \|SGI222\|/(\|SGI222\| + TP2) | 0.04083 |
| HIF223 | 0.78283 | HIF223/HOI | 0.34516 | SGI223 | −0.02059 | \|SGI223\|/(\|SGI223\| + TP2) | 0.10242 |
| HIF311 | 0.34196 | HIF311/HOI | 0.15078 | SGI311 | −0.04950 | \|SGI311\|/(\|SGI311\| + TP3) | 0.10471 |
| HIF312 | 0.86546 | HIF312/HOI | 0.38160 | SGI312 | −0.12418 | \|SGI312\|/(\|SGI312\| + TP3) | 0.22684 |
| HIF321 | 0.60763 | HIF321/HOI | 0.26792 | SGI321 | −0.22931 | \|SGI321\|/(\|SGI321\| + TP3) | 0.35141 |
| HIF411 | 0.36937 | HIF411/HOI | 0.16286 | SGI411 | 0.03890 | \|SGI411\|/(\|SGI411\| + TP4) | 0.06376 |
| HIF412 | 1.19925 | HIF412/HOI | 0.52877 | SGI412 | −0.07039 | \|SGI412\|/(\|SGI412\| + TP4) | 0.10970 |
| HIF421 | 0.46052 | HIF421/HOI | 0.20305 | SGI421 | 0.09048 | \|SGI421\|/(\|SGI421\| + TP4) | 0.13673 |

The Fifth Embodiment (Embodiment 5)

Figure 5A:
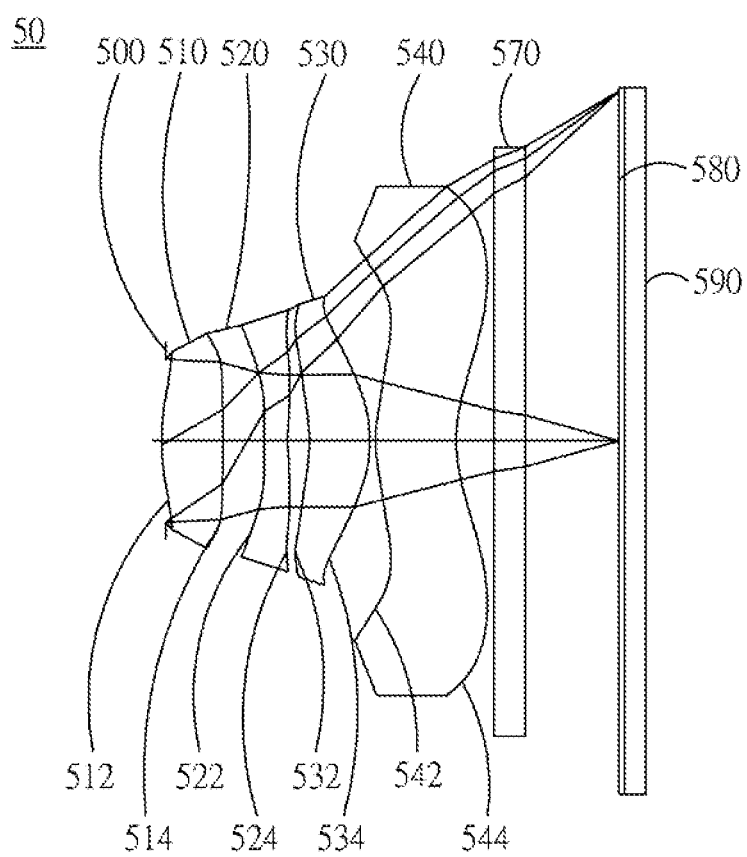
FIG. 5A is a schematic view of the optical image capturing system according to the fifth embodiment of the present application.
Figure 5B:
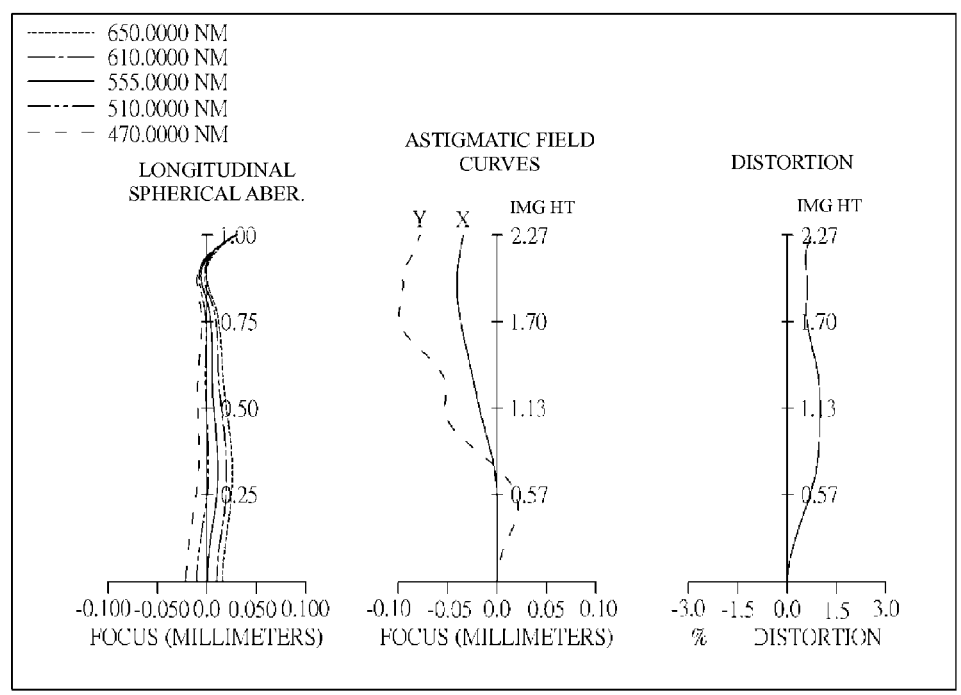
FIG. 5B is longitudinal spherical aberration curves, astigmatic field curves, and an optical distortion grid of the optical image capturing system in the order from left to right according to the fifth embodiment of the present application.
Figure 5C:
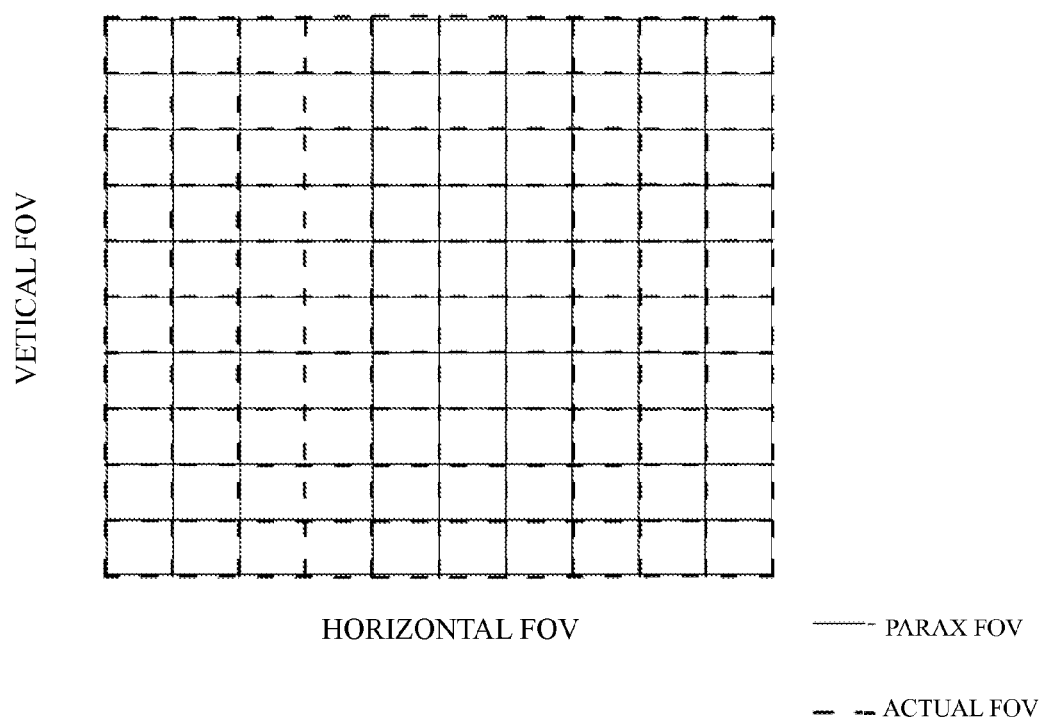
FIG. 5C is a TV distortion grid of the optical image capturing system according to the fifth embodiment of the present application.

Please refer to FIG. 5A, FIG. 5B and FIG. 5C, FIG. 5A is a schematic view of the optical image capturing system according to the fifths embodiment of the present application, FIG. 5B is longitudinal spherical aberration curves, astigmatic field curves, and an optical distortion curve of the optical image capturing system in the order from left to right according to the fifth embodiment of the present application, and FIG. 5C is a TV distortion grid of the optical image capturing system according to the fifth embodiment of the present application. As shown in FIG. 5A, sequentially arranged from an object side to an image side, the optical image capturing system includes a first lens element 510, an aperture stop 500, a second lens element 520, a third lens element 530, a fourth lens element 540, an IR filter 570, an image plane 580, and an image sensing device 590.

The first lens element 510 has positive refractive power and it is made of plastic material. The first lens element 510 has a convex object-side surface 512 and a convex image-side surface 514, both of the object-side surface 512 and the image-side surface 514 are aspheric, and the object-side surface 512 has one inflection point.

The second lens element 520 has negative refractive power and it is made of plastic material. The second lens element 520 has a convex object-side surface 522 and a concave image-side surface 524, both of the object-side surface 522 and the image-side surface 524 are aspheric, and the object-side surface 522 has four inflection points and the image-side surface 524 has three inflection points.

The third lens element 530 has positive refractive power and it is made of plastic material. The third lens element 530 has a concave object-side surface 532 and a convex image-side surface 534, both of the object-side surface 532 and the image-side surface 534 are aspheric, and the object-side surface 532 has two inflection points and the image-side surface 534 has one inflection point.

The fourth lens element 540 has negative refractive power and it is made of plastic material. The fourth lens element 540 has a convex object-side surface 542 and a concave image-side surface 544, both of the object-side surface 542 and the image-side surface 544 are aspheric, and the object-side surface 542 has two inflection points and the image-side surface 524 has one inflection point.

The IR filter 570 is made of glass material without affecting the focal length of the optical image capturing system and it is disposed between the fourth lens element 540 and the image plane 580.

In the fifth embodiment of the optical image capturing system, focal lengths of the second lens element 520, the third lens element 530, and the fourth lens element 540 are f2, f3, and f4, respectively. The following relation is satisfied: |f2|+|f3|=20.5420 mm, |f1|+|f4|=11.2855 mm, and |f2|+|f3|>|f4|.

In the fifth embodiment of the optical image capturing system, a central thickness of the third lens element 530 on the optical axis is TP3. A central thickness of the fourth lens element 540 on the optical axis is TP4. The following relation is satisfied: TP3=0.433 mm and TP4=0.574 mm.

In the fifth embodiment of the optical image capturing system, a sum of focal lengths of all lens elements with positive refractive power is ΣPP. The following relation is satisfied: ΣPP=f1+f3. Hereby, it's favorable for allocating the positive refractive power of the first lens element 510 to others positive lens elements and the significant aberrations generated in the process of moving the incident light can be suppressed.

In the fifth embodiment of the optical image capturing system, a sum of focal lengths of all lens elements with negative refractive power is ΣNP. The following relation is satisfied: ΣNP=f2+f4. Hereby, it's favorable for allocating the negative refractive power of the fourth lens element 540 to others negative lens elements.

Please refer to the following Table 9 and Table 10.

The detailed data of the optical image capturing system of the fifth embodiment is as shown in Table 9.

TABLE 9

Data of the optical image capturing system
f = 2.325 mm, f/HEP = 2.2, HAF = 44.070 deg, tan(HAF) = 0.9681

| Surface # | | Curvature Radius | Thickness | Material | Index | Abbe # | Focal length |
|---|---|---|---|---|---|---|---|
| 0 | Object | Plano | 6000 | | | | |
| 1 | Ape. stop | Plano | −0.02140 | | | | |
| 2 | Lens 1 | 1.67084 | 0.44308 | Plastic | 1.544 | 56.09 | 2.860 |
| 3 | | −21.58531 | 0.28278 | | | | |
| 4 | Lens 2 | 24.06972 | 0.18000 | Plastic | 1.642 | 22.46 | −16.536 |
| 5 | | 7.38982 | 0.14956 | | | | |
| 6 | Lens 3 | −0.92975 | 0.43291 | Plastic | 1.544 | 56.09 | 4.006 |
| 7 | | −0.75964 | 0.04596 | | | | |
| 8 | Lens 4 | 1.38293 | 0.57352 | Plastic | 1.544 | 56.09 | −8.425 |
| 9 | | 0.90752 | 0.27054 | | | | |
| 10 | IR filter | Plano | 0.22000 | BK_7 | 1.517 | 64.13 | |
| 11 | | Plano | 0.68 | | | | |
| 12 | Image plane | Plano | | | | | |

Reference wavelength (d-line) = 555 nm

As for the parameters of the aspheric surfaces of the fifth embodiment, reference is made to Table 10.

TABLE 10

Aspheric Coefficients

| Surface # | | | | |
|---|---|---|---|---|
| | 2 | 3 | 4 | 5 |
| k = | −2.411150E+01 | −8.970000E−12 | 0.000000E+00 | −1.912480E−01 |
| A4 = | 4.241619E−01 | −5.072498E−01 | −9.982605E−01 | −3.949005E−01 |
| A6 = | −9.931369E−01 | 1.449952E+00 | 3.059330E+00 | 3.194517E+00 |
| A8 = | −3.155556E+00 | −1.140515E+01 | −3.295404E+01 | −1.979587E+01 |
| A10 = | 1.819523E+01 | 3.723216E+01 | 1.320933E+02 | 5.053033E+01 |
| A12 = | −2.916756E+01 | −5.399625E+01 | −2.089202E+02 | −5.480010E+01 |
| A14 = | 0.000000E+00 | 2.453947E+01 | 1.165926E+02 | 2.135825E+01 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| Surface # | | | | |
|---|---|---|---|---|
| | 6 | 7 | 8 | 9 |
| k = | −4.292494E−03 | −4.483884E+00 | 0.000000E+00 | −2.434696E+00 |
| A4 = | 9.883008E−01 | −5.760551E−01 | −1.684271E−01 | −3.714594E−01 |
| A6 = | 3.519829E+00 | 2.444129E+00 | −1.614884E+00 | 2.693021E−01 |
| A8 = | −1.942998E+01 | −1.253424E+01 | 4.595513E+00 | −6.317155E−02 |
| A10 = | 3.835298E+01 | 5.190505E+01 | −6.918888E+00 | −1.047034E−01 |

TABLE 10-continued

Aspheric Coefficients

| | | | |
|---|---|---|---|
| A12 = | −3.437227E+01 | −1.369031E+02 | 5.736184E+00 | 1.157767E−01 |
| A14 = | 1.222138E+01 | 2.285430E+02 | −2.081947E+00 | −5.269062E−02 |
| A16 = | 0.000000E+00 | −2.374043E+02 | −3.279818E−01 | 1.170667E−02 |
| A18 = | 0.000000E+00 | 1.409133E+02 | 5.082399E−01 | −1.044706E−03 |
| A20 = | 0.000000E+00 | −3.635935E+01 | −1.152344E−01 | 0.000000E+00 |

In the fifth embodiment, the presentation of the aspheric surface formula is similar to that in the first embodiment. Besides, the definitions of parameters in following tables are equal to those in the first embodiment, so the repetitious details need not be given here.

The following content may be deduced from Table 9 and Table 10.

Fifth embodiment (Primary reference wavelength: 555 nm)

| InRS11 | InRS12 | InRS21 | InRS22 | InRS31 | InRS32 |
|---|---|---|---|---|---|
| 0.07424 | −0.13814 | −0.15882 | 0.00159 | −0.07690 | −0.32373 |

| InRS41 | InRS42 | InRSO | InRSI | Σ|InRS| |
|---|---|---|---|---|
| −0.07774 | −0.07824 | 0.38770 | 0.54171 | 0.92941 |

| Σ|InRS|/InTL | Σ|InRS|/HOS | (|InRS22| + |InRS31|)/IN23 | (|InRS32| + |InRS41|)/IN34 |
|---|---|---|---|
| 0.44094 | 0.28350 | 0.5248 | 8.7353 |

| (|InRS31| + |InRS32| + |InRS41| + |InRS42|)/InTL | (|InRS31| + |InRS32| + |InRS41| + |InRS42|)/HOS |
|---|---|

Fifth embodiment (Primary reference wavelength: 555 nm)

| | 0.26407 | | | 0.16979 | |
|---|---|---|---|---|---|
| |f/f1| | |f/f2| | |f/f3| | |f/f4| | |f1/f2| | |f2/f3| |
| 0.81283 | 0.14059 | 0.58034 | 0.27594 | 0.17297 | 4.12781 |

| ΣPPR | ΣNPR | ΣPPR/ΣNPR | ΣPP | ΣNP | f1/ΣPP |
|---|---|---|---|---|---|
| 1.39317 | 0.41653 | 3.34470 | 6.86620 | −24.96128 | 0.41656 |

| f4/ΣNP | IN12/f | |InRS41|/TP4 | |InRS42|/TP4 | |ODT|% | |TDT|% |
|---|---|---|---|---|---|
| 0.33753 | 0.12163 | 0.13555 | 0.13643 | 1.00896 | 0.39163 |

| InTL | HOS | HOS/HOI | InS/HOS | InTL/HOS | ΣTP/InTL |
|---|---|---|---|---|---|
| 2.10781 | 3.27835 | 1.44548 | 0.99347 | 0.64295 | 0.77308 |

| HVT31 | HVT32 | HVT41 | HVT42 | HVT42/HOI | HVT42/HOS |
|---|---|---|---|---|---|
| 0.742735 | 0.890489 | 0.73176 | 1.06511 | 0.46963 | 0.32489 |

The following content may be deduced from Table 9 and Table 10.

Related inflection point values of fifth embodiment (Primary reference wavelength: 555 nm)

| | | | | | | | |
|---|---|---|---|---|---|---|---|
| HIF111 | 0.43683 | HIF111/HOI | 0.19261 | SGI111 | 0.05138 | |SGI111|/(|SGI111| + TP1) | 0.10391 |
| HIF211 | 0.05968 | HIF211/HOI | 0.02631 | SGI211 | 0.00006 | |SGI211|/(|SGI211| + TP2) | 0.00034 |
| HIF212 | 0.56368 | HIF212/HOI | 0.24853 | SGI212 | −0.08099 | |SGI212|/(|SGI212| + TP2) | 0.31033 |
| HIF213 | 0.66717 | HIF213/HOI | 0.29416 | SGI213 | −0.12552 | |SGI213|/(|SGI213| + TP2) | 0.41084 |
| HIF214 | 0.73000 | HIF214/HOI | 0.32187 | SGI214 | −0.15192 | |SGI214|/(|SGI214| + TP2) | 0.45770 |
| HIF221 | 0.25601 | HIF221/HOI | 0.11288 | SGI221 | 0.00333 | |SGI221|/(|SGI221| + TP2) | 0.01817 |
| HIF222 | 0.58654 | HIF222/HOI | 0.25861 | SGI222 | −0.00582 | |SGI222|/(|SGI222| + TP2) | 0.03131 |
| HIF223 | 0.78603 | HIF223/HOI | 0.34657 | SGI223 | −0.00497 | |SGI223|/(|SGI223| + TP2) | 0.02687 |
| HIF311 | 0.29029 | HIF311/HOI | 0.12799 | SGI311 | −0.03818 | |SGI311|/(|SGI311| + TP3) | 0.08104 |
| HIF312 | 0.86175 | HIF312/HOI | 0.37996 | SGI312 | −0.08204 | |SGI312|/(|SGI312| + TP3) | 0.15932 |
| HIF321 | 0.62541 | HIF321/HOI | 0.27575 | SGI321 | −0.21482 | |SGI321|/(|SGI321| + TP3) | 0.33165 |
| HIF411 | 0.39489 | HIF411/HOI | 0.17412 | SGI411 | 0.04952 | |SGI411|/(|SGI411| + TP4) | 0.07948 |
| HIF412 | 1.15875 | HIF412/HOI | 0.51091 | SGI412 | −0.06143 | |SGI412|/(|SGI412| + TP4) | 0.09675 |
| HIF421 | 0.48179 | HIF421/HOI | 0.21243 | SGI421 | 0.10017 | |SGI421|/(|SGI421| + TP4) | 0.14869 |

The Sixth Embodiment (Embodiment 6)

Figure 6A:
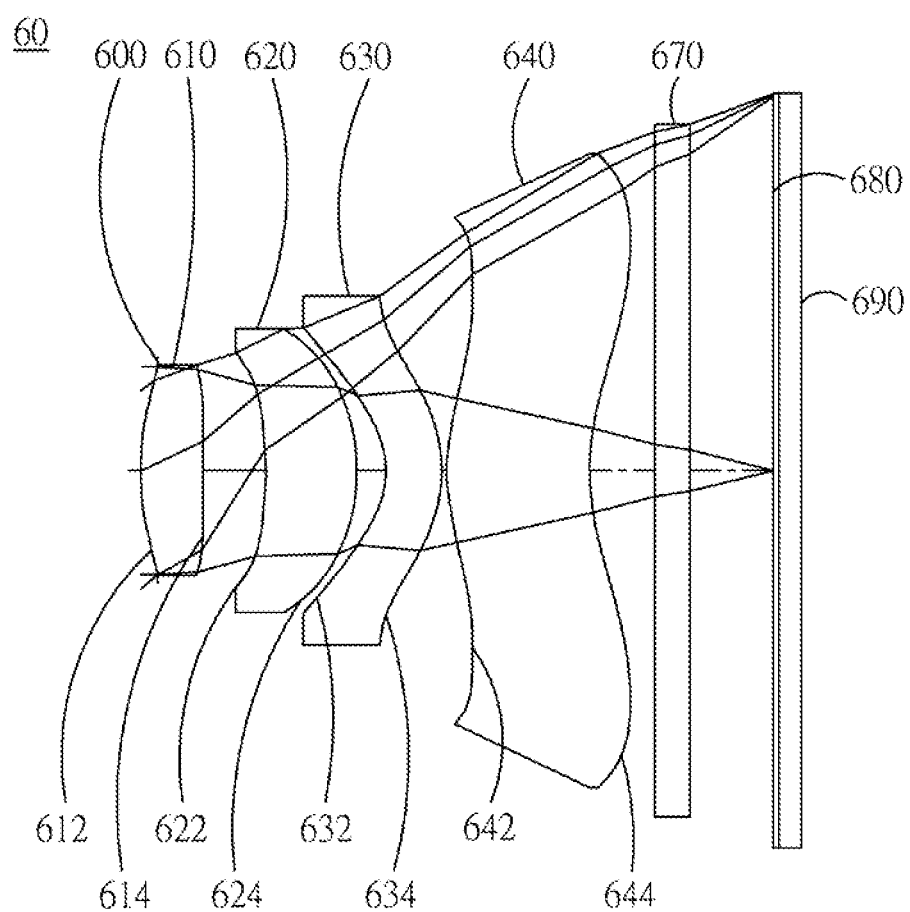
FIG. 6A is a schematic view of the optical image capturing system according to the sixth embodiment of the present application.
Figure 6B:
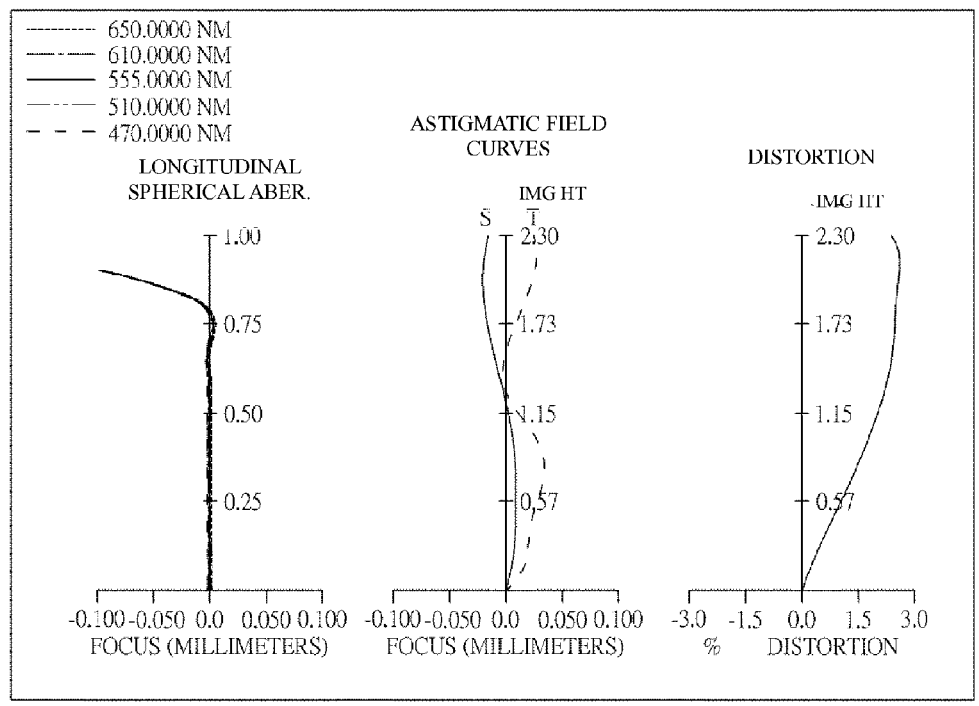
FIG. 6B is longitudinal spherical aberration curves, astigmatic field curves, and an optical distortion grid of the optical image capturing system in the order from left to right according to the sixth embodiment of the present application.
Figure 6C:
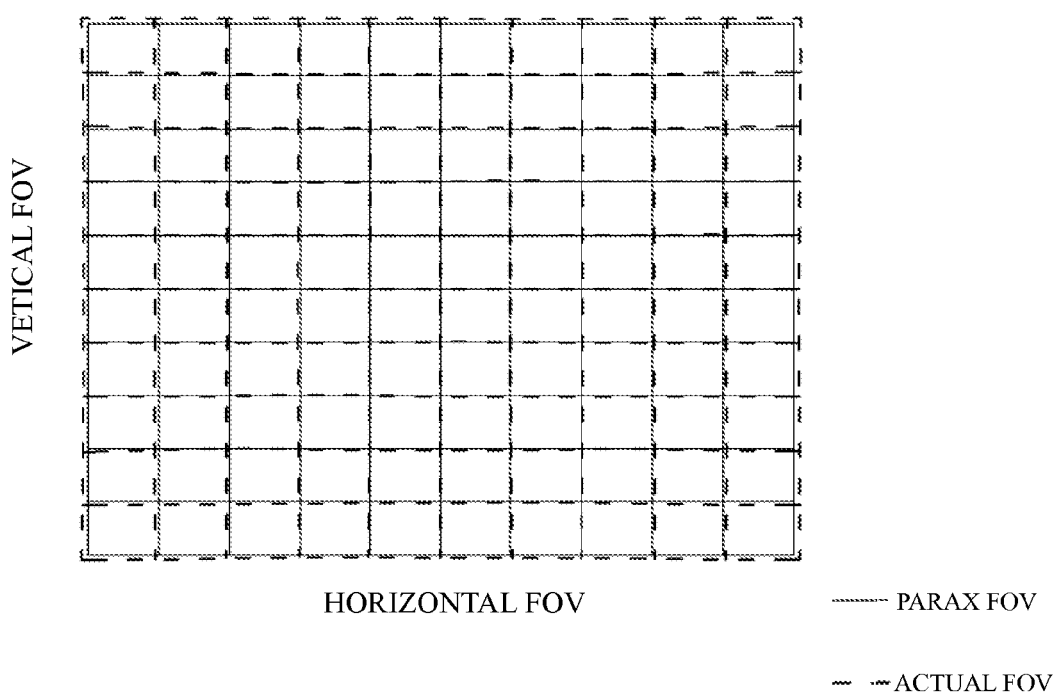
FIG. 6C is a TV distortion grid of the optical image capturing system according to the sixth embodiment of the present application.

Please refer to FIG. 6A, FIG. 6B and FIG. 6C, FIG. 6A is a schematic view of the optical image capturing system according to the sixth embodiment of the present application, FIG. 6B is longitudinal spherical aberration curves, astigmatic field curves, and an optical distortion curve of the optical image capturing system in the order from left to right according to the sixth embodiment of the present application, and FIG. 6C is a TV distortion grid of the optical image capturing system according to the sixth embodiment of the present application. As shown in FIG. 6A, sequentially arranged from an object side to an image side, the optical image capturing system includes a first lens element 610, an aperture stop 600, a second lens element 620, a third lens element 630, a fourth lens element 640, an IR filter 670, an image plane 680, and an image sensing device 690.

The first lens element 610 has positive refractive power and it is made of plastic material. The first lens element 610 has a convex object-side surface 612 and a convex image-side surface 614, both of the object-side surface 612 and the image-side surface 614 are aspheric, and the object-side surface 612 has one inflection point.

The second lens element 620 has positive refractive power and it is made of plastic material. The second lens element 620 has a concave object-side surface 622 and a convex image-side surface 624, and both of the object-side surface 622 and the image-side surface 624 are aspheric.

The third lens element 630 has negative refractive power and it is made of plastic material. The third lens element 630 has a concave object-side surface 632 and a convex image-side surface 634, both of the object-side surface 632 and the image-side surface 634 are aspheric, and the object-side surface 632 has two inflection points and the image-side surface 634 has one inflection point.

The fourth lens element 640 has positive refractive power and it is made of plastic material. The fourth lens element 640 has a convex object-side surface 642 and a concave image-side surface 644, and both of the object-side surface 642 and the image-side surface 644 are aspheric and have one inflection point.

The IR filter 670 is made of glass material without affecting the focal length of the optical image capturing system and it is disposed between the fourth lens element 640 and the image plane 680.

In the sixth embodiment of the optical image capturing system, focal lengths of the second lens element 620, the third lens element 630, and the fourth lens element 640 are f2, f3, and f4, respectively. The following relation is satisfied: |f2|+|f3|=6.3879 mm, |f1|+|f4|=7.3017 mm, and |f2|+|f3|>|f1|+|f4|.

In the sixth embodiment of the optical image capturing system, a central thickness of the third lens element 630 on the optical axis is TP3. A central thickness of the fourth lens element 640 on the optical axis is TP4. The following relation is satisfied: TP4=0.342 mm and TP4=0.876 mm.

In the sixth embodiment of the optical image capturing system, a sum of focal lengths of all lens elements with positive refractive power is ΣPP. The following relation is satisfied: ΣPP=f1+f2+f4=10.9940 mm and f1/(f1+f2+f4)=0.2801. Hereby, it's favorable for allocating the positive refractive power of the first lens element 610 to others positive lens elements and the significant aberrations generated in the process of moving the incident light can be suppressed.

In the sixth embodiment of the optical image capturing system, a sum of focal lengths of all lens elements with negative refractive power is ΣNP. The following relation is satisfied: ΣNP=f3=−2.6956 mm and f3/(f3)=0.0340. Hereby, it's favorable for allocating the negative refractive power of the fourth lens element 640 to others negative lens elements.

Please refer to the following Table 11 and Table 12.

The detailed data of the optical image capturing system of the sixth embodiment is as shown in Table 11.

TABLE 11

Data of the optical image capturing system
f = 2.6019 mm, f/HEP = 1.600, HAF = 40.700 deg, tan(HAF) = 0.8601

| Surface # | | Curvature Radius | Thickness | Material | Index | Abbe # | Focal length |
|---|---|---|---|---|---|---|---|
| 0 | Object | Plano | 600 | | | | |
| 1 | Lens 1/Ape. stop | 1.71292 | 0.38171 | Plastic | 1.54410 | 56.06368 | 3.07935 |
| 2 | | −82.93521 | 0.06127 | | | | |
| 3 | light-shielding sheet | Plano | 0.32214 | | | | |
| 4 | Lens 2 | −2.99453 | 0.55905 | Plastic | 1.54410 | 56.06368 | 3.69227 |
| 5 | | −1.28410 | 0.18224 | | | | |
| 6 | Lens 3 | −0.49647 | 0.34177 | Plastic | 1.64250 | 22.45544 | −2.69561 |
| 7 | | −0.88152 | 0.03097 | | | | |
| 8 | Lens 4 | 1.05292 | 0.87625 | Plastic | 1.53460 | 56.04928 | 4.22234 |
| 9 | | 1.39616 | 0.40577 | | | | |
| 10 | IR filter | Plano | 0.21 | BK_7 | 1.51680 | 64.13477 | |
| 11 | | Plano | 0.51339 | | | | |
| 12 | Image Plane | Plano | | | | | |

Reference wavelength (d-line) = 555 nm, shield position: the effective diameter of the clear aperture (CA) of the third plano = 0.675 mm As for the parameters of the aspheric surfaces of the sixth embodiment, reference is made to Table 12.

TABLE 12

Aspheric Coefficients

| Surface # | 1 | 2 | 4 | 5 | 6 | 7 | 8 | 9 |
|---|---|---|---|---|---|---|---|---|
| k = | −8.09736E−01 | 9.90000E+01 | 1.38546E+01 | −4.78421E+00 | −3.91527E+00 | −1.53405E+00 | −1.19640E+01 | −5.30860E+00 |
| A4 = | 3.11337E−04 | −1.47267E−01 | −2.45721E−01 | −2.55177E−01 | −1.04737E+00 | −8.42553E−02 | −3.47164E−02 | −5.45854E−02 |
| A6 = | −4.23221E−01 | 2.05335E−01 | 1.11283E+00 | −1.35694E+00 | 1.91291E+00 | 1.14144E−01 | −1.11575E−01 | −3.54359E−03 |
| A8 = | 1.99682E+00 | −2.29326E+00 | −7.97159E+00 | 5.61291E+00 | −1.03818E+00 | 4.85341E−01 | 1.55890E−01 | 1.43811E−02 |
| A10 = | −8.98568E+00 | 6.67714E+00 | 2.67059E+01 | −1.27982E+01 | 8.28666E−02 | −5.78511E−01 | −1.02888E−01 | −8.50527E−03 |
| A12 = | 2.55814E+01 | −1.26431E+01 | −4.89500E+01 | 1.83626E+01 | −7.20630E−01 | 1.37111E−01 | 3.67156E−02 | 2.28063E−03 |
| A14 = | −4.56047E+01 | 1.25240E+01 | 4.32986E+01 | −1.54412E+01 | 8.84894E−01 | 8.58529E−02 | −6.09560E−03 | −2.76813E−04 |
| A16 = | 3.35356E+01 | −4.95913E+00 | −1.11707E+01 | 5.47973E+00 | −3.65905E−01 | −3.73888E−02 | 1.92810E−04 | 9.06057E−06 |
| A18 = | 0.00000E+00 | 0.00000E+00 | 0.00000E+00 | 0.00000E+00 | 0.00000E+00 | 0.00000E+00 | 0.00000E+00 | 0.00000E+00 |
| A20 = | 0.00000E+00 | 0.00000E+00 | 0.00000E+00 | 0.00000E+00 | 0.00000E+00 | 0.00000E+00 | 0.00000E+00 | 0.00000E+00 |

The presentation of the aspheric surface formula in the sixth embodiment is similar to that in the first embodiment. Besides the definitions of parameters in following tables are equal to those in the first embodiment so the repetitious details need not be given here.

The following content may be deduced from Table 11 and Table 12.

Sixth embodiment (Primary reference wavelength: 555 nm)

| InRS11 | InRS12 | InRS21 | InRS22 | InRS31 | InRS32 |
|---|---|---|---|---|---|
| 0.10245 | −0.04085 | −0.18437 | −0.44347 | −0.51083 | −0.37921 |

| InRS41 | InRS42 | InRSO | InRSI | Σ|InRS| |
|---|---|---|---|---|
| 0.11772 | 0.04936 | 0.91538 | 0.91289 | 1.82827 |

| Σ|InRS|/InTL | Σ|InRS|/HOS | (|InRS22| + |InRS31|)/IN23 | (|InRS32| + |InRS41|)/IN34 |
|---|---|---|---|
| 0.66352 | 0.47065 | 5.2365 | 16.0459 |

| (|InRS31| + |InRS32| + |InRS41| + |InRS42|)/InTL | (|InRS31| + |InRS32| + |InRS41| + |InRS42|)/HOS |
|---|---|
| 0.38366 | 0.27214 |

Sixth embodiment (Primary reference wavelength: 555 nm)

| |f/f1| | |f/f2| | |f/f3| | |f/f4| | |f1/f2| | |f2/f3| |
|---|---|---|---|---|---|
| 0.84495 | 0.70469 | 0.96524 | 0.61622 | 0.83400 | 1.36973 |

| ΣPPR | ΣNPR | ΣPPR/|ΣNPR| | ΣPP | ΣNP | f1/ΣPP |
|---|---|---|---|---|---|
| 1.81019 | 1.32091 | 1.37041 | 0.38374 | 7.91461 | 8.02457 |

| f4/ΣNP | IN12/f | |InRS41|/TP4 | |InRS42|/TP4 | |ODT|% | |TDT|% |
|---|---|---|---|---|---|
| 0.53349 | 0.14736 | 0.13435 | 0.05633 | 2.57432 | 0.27626 |

| InTL | HOS | HOS/HOI | InS/HOS | InTL/HOS | ΣTP/InTL |
|---|---|---|---|---|---|
| 2.75540 | 3.88456 | 1.68894 | 0.97363 | 0.70932 | 0.78347 |

| HVT31 | HVT32 | HVT41 | HVT42 | HVT42/HOI | HVT42/HOS |
|---|---|---|---|---|---|
| 0 | 0 | 1.11330 | 1.39937 | 0.60842 | 0.36024 |

The following content may be deduced from Table 11 and Table 12.

Related inflection point values of sixth embodiment (Primary reference wavelength: 555 nm)

| | | | | | | | |
|---|---|---|---|---|---|---|---|
| HIF111 | 0.527327 | HIF111/HOI | 0.229273 | SGI111 | 0.0766251 | |SGI111|/(|SGI111| + TP1) | 0.167182 |
| HIF311 | 0.627538 | HIF311/HOI | 0.272843 | SGI311 | −0.30616 | |SGI311|/(|SGI311| + TP3) | 0.472518 |
| HIF312 | 0.708595 | HIF312/HOI | 0.308085 | SGI312 | −0.369446 | |SGI312|/(|SGI312| + TP3) | 0.519455 |
| HIF321 | 0.63295 | HIF321/HOI | 0.275196 | SGI321 | −0.212404 | |SGI321|/(|SGI321| + TP3) | 0.383278 |
| HIF411 | 0.461586 | HIF411/HOI | 0.20069 | SGI411 | 0.0708689 | |SGI411|/(|SGI411| + TP4) | 0.074826 |
| HIF421 | 0.658593 | HIF421/HOI | 0.286345 | SGI421 | 0.119304 | |SGI421|/(|SGI421| + TP4) | 0.119837 |

The Seventh Embodiment (Embodiment 7)

Figure 7A:
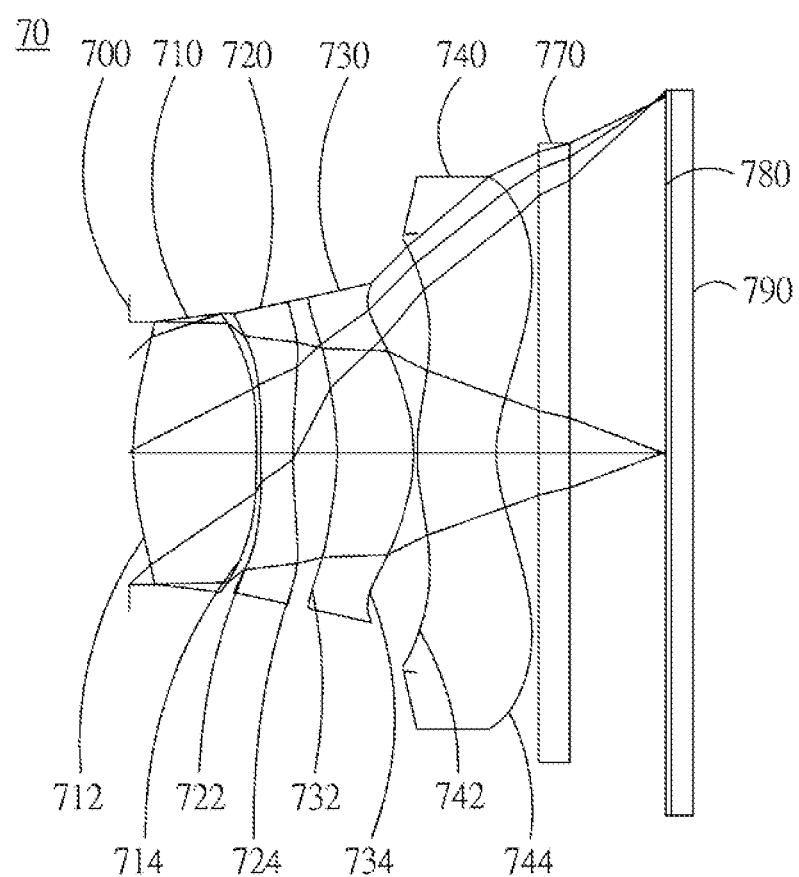
FIG. 7A is a schematic view of the optical image capturing system according to the seventh embodiment of the present application.
Figure 7B:
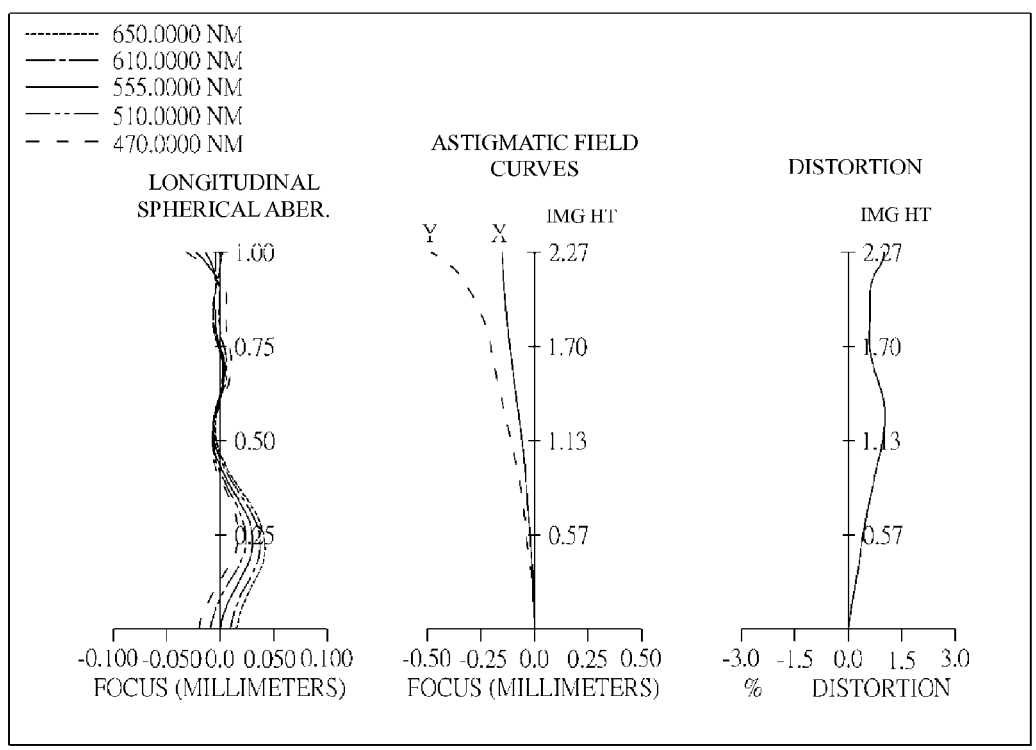
FIG. 7B is longitudinal spherical aberration curves, astigmatic field curves, and an optical distortion grid of the optical image capturing system in the order from left to right according to the seventh embodiment of the present application.
Figure 7C:
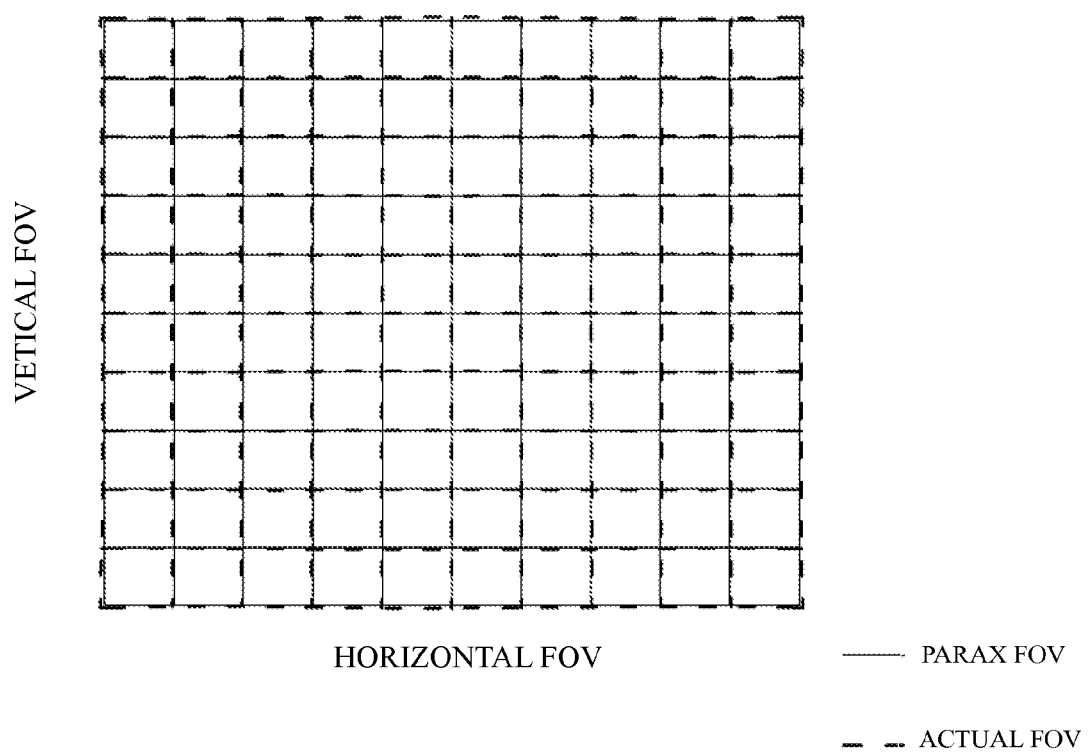
FIG. 7C is a TV distortion grid of the optical image capturing system according to the seventh embodiment of the present application.

Please refer to FIG. 7A, FIG. 7B and FIG. 7C, FIG. 7A is a schematic view of the optical image capturing system according to the seventh embodiment of the present application, FIG. 7B is longitudinal spherical aberration curves, astigmatic field curves, and an optical distortion curve of the optical image capturing system in the order from left to right according to the seventh embodiment of the present application, and FIG. 7C is a TV distortion grid of the optical image capturing system according to the seventh embodiment of the present application. As shown in FIG. 7A, sequentially arranged from an object side to an image side, the optical image capturing system includes a first lens element 710, an aperture stop 700, a second lens element 720, a third lens element 730, a fourth lens element 740, an IR filter 770, an image plane 780, and an image sensing device 790.

The first lens element 710 has positive refractive power and it is made of plastic material. The first lens element 710 has a convex object-side surface 712 and a convex image-side surface 714, and both of the object-side surface 712 and the image-side surface 714 are aspheric. The object-side surface 712 has one inflection point.

The second lens element 720 has negative refractive power and it is made of plastic material. The second lens element 720 has a convex object-side surface 722 and a concave image-side surface 724, and both of the object-side surface 722 and the image-side surface 724 are aspheric and have two inflection points.

The third lens element 730 has positive refractive power and it is made of plastic material. The third lens element 730 has a concave object-side surface 732 and a convex image-side surface 734, and both of the object-side surface 732 and the image-side surface 734 are aspheric. The object-side surface 732 has two inflection points and the image-side surface 734 has one inflection point.

The fourth lens element 740 has negative refractive power and it is made of plastic material. The fourth lens element 740 has a convex object-side surface 742 and a concave image-side surface 744, and both of the object-side surface 742 and the image-side surface 744 are aspheric and have one inflection point.

The IR filter 770 is made of glass material without affecting the focal length of the optical image capturing system and it is disposed between the fourth lens element 740 and the image plane 780.

In the seventh embodiment of the optical image capturing system, focal lengths of the second lens element 720, the third lens element 730 and the fourth lens element 740 are f2, f3, and f4, respectively. The following relation is satisfied: |f2|+|f3|=15.0996 mm, |f1|+|f4|=8.6946 mm, and |f2|+|f3|>|f1|+|f4|.

In the seventh embodiment of the optical image capturing system, a central thickness of the third lens element 730 on the optical axis is TP3. A central thickness of the fourth lens element 740 on the optical axis is TP4. The following relation is satisfied: TP3=0.546 mm and TP4=0.560 mm.

In the seventh embodiment of the optical image capturing system, a sum of focal lengths of all lens elements with positive refractive power is ΣPP. The following relation is satisfied: ΣPP=f1+f3. Hereby, it's favorable for allocating the positive refractive power of the first lens element 710 to others positive lens elements and the significant aberrations generated in the process of moving the incident light can be suppressed.

In the seventh embodiment of the optical image capturing system, a sum of focal lengths of all lens elements with negative refractive power is ΣNP. The following relation is satisfied: ΣNP=f2+f4. Hereby, it's favorable for allocating the negative refractive power of the fourth lens element 740 to others negative lens elements.

Please refer to the following Table 13 and Table 14.

The detailed data of the optical image capturing system of the seventh embodiment is as shown in Table 13.

TABLE 13

Data of the optical image capturing system
f = 2.658 mm, f/HEP = 1.600, HAF = 40.178 deg, tan(HAF) = 0.8444

| Surface # | | Curvature Radius | Thickness | Material | Index | Abbe # | Focal length |
|---|---|---|---|---|---|---|---|
| 0 | Object | Plano | 6000 | | | | |
| 1 | Ape. stop | Plano | 0.02586 | | | | |
| 2 | Lens 1 | 1.82723 | 0.87793 | Plastic | 1.544 | 56.09 | 2.788 |
| 3 | | −7.56096 | 0.02509 | | | | |
| 4 | Lens 2 | 12.68101 | 0.23002 | Plastic | 1.642 | 22.46 | −10.948 |
| 5 | | 4.51507 | 0.31496 | | | | |
| 6 | Lens 3 | −1.31095 | 0.54645 | Plastic | 1.544 | 56.09 | 4.152 |
| 7 | | −0.95280 | 0.02500 | | | | |
| 8 | Lens 4 | 1.38763 | 0.56037 | Plastic | 1.544 | 56.09 | −5.907 |
| 9 | | 0.83178 | 0.30118 | | | | |
| 10 | IR filter | Plano | 0.22002 | BK_7 | 1.517 | 64.13 | |
| 11 | | Plano | 0.68042 | | | | |
| 12 | Image plane | Plano | | | | | |

Reference wavelength (d-line) = 555 nm, shield position: clear aperture (CA) of the third plano = 0.880 mm As for the parameters of the aspheric surfaces of the seventh embodiment, reference is made to Table 14.

TABLE 14

| Aspheric Coefficients | | | | |
|---|---|---|---|---|
| | Surface # | | | |
| | 1 | 2 | 3 | 4 |
| k = | −3.449885E+01 | 6.039504E+01 | 0.000000E+00 | −1.912480E−01 |
| A4 = | 4.910976E−01 | −1.104180E+00 | −8.795001E−01 | 1.817942E−0e1 |
| A6 = | −1.140695E+00 | 3.700900E+00 | 1.756327E+00 | −1.506726E+00 |
| A8 = | 1.562231E+00 | −8.177836E+00 | −2.940058E+00 | 3.775393E+00 |
| A10 = | −1.034743E+00 | 1.040322E+01 | 2.476651E+00 | −6.222165E+00 |
| A12 = | 1.311146E−02 | −7.172275E+00 | −5.900538E−01 | 5.339849E+00 |
| A14 = | 0.000000E+00 | 2.107607E+00 | −7.905662E−02 | −1.725157E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |
| | Surface # | | | |
| | 5 | 6 | 8 | 9 |
| k = | 0.000000E+00 | −4.021380E+00 | 0.000000E+00 | −3.169782E+00 |
| A4 = | 8.814026E−01 | −8.397014E−02 | −3.973401E−01 | −3.266176E−01 |
| A6 = | −2.417150E+00 | −5.159036E−01 | −6.396172E−01 | 3.434798E−01 |
| A8 = | 5.608579E+00 | 2.751363E+00 | 2.713808E+00 | −2.591739E−01 |
| A10 = | −9.294013E+00 | −8.127982E+00 | −5.193750E+00 | 1.022526E−01 |
| A12 = | 8.330999E+00 | 1.666672E+01 | 5.917096E+00 | −6.955898E−03 |
| A14 = | −2.862391E+00 | −2.295022E+01 | −4.162303E+00 | −9.952133E−03 |
| A16 = | 0.000000E+00 | 1.996548E+01 | 1.759765E+00 | 3.546491E−03 |
| A18 = | 0.000000E+00 | −9.597546E+00 | −4.063329E−01 | −3.811572E−04 |
| A20 = | 0.000000E+00 | 1.900616E+00 | 3.860304E−02 | 0.000000E+00 |

In the seventh embodiment, the presentation of the aspheric surface formula is similar to that in the first embodiment. Besides, the definitions of parameters in following tables are equal to those in the first embodiment, so the repetitious details need not be given here.

The following content may be deduced from Table 13 and Table 14.

| Seventh embodiment (Primary reference wavelength: 555 nm) | | | | | |
|---|---|---|---|---|---|
| InRS11 | InRS12 | InRS21 | InRS22 | InRS31 | InRS32 |
| 0.15179 | −0.25473 | −0.19028 | −0.03702 | −0.21129 | −0.30435 |
| InRS41 | InRS42 | InRSO | InRSI | Σ|InRS| | |
| −0.07140 | −0.05477 | 0.62476 | 0.65087 | 1.27562 | |
| Σ|InRS|/InTL | Σ|InRS|/HOS | (|InRS22| + |InRS31|)/IN23 | (|InRS32| + |InRS41|)/IN34 | | |
| 0.49446 | 0.33734 | 0.7884 | 15.0281 | | |
| (|InRS31| + |InRS32| + |InRS41| + |InRS42|)/InTL | (|InRS31| + |InRS32| + |InRS41| + |InRS42|)/HOS | | | | |

-continued

| Seventh embodiment (Primary reference wavelength: 555 nm) | | | | | |
|---|---|---|---|---|---|
| | 0.24878 | | | 0.16972 | |
| |f/f1| | |f/f2| | |f/f3| | |f/f4| | |f1/f2| | |f2/f3| |
| 0.95340 | 0.24279 | 0.64017 | 0.45000 | 0.25466 | 2.63669 |
| ΣPPR | ΣNPR | ΣPPR/|ΣNPR| | ΣPP | ΣNP | f1/ΣPP |
| 1.59357 | 0.69279 | 2.30022 | 6.93994 | −16.85430 | 0.40172 |
| f4/ΣNP | IN12/f | |InRS41|/TP4 | |InRS42|/TP4 | |ODT|% | |TDT|% |
| 0.35046 | 0.00944 | 0.12741 | 0.09773 | 1.02843 | 0.41705 |
| InTL | HOS | HOS/HOI | InS/HOS | InTL/HOS | ΣTP/InTL |
| 2.57982 | 3.78144 | 1.66730 | 1.00684 | 0.68223 | 0.85850 |
| HVT31 | HVT32 | HVT41 | HVT42 | HVT42/HOI | HVT42/HOS |
| 0 | 0.968207 | 0.74849 | 1.14122 | 0.50318 | 0.30180 |

| Related inflection point values of seventh embodiment (Primary reference wavelength: 555 nm) | | | | | | | |
|---|---|---|---|---|---|---|---|
| HIF111 | 0.66359 | HIF111/HOI | 0.29259 | SGI111 | 0.11195 | |SGI111|/(|SGI111| + TP1) | 0.11310 |
| HIF211 | 0.08815 | HIF211/HOI | 0.03887 | SGI211 | 0.00025 | |SGI211|/(|SGI211| + TP2) | 0.00110 |
| HIF212 | 0.80907 | HIF212/HOI | 0.35673 | SGI212 | −0.15104 | |SGI212|/(|SGI212| + TP2) | 0.39636 |
| HIF221 | 0.39307 | HIF221/HOI | 0.17331 | SGI221 | 0.01759 | |SGI221|/(|SGI221| + TP2) | 0.07104 |
| HIF222 | 0.87255 | HIF222/HOI | 0.38472 | SGI222 | −0.01360 | |SGI222|/(|SGI222| + TP2) | 0.05581 |
| HIF311 | 0.80976 | HIF311/HOI | 0.35704 | SGI311 | −0.15927 | |SGI311|/(|SGI311| + TP3) | 0.22568 |
| HIF312 | 0.96080 | HIF312/HOI | 0.42363 | SGI312 | −0.20662 | |SGI312|/(|SGI312| + TP3) | 0.27437 |
| HIF321 | 0.73838 | HIF321/HOI | 0.32556 | SGI321 | −0.24218 | |SGI321|/(|SGI321| + TP3) | 0.30709 |
| HIF411 | 0.38564 | HIF411/HOI | 0.17003 | SGI411 | 0.04478 | |SGI411|/(|SGI411| + TP4) | 0.07400 |
| HIF421 | 0.48988 | HIF421/HOI | 0.21600 | SGI421 | 0.10931 | |SGI421|/(|SGI421| + TP4) | 0.16323 |

The Eighth Embodiment (Embodiment 8)

Figure 8A:
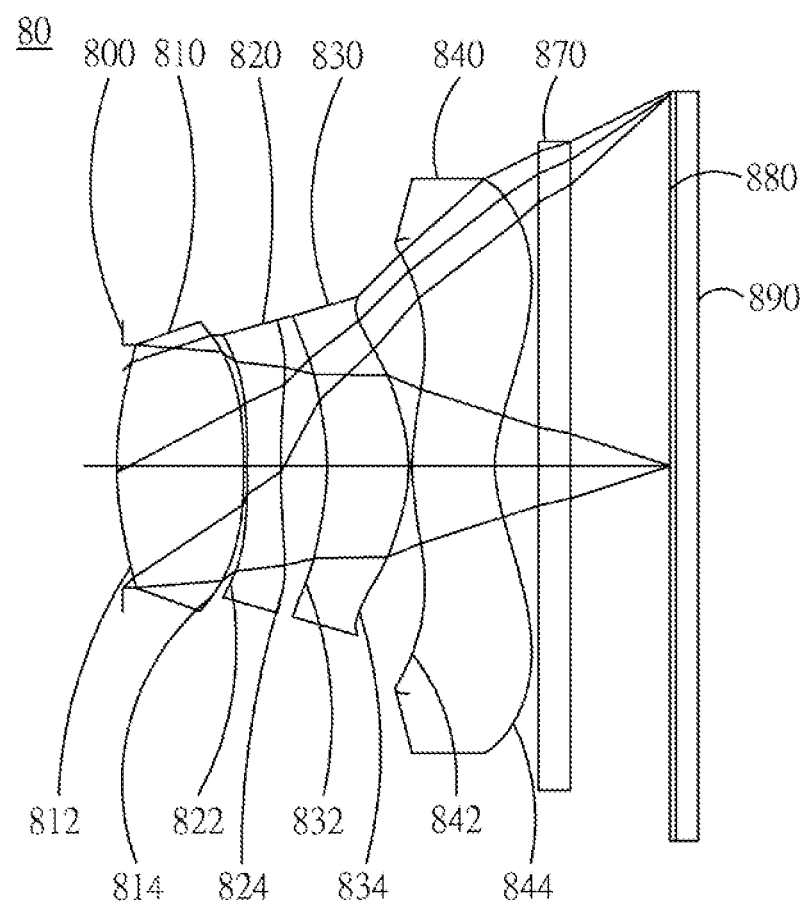
FIG. 8A is a schematic view of the optical image capturing system according to the eighth embodiment of the present application.
Figure 8B:
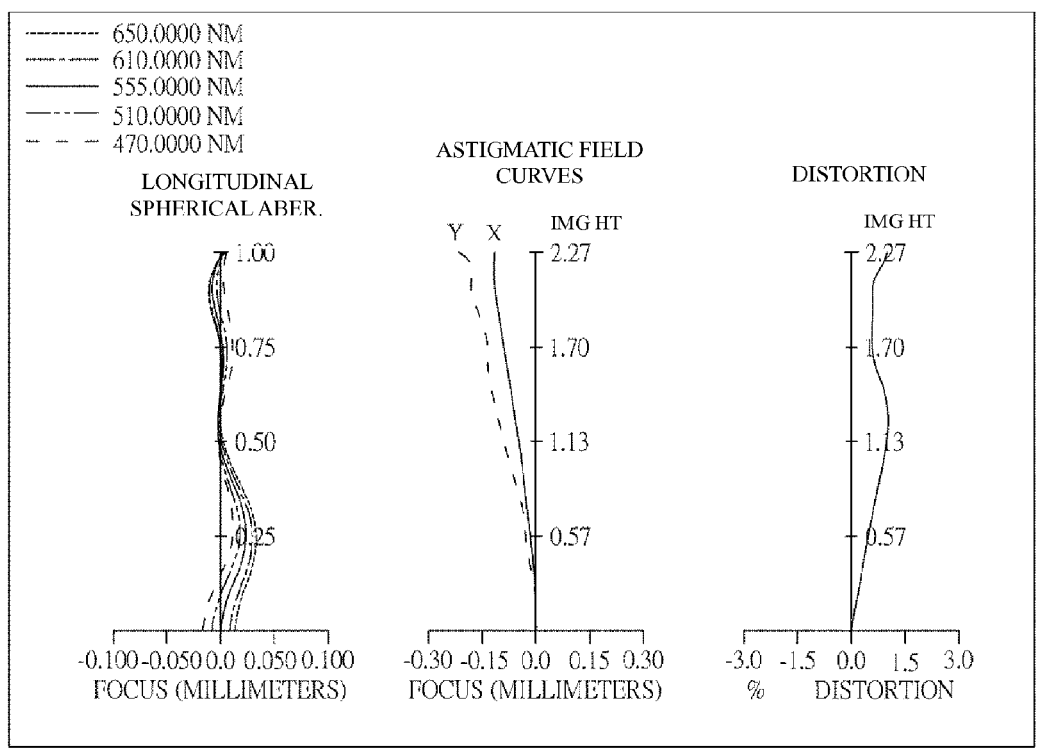
FIG. 8B is longitudinal spherical aberration curves, astigmatic field curves, and an optical distortion grid of the optical image capturing system in the order from left to right according to the eighth embodiment of the present application.
Figure 8C:
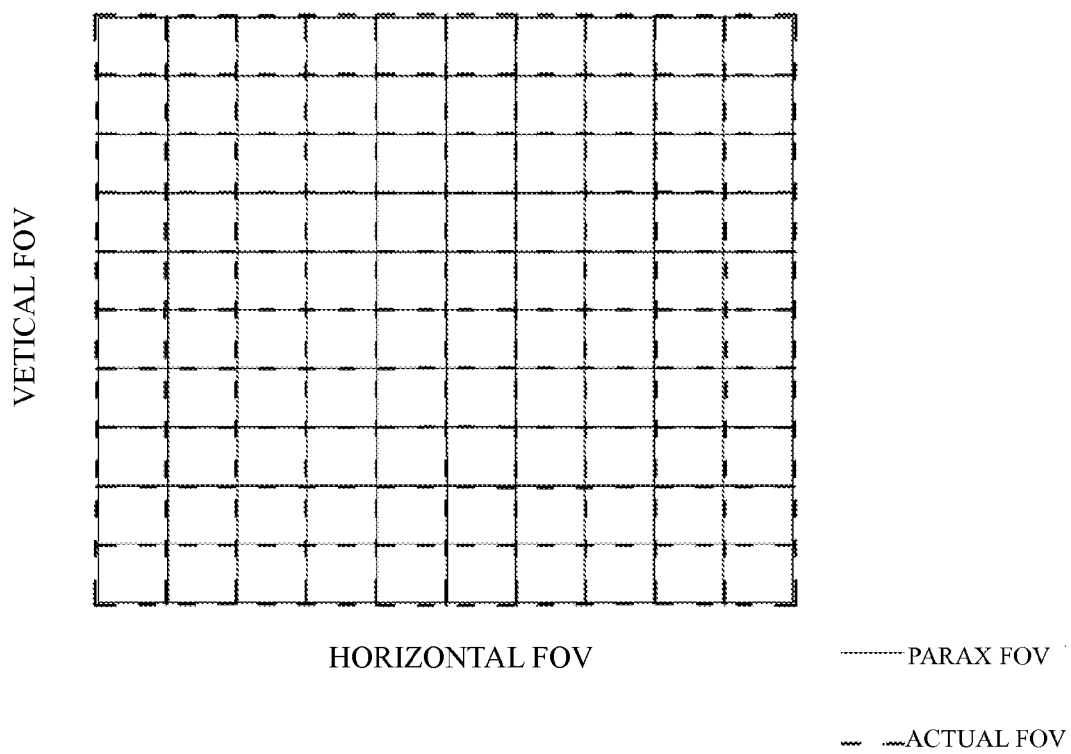
FIG. 8C is a TV distortion grid of the optical image capturing system according to the eighth embodiment of the present application.

Please refer to FIG. 8A, FIG. 8B and FIG. 8C, FIG. 8A is a schematic view of the optical image capturing system according to the eighth embodiment of the present application, FIG. 8B is longitudinal spherical aberration curves, astigmatic field curves, and an optical distortion curve of the optical image capturing system in the order from left to right according to the eighth embodiment of the present application, and FIG. 8C is a TV distortion grid of the optical image capturing system according to the eighth embodiment of the present application. As shown in FIG. 8A, sequentially arranged from an object side to an image side, the optical image capturing system includes a first lens element 810, an aperture stop 800, a second lens element 820, a third lens element 830, a fourth lens element 840, an IR filter 870, an image plane 880, and an image sensing device 890.

The first lens element 810 has positive refractive power and it is made of plastic material. The first lens element 810 has a convex object-side 812 and a convex image-side surface 814, both of the object-side surface 812 and the image-side surface 814 are aspheric, and the object-side surface 812 has one inflection point.

The second lens element 820 has negative refractive power and it is made of plastic material. The second lens element 820 has a convex object-side surface 822 and a concave image-side surface 824, and both of the object-side surface 822 and the image-side surface 824 are aspheric and have one inflection point.

The third lens element 830 has positive refractive power and it is made of plastic material. The third lens element 830 has a concave object-side surface 832 and a convex image-side surface 834, and both of the object-side surface 832 and the image-side surface 834 are aspheric. The object-side surface 832 has two inflection points and the image-side surface 834 has one inflection point.

The fourth lens element 840 has negative refractive power and it is made of plastic material. The fourth lens element 840 has a convex object-side surface 842 and a concave image-side surface 844, and both of the object-side surface 842 and the image-side surface 844 are aspheric and have one inflection point.

The IR filter 870 is made of glass material without affecting the focal length of the optical image capturing system and it is disposed between the fourth lens element 840 and the image plane 880.

In the eighth embodiment of the optical image capturing system, focal lengths of the second lens element 820, the third lens element 830, and the fourth lens element 840 are f2, f3, and f4, respectively. The following relation is satisfied: $|f2|+|f3|=12.1131$ mm, $|f1|+|f4|=8.3371$ mm, and $|f2|+|f3|<|f1|+|f4|$.

In the eighth embodiment of the optical image capturing system, a central thickness of the third lens element 830 on the optical axis is TP3. A central thickness of the fourth lens element 840 on the optical axis is TP4. The following relation is satisfied: TP3=0.555 mm and TP4=0.566 mm.

In the eighth embodiment of the optical image capturing system, a sum of focal lengths of all lens elements with positive refractive power is ΣPP. The following relation is satisfied: ΣPP=f1+f3. Hereby, it's favorable for allocating the positive refractive power of the first lens element 810 to others positive lens elements and the significant aberrations generated in the process of moving the incident light can be suppressed.

In the eighth embodiment of the optical image capturing system, a sum of focal lengths of all lens elements with negative refractive power is ΣNP. The following relation is satisfied: ΣNP=f2+f4. Hereby, it's favorable for allocating the negative refractive power of the fourth lens element 840 to others negative lens elements.

Please refer to the following Table 15 and Table 16.

The detailed data of the optical image capturing system of the eighth embodiment is as shown in Table 15.

TABLE 15

Data of the optical image capturing system
f = 2.658 mm, f/HEP = 1.8, HAF = 40.178 deg, tan(HAF) = 0.8444

| Surface # | | Curvature Radius | Thickness | Material | Index | Abbe # | Focal length |
|---|---|---|---|---|---|---|---|
| 0 | Object | Plano | 600 | | | | |
| 1 | Ape. stop | Plano | −0.04292 | | | | |
| 2 | Lens 1 | 1.82629 | 0.86563 | Plastic | 1.544 | 56.09 | 2.526 |
| 3 | | −4.68478 | 0.02500 | | | | |
| 4 | Lens 2 | 38.00000 | 0.23000 | Plastic | 1.642 | 22.46 | −7.881 |
| 5 | | 4.48893 | 0.31544 | | | | |
| 6 | Lens 3 | −1.21433 | 0.55482 | Plastic | 1.544 | 56.09 | 4.232 |
| 7 | | −0.92436 | 0.02500 | | | | |
| 8 | Lens 4 | 1.38507 | 0.56601 | Plastic | 1.544 | 56.09 | −5.811 |
| 9 | | 0.82499 | 0.29770 | | | | |
| 10 | IR filter | Plano | 0.22000 | BK_7 | 1.517 | 64.13 | |
| 11 | | Plano | 0.68000 | | | | |
| 12 | Image plane | Plano | | | | | |

Reference wavelength (d-line) = 555 nm, shield position: clear aperture (CA) of the third plano = 0.88 mm, clear aperture (CA) of the seventh plano = 1.030 mm As for the parameters of the aspheric surfaces of the eighth embodiment, reference is made to Table 16.

TABLE 16

Aspheric Coefficients

| | Surface # | | | |
|---|---|---|---|---|
| | 1 | 2 | 3 | 4 |
| k = | −3.449885E+01 | 2.006889E+01 | 0.000000E+00 | −1.912480E−01 |
| A4 = | 5.092359E−01 | −9.636558E−01 | −7.486931E−01 | 2.038028E−01 |
| A6 = | −1.261515E+00 | 2.848469E+00 | 5.303836E−01 | −1.913362E+00 |
| A8 = | 1.871289E+00 | −6.268858E+00 | 6.500642E−01 | 5.199009E+00 |
| A10 = | −1.410885E+00 | 8.704320E+00 | −2.135133E+00 | −8.817674E+00 |
| A12 = | 3.634559E−02 | −6.988183E+00 | 1.866399E+00 | 7.877279E+00 |
| A14 = | 0.000000E+00 | 2.428088E+00 | −3.551352E−01 | −2.734194E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

TABLE 16-continued

Aspheric Coefficients

| | Surface # | | | |
|---|---|---|---|---|
| | 6 | 7 | 8 | 9 |
| k = | 0.000000E+00 | −3.590645E+00 | 0.000000E+00 | −3.190141E+00 |
| A4 = | 9.019270E−01 | −7.721860E−02 | −4.025178E−01 | −3.195331E−01 |
| A6 = | −2.502699E+00 | −5.177427E−01 | −5.585220E−01 | 3.079111E−01 |
| A8 = | 5.948230E+00 | 2.874316E+00 | 2.236034E+00 | −2.056133E−01 |
| A10 = | −1.097880E+01 | −1.042417E+01 | −4.029432E+00 | 5.985039E−02 |
| A12 = | 1.130208E+01 | 2.613888E+01 | 4.344885E+00 | 1.195438E−02 |
| A14 = | −4.432071E+00 | −4.218667E+01 | −2.901539E+00 | −1.462294E−02 |
| A16 = | 0.000000E+00 | 4.128649E+01 | 1.166826E+00 | 4.124520E−03 |
| A18 = | 0.000000E+00 | −2.179347E+01 | −2.562209E−01 | −4.073588E−04 |
| A20 = | 0.000000E+00 | 4.703568E+00 | 2.289935E−02 | 0.000000E+00 |

The presentation of the aspheric surface formula in the eighth embodiment is similar to that in the first embodiment. Besides, the definitions of parameters in following tables are equal to those in the first embodiment so the repetitious details need not be given here.

The following content may be deduced from Table 17 and Table 18.

Eighth embodiment (Primary reference wavelength: 555 nm)

| InRS11 | InRS12 | InRS21 | InRS22 | InRS31 | InRS32 |
|---|---|---|---|---|---|
| 0.13025 | −0.21853 | −0.16604 | −0.02723 | −0.23238 | −0.34650 |

| InRS41 | InRS42 | InRSO | InRSI | Σ|InRS| | |
|---|---|---|---|---|---|
| −0.07923 | −0.07169 | 0.60790 | 0.66394 | 1.27184 | |

| Σ|InRS|/InTL | Σ|InRS|/HOS | (|InRS22| + |InRS31|)/IN23 | (|InRS32| + |InRS41|)/IN34 |
|---|---|---|---|
| 0.49260 | 0.33650 | 0.8230 | 17.0290 |

| (|InRS31| + |InRS32| + |InRS41| + |InRS42|)/InTL | (|InRS31| + |InRS32| + |InRS41| + |InRS42|)/HOS |
|---|---|

Eighth embodiment (Primary reference wavelength: 555 nm)

| 0.28266 | | | 0.19309 | | |
|---|---|---|---|---|---|
| |f/f1| | |f/f2| | |f/f3| | |f/f4| | |f1/f2| | |f2/f3| |
| 1.05223 | 0.33723 | 0.62800 | 0.45733 | 0.32049 | 1.86224 |
| ΣPPR | ΣNPR | ΣPPR/|ΣNPR| | ΣPP | ΣNP | f1/ΣPP |
| 1.68023 | 0.79456 | 2.11466 | 6.75782 | −13.69238 | 0.37376 |
| f4/ΣNP | IN12/f | |InRS41|/TP4 | |InRS42|/TP4 | |ODT|% | |TDT|% |
| 0.42442 | 0.00941 | 0.13998 | 0.12666 | 1.02727 | 0.44587 |
| InTL | HOS | HOS/HOI | InS/HOS | InTL/HOS | ΣTP/InTL |
| 2.58189 | 3.77960 | 1.66649 | 0.98864 | 0.68311 | 0.85846 |
| HVT31 | HVT32 | HVT41 | HVT42 | HVT42/HOI | HVT42/HOS |
| 0 | 0.964543 | 0.73551 | 1.12528 | 0.49616 | 0.29772 |

Related inflection point values of eighth embodiment (Primary reference wavelength: 555 nm)

| HIF111 | 0.62432 | HIF111/HOI | 0.27527 | SGI111 | 0.09963 | |SGI111|/(|SGI111| + TP1) | 0.10322 |
|---|---|---|---|---|---|---|---|
| HIF211 | 0.05425 | HIF211/HOI | 0.02392 | SGI211 | 0.00003 | |SGI211|/(|SGI211| + TP2) | 0.00014 |
| HIF221 | 0.36943 | HIF221/HOI | 0.16289 | SGI221 | 0.01559 | |SGI221|/(|SGI221| + TP2) | 0.06348 |
| HIF311 | 0.77779 | HIF311/HOI | 0.34294 | SGI311 | −0.17611 | |SGI311|/(|SGI311| + TP3) | 0.24094 |
| HIF312 | 0.90983 | HIF312/HOI | 0.40116 | SGI312 | −0.22999 | |SGI312|/(|SGI312| + TP3) | 0.29305 |
| HIF321 | 0.75614 | HIF321/HOI | 0.33339 | SGI321 | −0.26761 | |SGI321|/(|SGI321| + TP3) | 0.32539 |
| HIF411 | 0.38475 | HIF411/HOI | 0.16964 | SGI411 | 0.04471 | |SGI411|/(|SGI411| + TP4) | 0.07320 |
| HIF421 | 0.48385 | HIF421/HOI | 0.21334 | SGI421 | 0.10796 | |SGI421|/(|SGI421| + TP4) | 0.16019 |

The Ninth Embodiment (Embodiment 9)

Figure 9A:
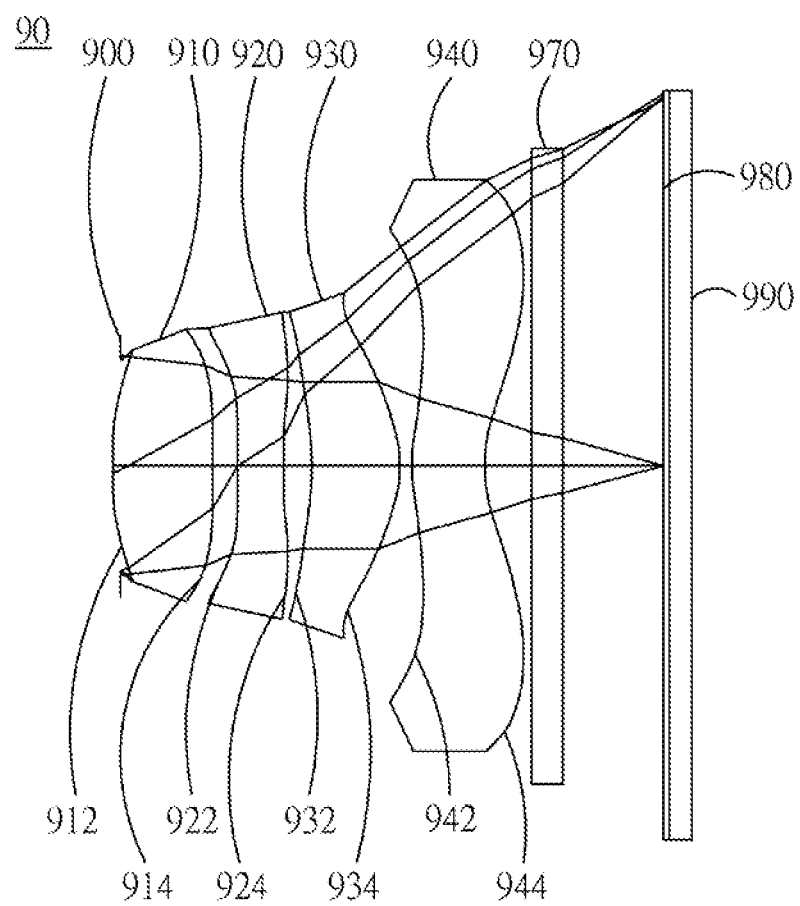
FIG. 9A is a schematic view of the optical image capturing system according to the ninth embodiment of the present application.
Figure 9B:
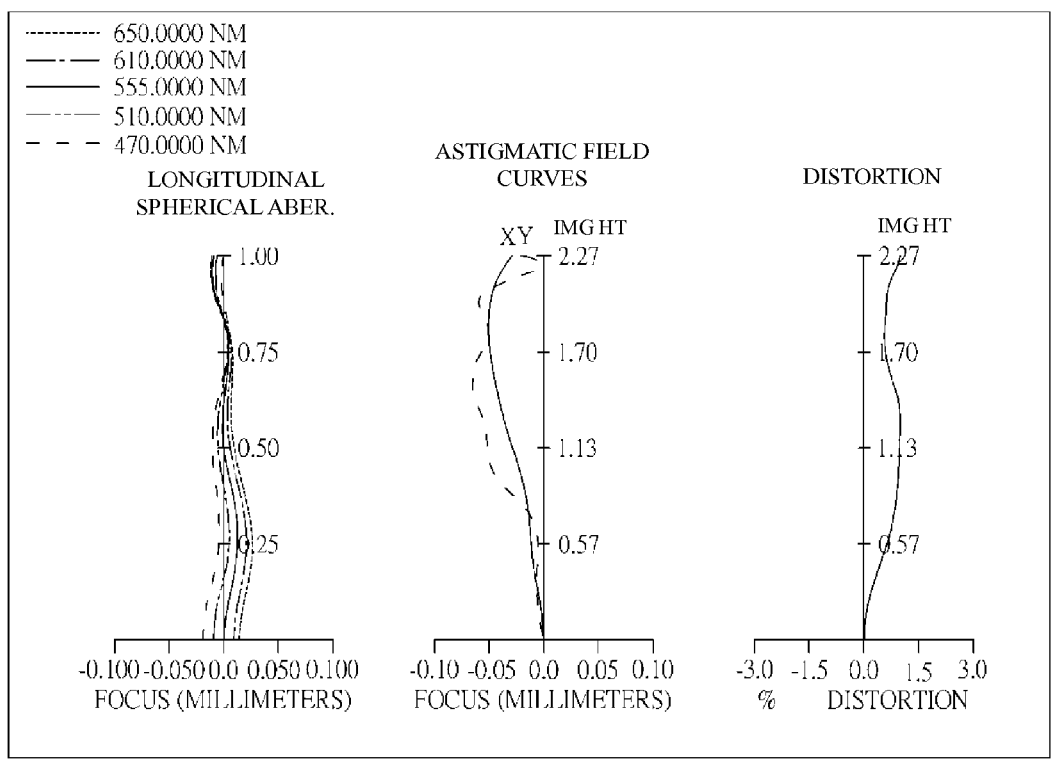
FIG. 9B is longitudinal spherical aberration curves, astigmatic field curves, and an optical distortion grid of the optical image capturing system in the order from left to right according to the ninth embodiment of the present application.
Figure 9C:
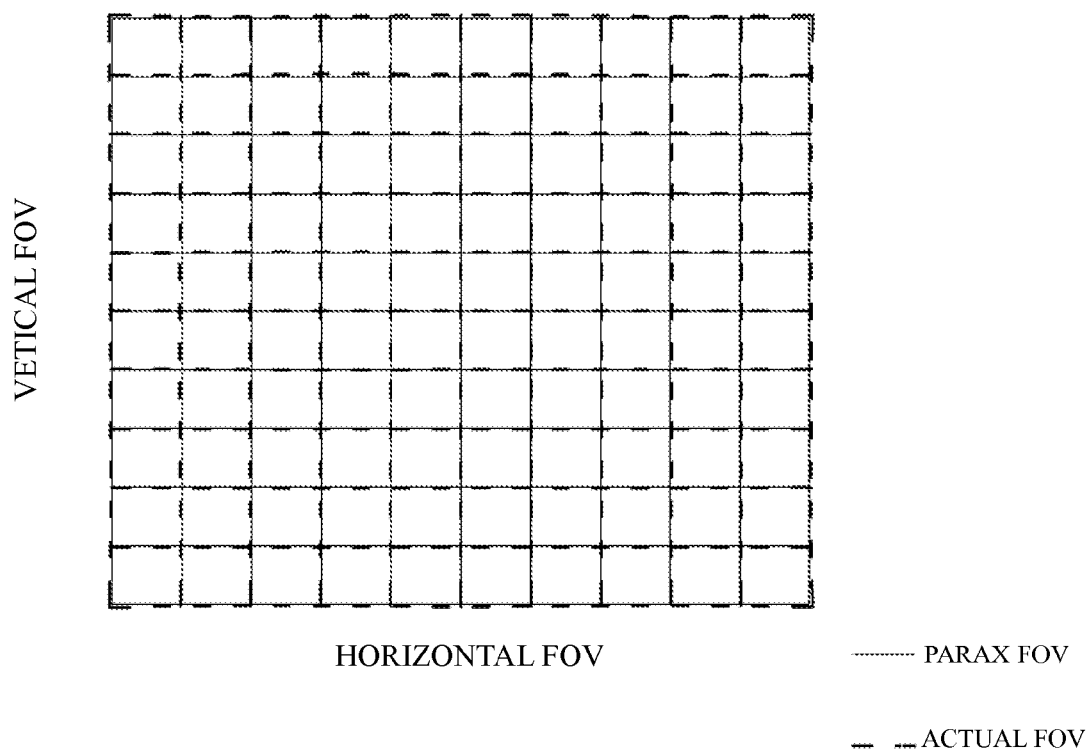
FIG. 9C is a TV distortion grid of the optical image capturing system according to the ninth embodiment of the present application.

Please refer to FIG. 9A, FIG. 9B and FIG. 9C, FIG. 9A is a schematic view of the optical image capturing system according to the ninth embodiment of the present application, FIG. 9B is longitudinal spherical aberration curves, astigmatic field curves, and an optical distortion curve of the optical image capturing system in the order from left to right according to the ninth embodiment of the present application, and FIG. 9C is a TV distortion grid of the optical image capturing system according to the ninth embodiment of the present application. As shown in FIG. 9A, sequentially arranged from an object side to an image side, the optical image capturing system includes a first lens element 910, an aperture stop 900, a second lens element 920, a third lens element 930, a fourth lens element 940, an IR filter 970, an image plane 980, and an image sensing device 990.

The first lens element 910 has positive refractive power and it is made of plastic material. The first lens element 910 has a convex object-side surface 912 and a convex image-side surface 914, and both of the object-side surface 912 and the image-side surface 914 are aspheric. The object-side surface 912 has one inflection point.

The second lens element 920 has negative refractive power and it is made of plastic material. The second lens element 920 has a convex object-side surface 922 and a concave image-side surface 924, and both of the object-side surface 922 and the image-side surface 924 are aspheric. The object-side surface 922 has two inflection points and the image-side surface 924 has three inflection points.

The third lens element 930 has positive refractive power and it is made of plastic material. The third lens element 930 has a concave object-side surface 932 and a convex image-side surface 934, and both of the object-side surface 932 and the image-side surface 934 are aspheric. The object-side surface 932 has four inflection points and the image-side surface 934 has one inflection point.

The fourth lens element 940 has negative refractive power and it is made of plastic material. The fourth lens element 940 has a convex object-side surface 942 and a concave image-side surface 944, and both of the object-side surface 942 and the image-side surface 944 are aspheric and have one inflection point.

The IR filter 970 is made of glass material without affecting the focal length of the optical image capturing system and it is disposed between the fourth lens element 940 and the image plane 980.

In the ninth embodiment of the optical image capturing system, focal lengths of the second lens element 920, the third lens element 930, and the fourth lens element 940 are f2, f3, and f4, respectively. The following relation is satisfied: $|f2|+|f3|=10.7662$ mm, $|f1|+|f4|=6.0300$ mm, and $|f2|+|f3|>|f1|+|f4|$.

In the ninth embodiment of the optical image capturing system, a central thickness of the third lens element 930 on the optical axis is TP3. A central thickness of the fourth lens element 940 on the optical axis is TP4. The following relation is satisfied: TP3=0.595 mm and TP4=0.494 mm.

In the ninth embodiment of the optical image capturing system, a sum of focal lengths of all lens elements with positive refractive power is ΣPP. The following relation is satisfied: ΣPP=f1+f3. Hereby, it's favorable for allocating the positive refractive power of the first lens element 910 to others positive lens elements and the significant aberrations generated in the process of moving the incident light can be suppressed.

In the ninth embodiment of the optical image capturing system, a sum of focal lengths of all lens elements with negative refractive power is ΣNP. The following relation is satisfied: ΣPP=f2+f4. Hereby, it's favorable for allocating the negative refractive power of the fourth lens element 940 to others negative lens elements Please refer to the following Table 17 and Table 18.

The detailed data of the optical image capturing system of the ninth embodiment is as shown in Table 17.

TABLE 17

Data of the optical image capturing system
f = 2.658 mm, f/HEP = 2.0, HAF = 40.181 deg, tan(HAF) = 0.8445

| Surface # | | Curvature Radius | Thickness | Material | Index | Abbe # | Focal length |
|---|---|---|---|---|---|---|---|
| 0 | Object | Plano | 6000 | | | | |
| 1 | Ape. stop | Plano | −0.05143 | Plastic | | | |
| 2 | Lens 1 | 1.65239 | 0.68458 | | 1.535 | 56.07 | 2.970 |
| 3 | | −38.00000 | 0.16959 | | | | |
| 4 | Lens 2 | 38.00000 | 0.31241 | Plastic | 1.642 | 22.46 | −8.447 |
| 5 | | 4.76679 | 0.18447 | | | | |
| 6 | Lens 3 | −1.47380 | 0.59547 | Plastic | 1.544 | 56.09 | 2.319 |
| 7 | | −0.77811 | 0.09113 | | | | |
| 8 | Lens 4 | 1.76915 | 0.49377 | Plastic | 1.544 | 56.09 | −3.060 |
| 9 | | 0.77444 | 0.31077 | | | | |
| 10 | IR filter | Plano | 0.22000 | BK_7 | 1.517 | 64.13 | |
| 11 | | Plano | 0.68000 | | | | |
| 12 | Image plane | Plano | | | | | |

Reference wavelength (d-line) = 555 nm, shield position: clear aperture (CA) of the third plano = 0.830 mm As for the parameters of the aspheric surfaces of the ninth embodiment, reference is made to Table 18.

TABLE 18

Aspheric Coefficients

| Surface # | | | | |
|---|---|---|---|---|
| | 2 | 3 | 4 | 5 |
| k = | −2.451847E+01 | 0.000000E+00 | 0.000000E+00 | −1.912480E−01 |
| A4 = | 5.357718E−01 | −3.301155E−01 | −4.038124E−01 | 2.163507E−0e1 |
| A6 = | −1.337213E+00 | −1.556627E−01 | −1.313895E+00 | −1.752983E+00 |
| A8 = | 2.016440E+00 | −5.827581E−02 | 1.823657E+00 | 3.843413E+00 |
| A10 = | −1.621273E+00 | 7.062539E−01 | 2.441617E+00 | −5.853929E+00 |
| A12 = | 0.000000E+00 | −6.228354E−01 | −5.033891E+00 | 5.548436E+00 |
| A14 = | 0.000000E+00 | 0.000000E+00 | 2.303746E+00 | −2.148259E+00 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| Surface # | | | | |
|---|---|---|---|---|
| | 6 | 7 | 8 | 9 |
| k = | 0.000000E+00 | −3.526982E+00 | 0.000000E+00 | −2.320668E+00 |
| A4 = | 8.855140E−01 | 1.234060E−03 | 5.394487E−02 | −4.924869E−01 |
| A6 = | −1.773162E+00 | −5.269971E−01 | −2.206892E+00 | 5.495448E−01 |
| A8 = | 3.390439E+00 | −5.495531E−01 | 6.278603E+00 | −4.084710E−01 |
| A10 = | −6.714037E+00 | 9.781331E+00 | −1.019416E+01 | 1.733107E−01 |
| A12 = | 7.547366E+00 | −2.840579E+01 | 1.044820E+01 | −3.159451E−02 |
| A14 = | −3.144088E+00 | 4.078770E+01 | −6.852117E+00 | −3.265385E−03 |
| A16 = | 0.000000E+00 | −3.190778E+01 | 2.795951E+00 | 2.298764E−03 |
| A18 = | 0.000000E+00 | 1.300540E+01 | −6.482533E−01 | −2.724686E−04 |
| A20 = | 0.000000E+00 | −2.170436E+00 | 6.530804E−02 | 0.000000E+00 |

The presentation of the aspheric surface formula in the ninth embodiment is similar to that in the first embodiment. Besides, the definitions of parameters in following tables are equal to those in the first embodiment so the repetitious details need not be given here.

The following content may be deduced from Table 17 and Table 18.

| Ninth embodiment (Primary reference wavelength: 555 nm) | | | | | |
|---|---|---|---|---|---|
| InRS11 | InRS12 | InRS21 | InRS22 | InRS31 | InRS32 |
| 0.13419 | −0.18674 | −0.19506 | −0.01861 | −0.15104 | −0.37091 |
| InRS41 | InRS42 | InRSO | InRSI | Σ|InRS| | |
| −0.07762 | 0.00375 | 0.55791 | 0.58001 | 1.13791 | |
| Σ|InRS|/InTL | Σ|InRS|/HOS | (|InRS22| + |InRS31|)/IN23 | (|InRS32| + |InRS41|)/IN34 | | |
| 0.44951 | 0.30408 | 0.9197 | 4.9215 | | |
| (|InRS31| + |InRS32| + |InRS41| + |InRS42|)/InTL | (|InRS31| + |InRS32| + |InRS41| + |InRS42|)/HOS | | | | |

| Ninth embodiment (Primary reference wavelength: 555 nm) | | | | | |
|---|---|---|---|---|---|
| 0.23833 | | | 0.16122 | | |
| |f/f1| | |f/f2| | |f/f3| | |f/f4| | |f1/f2| | |f2/f3| |
| 0.89474 | 0.31462 | 1.14611 | 0.86865 | 0.35164 | 3.64281 |
| ΣPPR | ΣNPR | ΣPPR/|ΣNPR| | ΣPP | ΣNP | f1/ΣPP |
| 2.04085 | 1.18328 | 1.72474 | 5.28927 | −11.50684 | 0.56159 |
| f4/ΣNP | IN12/f | |InRS41|/TP4 | |InRS42|/TP4 | |ODT|% | |TDT|% |
| 0.26589 | 0.06381 | 0.15719 | 0.00759 | 1.01946 | 0.45576 |
| InTL | HOS | HOS/HOI | InS/HOS | InTL/HOS | ΣTP/InTL |
| 2.53143 | 3.74220 | 1.65000 | 0.98626 | 0.67646 | 0.82413 |
| HVT31 | HVT32 | HVT41 | HVT42 | HVT42/HOI | HVT42/HOS |
| 0 | 0.996144 | 0.74919 | 1.14209 | 0.50357 | 0.30519 |

The following content may be deduced from Table 17 and Table 18.

| Related inflection point values of ninth embodiment (Primary reference wavelength: 555 nm) | | | | | | | |
|---|---|---|---|---|---|---|---|
| HIF111 | 0.60082 | HIF111/HOI | 0.26491 | SGI111 | 0.10338 | |SGI111|/(|SGI111| + TP1) | 0.13120 |
| HIF211 | 0.07219 | HIF211/HOI | 0.03183 | SGI211 | 0.00006 | |SGI211|/(|SGI211| + TP2) | 0.00018 |
| HIF212 | 0.70519 | HIF212/HOI | 0.31093 | SGI212 | −0.12792 | |SGI212|/(|SGI212| + TP2) | 0.29052 |
| HIF221 | 0.36330 | HIF221/HOI | 0.16018 | SGI221 | 0.01456 | |SGI221|/(|SGI221| + TP2) | 0.04453 |
| HIF222 | 0.79095 | HIF222/HOI | 0.34874 | SGI222 | 0.00126 | |SGI222|/(|SGI222| + TP2) | 0.00403 |
| HIF223 | 0.90805 | HIF223/HOI | 0.40038 | SGI223 | −0.01606 | |SGI223|/(|SGI223| + TP2) | 0.04888 |
| HIF311 | 0.34888 | HIF311/HOI | 0.15383 | SGI311 | −0.03138 | |SGI311|/(|SGI311| + TP3) | 0.05006 |
| HIF312 | 0.48113 | HIF312/HOI | 0.21214 | SGI312 | −0.04897 | |SGI312|/(|SGI312| + TP3) | 0.07599 |
| HIF313 | 0.80698 | HIF313/HOI | 0.35581 | SGI313 | −0.11184 | |SGI313|/(|SGI313| + TP3) | 0.15811 |
| HIF314 | 0.87739 | HIF314/HOI | 0.38686 | SGI314 | −0.13120 | |SGI314|/(|SGI314| + TP3) | 0.18055 |
| HIF321 | 0.72084 | HIF321/HOI | 0.31783 | SGI321 | −0.26207 | |SGI321|/(|SGI321| + TP3) | 0.30561 |

-continued

| Related inflection point values of ninth embodiment (Primary reference wavelength: 555 nm) | | | | | | |
|---|---|---|---|---|---|---|
| HIF411 | 0.39563 | HIF411/HOI 0.17444 | SGI411 | 0.04061 | \|SGI411\|/(\|SGI411\| + TP4) | 0.07600 |
| HIF421 | 0.46997 | HIF421/HOI 0.20722 | SGI421 | 0.10953 | \|SGI421\|/(\|SGI421\| + TP4) | 0.18155 |

The Tenth Embodiment (Embodiment 10)

Figure 10A:
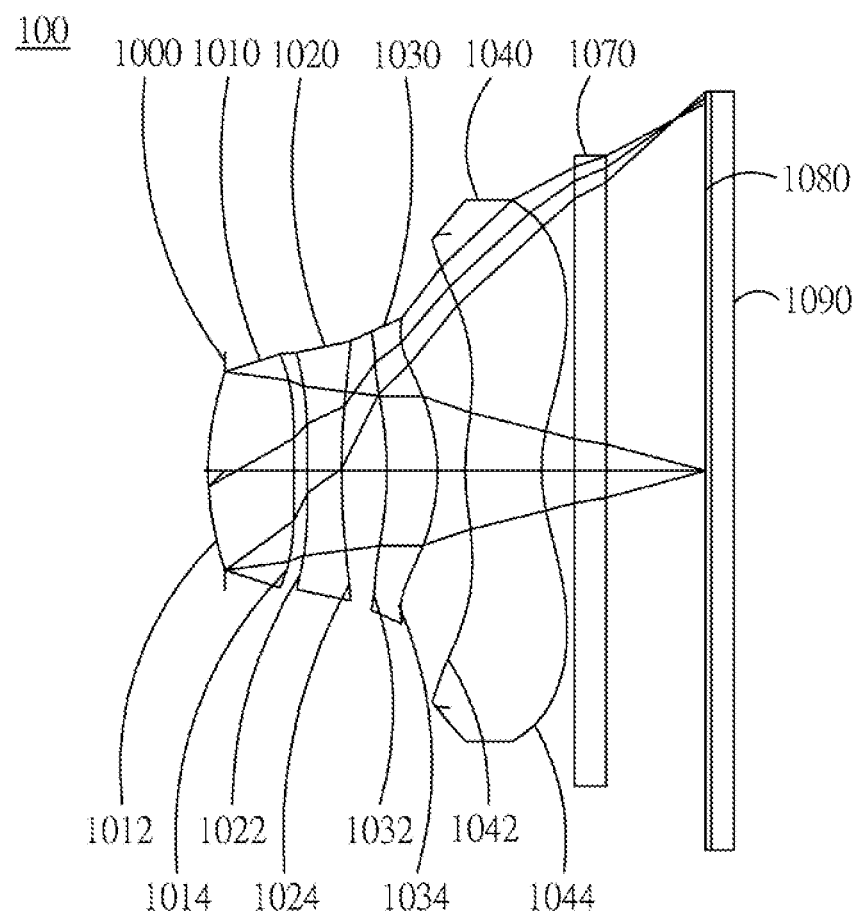
FIG. 10A is a schematic view of the optical image capturing system according to the tenth embodiment of the present application.
Figure 10B:
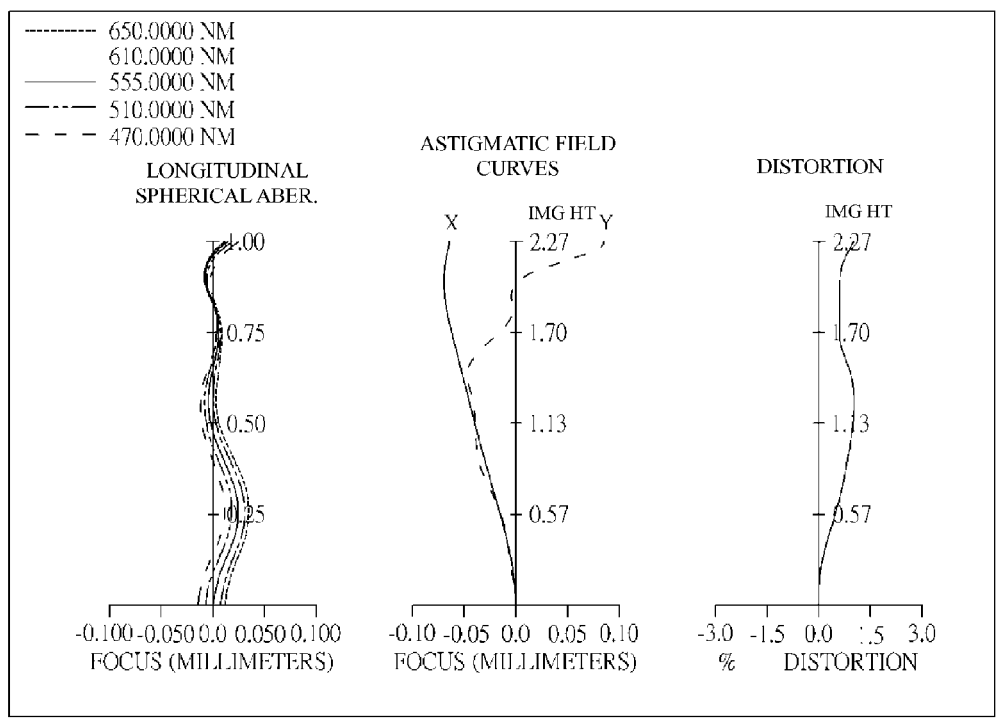
FIG. 10B is longitudinal spherical aberration curves, astigmatic field curves, and an optical distortion grid of the optical image capturing system in the order from left to right according to the tenth embodiment of the present application.
Figure 10C:
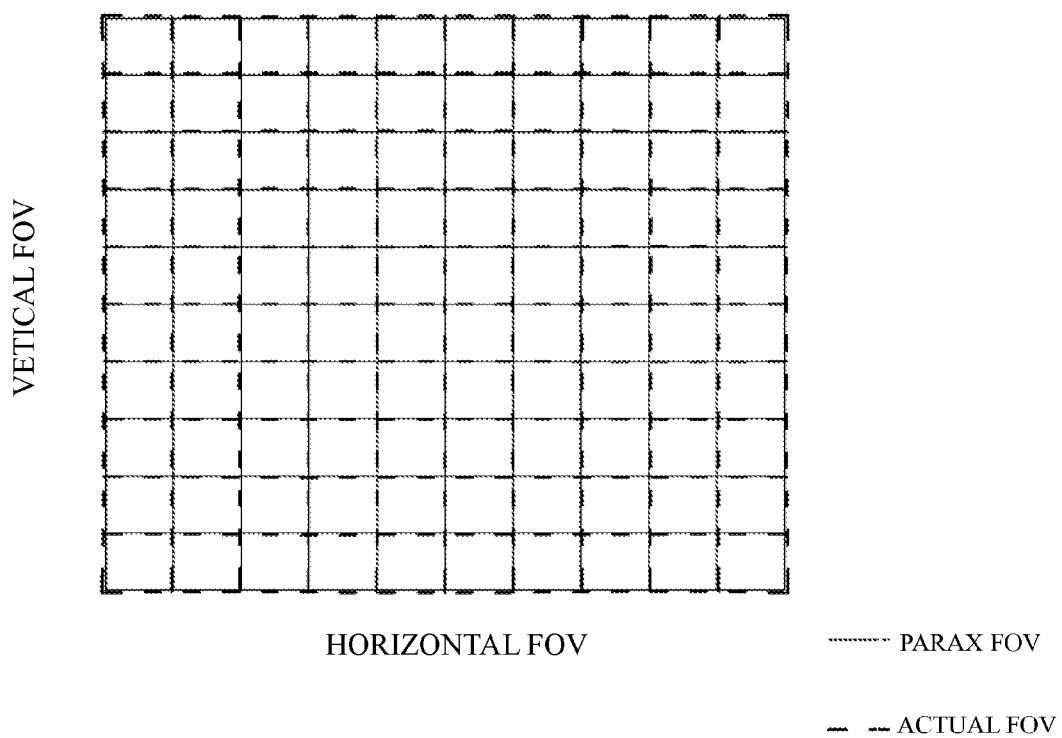
FIG. 10C is a TV distortion grid of the optical image capturing system according to the tenth embodiment of the present application.

Please refer to FIG. 10A, FIG. 10B and FIG. 10C, FIG. 10A is a schematic view of the optical image capturing system according to the tenth embodiment of the present application, FIG. 10B is longitudinal spherical aberration curves, astigmatic field curves, and an optical distortion curve of the optical image capturing system in the order from left to right according to the tenth embodiment of the present application, and FIG. 10C is a TV distortion grid of the optical image capturing system according to the tenth embodiment of the present application. As shown in FIG. 10A, sequentially arranged from an object side to an image side, the optical image capturing system includes a first lens element 1010, an aperture stop 1000, a second lens element 1020, a third lens element 1030, a fourth lens element 1040, an IR filter 1070, an image plane 1080, and an image sensing device 1090.

The first lens element 1010 has positive refractive power and it is made of plastic material. The first lens element 1010 has a convex object-side surface 1012 and a convex image-side surface 1014, both of the object-side surface 1012 and the image-side surface 1014 are aspheric, and the object-side surface 1012 has one inflection point.

The second lens element 1020 has negative refractive power and it is made of plastic material. The second lens element 1020 has a convex object-side surface 1022 and a concave image-side surface 1024, and both of the object-side surface 1022 and the image-side surface 1024 are aspheric. The object-side surface 1022 has three inflection points and the image-side surface 1024 has one inflection point.

The third lens element 1030 has positive refractive power and it is made of plastic material. The third lens element 1030 has a concave object-side surface 1032 and a convex image-side surface 1034, and both of the object-side surface 1032 and the image-side surface 1034 are aspheric. The object-side surface 1032 has two inflection points and the image-side surface 1034 has one inflection point.

The fourth lens element 1040 has negative refractive power and it is made of plastic material. The fourth lens element 1040 has a convex object-side surface 1042 and a concave image-side surface 1044, and both of the object-side surface 1042 and the image-side surface 1044 are aspheric. The object-side surface 1042 has two inflection points and the image-side surface 1044 has one inflection point.

The IR filter 1070 is made of glass material without affecting the focal length of the optical image capturing system and it is disposed between the fourth lens element 1040 and the image plane 1080.

In the tenth embodiment of the optical image capturing system, focal lengths of the second lens element 1020, the third lens element 1030, and the fourth lens element 1040 are f2, f3, and f4, respectively. The following relation is satisfied: $|f2|+|f3|=10.7218$ mm, $|f1|+|f4|=9.3481$ mm, and $|f2|+|f3|>|f1|+|f4|$.

In the tenth embodiment of the optical image capturing system, a central thickness of the third lens element 1030 on the optical axis is TP3. A central thickness of the fourth lens element 1040 on the optical axis is TP4. The following relation is satisfied: TP3=0.348715 mm and TP4=0.520935 mm.

In the tenth embodiment of the optical image capturing system, a sum of focal lengths of all lens elements with positive refractive power is ΣPP. The following relation is satisfied: ΣPP=f1+f3. Hereby, it's favorable for allocating the positive refractive power of the first lens element 1010 to others positive lens elements and the significant aberrations generated in the process of moving the incident light can be suppressed.

In the tenth embodiment of the optical image capturing system, a sum of focal lengths of all lens elements with negative refractive power is ΣNP. The following relation is satisfied: ΣNP=f2+f4. Hereby it's favorable for allocating the negative refractive power of the fourth lens element 1040 to others negative lens elements.

Please refer to the following Table 19 and Table 20.

The detailed data of the optical image capturing system of the tenth embodiment is as shown in Table 19.

TABLE 19

Data of the optical image capturing system
f = 2.658 mm, f/HEP = 2.2, HAF = 40.1736 deg, tan(HAF) = 0.8443

| Surface # | | Curvature Radius | Thickness | Material | Index | Abbe # | Focal length |
|---|---|---|---|---|---|---|---|
| 0 | Object | Plano | 6000 | | | | |
| 1 | Ape. stop | Plano | −0.11273 | | | | |
| 2 | Lens 1 | 1.48250 | 0.59199 | Plastic | 1.544 | 56.09 | 2.583 |
| 3 | | −24.67361 | 0.09375 | | | | |
| 4 | Lens 2 | 38.00000 | 0.23375 | Plastic | 1.642 | 22.46 | −6.246 |
| 5 | | 3.64725 | 0.31066 | | | | |
| 6 | Lens 3 | −1.59368 | 0.34871 | Plastic | 1.544 | 56.09 | 4.475 |
| 7 | | −1.03902 | 0.19246 | | | | |
| 8 | Lens 4 | 1.43844 | 0.52094 | Plastic | 1.544 | 56.09 | −6.766 |
| 9 | | 0.90284 | 0.22524 | | | | |
| 10 | IR filter | Plano | 0.22000 | BK_7 | 1.517 | 64.13 | |

TABLE 19-continued

Data of the optical image capturing system
f = 2.658 mm, f/HEP = 2.2, HAF = 40.1736 deg, tan(HAF) = 0.8443

| Surface # | Curvature Radius | Thickness | Material | Index | Abbe # | Focal length |
|---|---|---|---|---|---|---|
| 11 | | Plano | 0.68000 | | | |
| 12 | Image plane | Plano | | | | |

Reference wavelength (d-line) = 555 nm; shield position: clear aperture (CA) of the eighth plano = 1.390 mm As for the parameters of the aspheric surfaces of the eighth embodiment, reference is made to Table 20.

TABLE 20

Aspheric Coefficients

| Surface # | 2 | 3 | 4 | 5 |
|---|---|---|---|---|
| k = | −2.988492E+01 | 0.000000E+00 | 0.000000E+00 | −1.912480E−01 |
| A4 = | 8.918904E−01 | −3.202807E−01 | −2.814745E−01 | 6.867960E−02 |
| A6 = | −2.955649E+00 | −2.573616E−02 | −1.284325E+00 | −7.508017E−01 |
| A8 = | 5.684308E+00 | −2.466543E+00 | 2.343872E+00 | 1.321314E+00 |
| A10 = | −4.948103E+00 | 1.074251E+01 | 2.762574E+00 | −4.595466E−01 |
| A12 = | 0.000000E+00 | −1.173838E+01 | −3.529586E+00 | −5.446124E−01 |
| A14 = | 0.000000E+00 | 0.000000E+00 | −3.220920E+00 | 2.192041E−01 |
| A16 = | 0.000000E+00 | 0.000000E+00 | 0.000000E+00 | 0.000000E+00 |
| A18 = | 0.000000E+00 | 0.000000E+00 | 0.000000E+00 | 0.000000E+00 |
| A20 = | 0.000000E+00 | 0.000000E+00 | 0.000000E+00 | 0.000000E+00 |

| Surface # | 6 | 7 | 8 | 9 |
|---|---|---|---|---|
| k = | 0.000000E+00 | −4.777153E+00 | 0.000000E+00 | −3.628721E+00 |
| A4 = | 5.266193E−01 | −6.141935E−01 | −9.368625E−01 | −4.053027E−01 |
| A6 = | −1.438232E+00 | 1.545654E+00 | 1.053001E+00 | 4.311567E−01 |
| A8 = | 4.758004E+00 | −3.122187E+00 | −1.016081E+00 | −3.134520E−01 |
| A10 = | −9.612162E+00 | 6.394360E+00 | 5.876194E−01 | 1.078535E−01 |
| A12 = | 1.098041E+01 | −1.034759E+01 | −1.644666E−01 | 8.585757E−03 |
| A14 = | −5.464336E+00 | 1.543155E+01 | 5.171928E−02 | −2.134276E−02 |
| A16 = | 0.000000E+00 | −1.604377E+01 | −6.062325E−02 | 6.928467E−03 |
| A18 = | 0.000000E−00 | 8.555130E+00 | 3.384185E−02 | −7.665717E−04 |
| A20 = | 0.000000E+00 | −1.719097E+00 | −6.369034E−03 | 0.000000E+00 |

The presentation of the aspheric surface formula in the tenth embodiment is similar to that in the first embodiment. Besides, the definitions of parameters in following tables are equal to those in the first embodiment so the repetitious details need not be given here.

The following content may be deduced from Table 19 and Table 20.

Tenth embodiment (Primary reference wavelength: 555 nm)

| InRS11 | InRS12 | InRS21 | InRS22 | InRS31 | InRS32 |
|---|---|---|---|---|---|
| 0.11760 | −0.09724 | −0.07594 | 0.06339 | −0.10693 | −0.24282 |

| InRS41 | InRS42 | InRSO | InRSI | Σ|InRS| |
|---|---|---|---|---|
| −0.16911 | −0.20707 | 0.46958 | 0.61053 | 1.08010 |

| Σ|InRS|/InTL | Σ|InRS|/HOS | (|InRS22| + |InRS31|)/IN23 | (|InRS32| + |InRS41|)/IN34 |
|---|---|---|---|
| 0.47120 | 0.31605 | 0.5483 | 2.1403 |

| (|InRS31| + |InRS32| + |InRS41| + |InRS42|)/InTL | (|InRS31| + |InRS32| + |InRS41| + |InRS42|)/HOS |
|---|---|
| 0.31669 | 0.21242 |

Tenth embodiment (Primary reference wavelength: 555 nm)

| |f/f1| | |f/f2| | |f/f3| | |f/f4| | |f1/f2| | |f2/f3| |
|---|---|---|---|---|---|
| 1.02902 | 0.42545 | 0.59380 | 0.39280 | 0.41346 | 1.39568 |

| ΣPPR | ΣNPR | ΣPPR/ΣNPR | ΣPP | ΣNP | f1/ΣPP |
|---|---|---|---|---|---|
| 1.62282 | 0.81826 | 1.98326 | 7.05802 | −13.01179 | 0.36590 |

| f4/ΣNP | IN12/f | |InRS41|/TP4 | |InRS42|/TP4 | |ODT|% | |TDT|% |
|---|---|---|---|---|---|
| 0.51995 | 0.03528 | 0.32462 | 0.39749 | 1.03270 | 0.45751 |

| InTL | HOS | HOS/HOI | InS/HOS | InTL/HOS | ΣTP/InTL |
|---|---|---|---|---|---|
| 2.29225 | 3.41749 | 1.50683 | 0.96701 | 0.67074 | 0.73962 |

| HVT31 | HVT32 | HVT41 | HVT42 | HVT42/HOI | HVT42/HOS |
|---|---|---|---|---|---|
| 0 | 0.839016 | 0.56101 | 0.97557 | 0.43014 | 0.28546 |

The following content may be deduced from Table 19 and Table 20.

Related inflection point values of tenth embodiment (Primary reference wavelength: 555 nm)

| | | | | | | | |
|---|---|---|---|---|---|---|---|
| HIF111 | 0.58325 | HIF111/HOI | 0.25716 | SGI111 | 0.10916 | \|SGI111\|/(\|SGI111\| + TP1) | 0.15569 |
| HIF211 | 0.08495 | HIF211/HOI | 0.03745 | SGI211 | 0.00008 | \|SGI211\|/(\|SGI211\| + TP2) | 0.00034 |
| HIF212 | 0.59677 | HIF212/HOI | 0.26313 | SGI212 | −0.04504 | \|SGI212\|/(\|SGI212\| + TP2) | 0.16155 |
| HIF213 | 0.64550 | HIF213/HOI | 0.28461 | SGI213 | −0.05644 | \|SGI213\|/(\|SGI213\| + TP2) | 0.19450 |
| HIF221 | 0.73298 | HIF221/HOI | 0.32318 | SGI221 | 0.05691 | \|SGI221\|/(\|SGI221\| + TP2) | 0.19579 |
| HIF311 | 0.45744 | HIF311/HOI | 0.20169 | SGI311 | −0.05109 | \|SGI311\|/(\|SGI311\| + TP3) | 0.12779 |
| HIF312 | 0.74673 | HIF312/HOI | 0.32924 | SGI312 | −0.09109 | \|SGI312\|/(\|SGI312\| + TP3) | 0.20712 |
| HIF321 | 0.59161 | HIF321/HOI | 0.26085 | SGI321 | −0.16952 | \|SGI321\|/(\|SGI321\| + TP3) | 0.32711 |
| HIF411 | 0.28639 | HIF411/HOI | 0.12627 | SGI411 | 0.02303 | \|SGI411\|/(\|SGI411\| + TP4) | 0.04234 |
| HIF412 | 1.11151 | HIF412/HOI | 0.49008 | SGI412 | −0.10727 | \|SGI412\|/(\|SGI412\| + TP4) | 0.17076 |
| HIF421 | 0.42738 | HIF421/HOI | 0.18844 | SGI421 | 0.07827 | \|SGI421\|/(\|SGI421\| + TP4) | 0.13063 |

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An optical image capturing system, sequentially arranged from an object side to an image side, comprising:
    a first lens element with positive refractive power;
    a second lens element with refractive power;
    a third lens element with refractive power;
    a fourth lens element with refractive power; and
    an image plane;
    wherein the optical image capturing system comprises the four lens elements with refractive power, at least one of the second through fourth lens elements has positive refractive power, an object-side surface and an image-side surface of the fourth lens element are aspheric, focal lengths of the first through fourth lens elements are f1, f2, f3 and f4 respectively, a focal length of the optical image capturing system is f, an entrance pupil diameter of the optical image capturing system is HEP, a distance from an object-side surface of the first lens element to the image plane is HOS, a distance on an optical axis from the object-side surface of the first lens element to the image-side surface of the fourth lens element is InTL, a sum of an absolute value of each distance in parallel with the optical axis from a maximum effective diameter position on an object-side surface of each of the four lens elements to an axial point on the object-side surface of each of the four lens elements is InRSO, a sum of an absolute value of each distance in parallel with the optical axis from a maximum effective diameter position on an image-side surface of each of the four lens elements to an axial point on the image-side surface of each of the four lens elements is InRSI, a sum of InRSO and InRSI is Σ|InRSI|, and the following relation is satisfied: 1.2≤f/HEP≤6.0, 0.5≤HOS/f≤3.0, and 0<Σ|InRSI|/InTL≤3, and wherein at least one surface of the third lens element has at least two inflection points.

2. The optical image capturing system of claim 1, wherein TV distortion for image formation in the optical image capturing system is TDT, and the following relation is satisfied: |TDT|<60%.

3. The optical image capturing system of claim 1, wherein optical distortion for image formation in the optical image capturing system is ODT, and the following relation is satisfied: |ODT|<50%.

4. The optical image capturing system of claim 1, wherein the following relation is satisfied: 0 mm<HOS≤7 mm.

5. The optical image capturing system of claim 1, wherein half of a maximal view angle of the optical image capturing system is HAF, and the following relation is satisfied: 0 deg<HAF≤70 deg.

6. The optical image capturing system of claim 1, wherein the fourth lens element is with negative refractive power.

7. The optical image capturing system of claim 1, wherein the following relation is satisfied: 0.45≤InTL/HOS≤0.9.

8. The optical image capturing system of claim 1, wherein a total central thickness of all lens elements with refractive power on the optical axis is ΣTP, and the following relation is satisfied: 0.45≤ΣTP/InTL≤0.95.

9. The optical image capturing system of claim 1, wherein an aperture stop is further comprised and a distance from the aperture stop to the image plane is InS, and the following relation is satisfied: 0.5≤InS/HOS≤1.2.

10. An optical image capturing system, sequentially arranged from an object side to an image side, comprising:
    a first lens element with positive refractive power;
    a second lens element with refractive power;
    a third lens element with refractive power;
    a fourth lens element with refractive power; and
    an image plane;
    wherein the optical image capturing system comprises the four lens elements with refractive power and at least two lens elements among the four lens elements respectively have at least one inflection point on at least one surface thereof, at least one of the second through fourth lens elements has positive refractive power, an object-side surface and an image-side surface of the fourth lens element are aspheric, focal lengths of the first through fourth lens elements are f1, f2, f3 and f4 respectively, a focal length of the optical image capturing system is f, an entrance pupil diameter of the optical image capturing system is HEP, a distance from an object-side surface of the first lens element to the image plane is HOS, a distance on an optical axis from the object-side surface of the first lens element to the image-side surface of the fourth lens element is InTL, a sum of an absolute value of each distance in parallel with the optical axis from a maximum effective diameter position on an object-side surface of each of the four lens elements to an axial point on the object-side surface of each of the four lens elements is InRSO, a sum of an absolute value of each distance in parallel with the optical axis from a maximum effective diameter position on an image-side surface of each of the fourth lens elements to an axial point on the image-side surface of each of the fourth lens elements is InRSI, a sum of InRSO and InRSI is Σ|InRSI|, and the following relation is satisfied: 1.2≤f/HEP≤6.0, 0.5≤HOS/f≤3.0, and 0<Σ|InRSI|/InTL≤3, and wherein at least one surface of the third lens element has at least two inflection points.

11. The optical image capturing system of claim 10, wherein the fourth lens element is with negative refractive power, and at least one surface of an object-side surface and an image-side surface of the fourth lens element has at least one inflection point.

12. The optical image capturing system of claim 10, wherein a ratio f/fp of the focal length f of the optical image capturing system to a focal length fp of each of lens elements with positive refractive power is PPR and the following relation is satisfied: 0.5≤ΣPPR≤10.

13. The optical image capturing system of claim 10, wherein TV distortion and optical distortion for image formation in the optical image capturing system are TDT and ODT, respectively, and the following relation is satisfied: |TDT|<60% and |ODT|≤50%.

14. The optical image capturing system of claim 10, wherein at least one surface of at least one of the third and the fourth lens elements has at least one inflection point.

15. The optical image capturing system of claim 10, wherein the following relation is satisfied: 0 mm<Σ|InRSI|≤10 mm.

16. The optical image capturing system of claim 10, wherein a distance in parallel with an optical axis from a maximum effective diameter position on the object-side surface of the third lens element to an axial point on the object-side surface of the third lens element is InRS31, a distance in parallel with the optical axis from a maximum effective diameter position on the image-side surface of the third lens element to an axial point on the image-side surface of the third lens element is InRS32, a distance in parallel with an optical axis from a maximum effective diameter position on the object-side surface of the fourth lens element to an axial point on the object-side surface of the fourth lens element is InRS41, a distance in parallel with an optical axis from a maximum effective diameter position on the image-side surface of the fourth lens element to an axial point on the image-side surface of the fourth lens element is InRS42, and the following relation is satisfied: 0 mm<|InRS31|+|InRS32|+|InRS41|+|InRS42|≤8 mm.

17. The optical image capturing system of claim 16, wherein the following relation is satisfied: 0<(|InRS31|+|InRS32|+|InRS41|+|InRS42|)/InTL≤2.

18. The optical image capturing system of claim 16, wherein the following relation is satisfied: 0<(|InRS31|+|InRS32|+|InRS41|+|InRS42|)/HOS≤2.

19. The optical image capturing system of claim 10, wherein a sum of focal lengths of all lens elements with positive refractive power of the optical image capturing system is ΣPP and the following relation is satisfied: 0<f1/ΣPP≤0.8.

20. An optical image capturing system, sequentially arranged from an object side to an image side, comprising:
a first lens element with positive refractive power;
a second lens element with refractive power;
a third lens element with refractive power;
a fourth lens element with refractive power, and at least one of an object-side surface and an image-side surface having at least one inflection point; and
an image plane;
wherein the optical image capturing system comprises the four lens elements with refractive power, an object-side surface and an image-side surface of the first lens element are aspheric, and an object-side surface and an image-side surface of the fourth lens element are aspheric, at least one surface of each of at least two of the first lens element through the third lens element has at least one inflation point, focal lengths of the first through fourth lens elements are f1, f2, f3 and f4 respectively, a focal length of the optical image capturing system is f, an entrance pupil diameter of the optical image capturing system is HEP, half of a maximal view angle of the optical image capturing system is HAF, a distance from the object-side surface of the first lens element to the image plane is HOS, a distance on an optical axis from the object-side surface of the first lens element to the image-side surface of the fourth lens element is InTL, optical distortion and TV distortion for image formation in the optical image capturing system are ODT and TDT respectively, a sum of an absolute value of each distance in parallel with the optical axis from a maximum effective diameter position on an object-side surface of each of the four lens elements to an axial point on the object-side surface of each of the four lens elements is InRSO, a sum of an absolute value of each distance in parallel with the optical axis from a maximum effective diameter position on an image-side surface of each of the four lens elements to an axial point on the image-side surface of each of the four lens elements is InRSI, a sum of InRSO and InRSI is Σ|InRSI|, and the following relation is satisfied: 1.2≤f/HEP≤3.0, 0.4≤|tan(HAF)|≤3.0, 0.5≤HOS/f≤2.5, |TDT|<60%, |ODT|≤50%, and 0<Σ|InRSI|/InTL≤3, and wherein at least one surface of the third lens element has at least two inflection points.

21. The optical image capturing system of claim 20, wherein the following relation is satisfied: 0 mm<HOS≤7 mm.

22. The optical image capturing system of claim 20, wherein a distance in parallel with an optical axis from a maximum effective diameter position on the object-side surface of the third lens element to an axial point on the object-side surface of the third lens element is InRS31, a distance in parallel with the optical axis from a maximum effective diameter position on the image-side surface of the third lens element to an axial point on the image-side surface of the third lens element is InRS32, a distance in parallel with an optical axis from a maximum effective diameter position on the object-side surface of the fourth lens element to an axial point on the object-side surface of the fourth lens element is InRS41, a distance in parallel with an optical axis from a maximum effective diameter position on the image-side surface of the fourth lens element to an axial point on the image-side surface of the fourth lens element is InRS42, and the following relation is satisfied: 0 mm<|InRS31|+|InRS32|+|InRS41|+|InRS42|≤8 mm.

23. The optical image capturing system of claim 22, wherein the following relation is satisfied: 0<(|InRS31|+|InRS32|+|InRS41|+|InRS42|)/InTL≤2.

24. The optical image capturing system of claim 22, wherein an aperture stop and an image sensing device are further comprised, and the image sensing device is disposed on the image plane and has at least 5 million pixels, and a distance from the aperture stop to the image plane is InS, and the following relation is satisfied: 0.5≤InS/HOS≤1.1.

* * * * *